United States Patent
Park et al.

(10) Patent No.: US 11,621,875 B2
(45) Date of Patent: Apr. 4, 2023

(54) METHOD AND APPARATUS FOR APPLYING OPTIMIZED PHASE ROTATION IN CONSIDERATION OF VARIOUS RF CAPABILITIES IN BROADBAND WITH 80MHZ BASED PREAMBLE PUNCTURING IN WLAN SYSTEM

(71) Applicant: LG ELECTRONICS INC., Seoul (KR)

(72) Inventors: Eunsung Park, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/273,708

(22) PCT Filed: Aug. 21, 2019

(86) PCT No.: PCT/KR2019/010636
§ 371 (c)(1),
(2) Date: Mar. 4, 2021

(87) PCT Pub. No.: WO2020/050529
PCT Pub. Date: Mar. 12, 2020

(65) Prior Publication Data
US 2021/0336827 A1    Oct. 28, 2021

(30) Foreign Application Priority Data
Sep. 7, 2018 (KR) .................. 10-2018-0107419

(51) Int. Cl.
*H04L 27/26* (2006.01)
*H04L 1/00* (2006.01)
*H04W 84/12* (2009.01)

(52) U.S. Cl.
CPC ........ *H04L 27/2621* (2013.01); *H04L 1/0069* (2013.01); *H04W 84/12* (2013.01)

(58) Field of Classification Search
CPC ............... H04L 27/2621; H04L 1/0069; H04L 27/26134; H04W 84/12
See application file for complete search history.

(56) References Cited

U.S. PATENT DOCUMENTS 11,245,501 B2 * 2/2022 Cherian ................. H04L 5/0007
11,272,490 B2 * 3/2022 Verma ................... H04L 1/0057
(Continued)

FOREIGN PATENT DOCUMENTS

| KR | 10-2013-0008060 | 1/2013 |
|---|---|---|
| WO | 2017079292 | 5/2017 |
| WO | 2017111567 | 6/2017 |

OTHER PUBLICATIONS

PCT International Application No. PCT/KR2019/010636, International Search Report dated Jan. 2, 2020, 6 pages.
(Continued)

*Primary Examiner* — Jay P Patel
(74) *Attorney, Agent, or Firm* — Lee Hong Degerman Kang Waimey

(57) ABSTRACT

A method and an apparatus for transmitting an EHT PPDU in a WLAN system are proposed. Specifically, a transmitter generates an EHT PPDU and transmits, on the basis of an RF, the EHT PPDU to a receiver through a 320 MHz band in which an 80 MHz band is punctured. A legacy preamble includes an L-STF and an L-LTF. The legacy preamble is generated by applying a first phase rotation value. The first phase rotation value is determined on the basis of a first scheme and a second scheme. The first scheme is a scheme of obtaining an optimal PAPR in the L-STF and the L-LTF. The second scheme is a scheme of obtaining an optimal PAPR on the basis of the maximum transmission bandwidth
(Continued)

supported by the RF. The first phase rotation value is obtained on the basis of a second phase rotation value and a third phase rotation value. The second phase rotation value is a phase rotation value that repeats a phase rotation value defined for the 80 MHz band in an 802.11ax system. The third phase rotation value is a phase rotation value defined in units of the 80 MHz band in the 320 MHz band.

13 Claims, 23 Drawing Sheets

(56) References Cited

U.S. PATENT DOCUMENTS

| | | | |
|---|---|---|---|
| 2017/0288745 A1 | 10/2017 | Seok | |
| 2019/0253296 A1* | 8/2019 | Chen | H04L 41/0896 |
| 2019/0288895 A1* | 9/2019 | Chen | H04L 27/2602 |
| 2019/0289612 A1* | 9/2019 | Chen | H04L 27/2613 |
| 2019/0373586 A1* | 12/2019 | Verma | H04B 7/0697 |
| 2020/0045656 A1* | 2/2020 | Verma | H04L 27/2613 |
| 2020/0076551 A1* | 3/2020 | Cherian | H04L 5/0094 |
| 2020/0076552 A1* | 3/2020 | Cherian | H04W 72/044 |
| 2020/0162963 A1* | 5/2020 | Alpert | H04W 28/06 |
| 2021/0112507 A1* | 4/2021 | Verma | H04J 3/067 |
| 2021/0243756 A1* | 8/2021 | Kim | H04W 72/02 |
| 2021/0250125 A1* | 8/2021 | Park | H04L 27/3872 |
| 2021/0320830 A1* | 10/2021 | Park | H04L 27/2618 |
| 2021/0344540 A1* | 11/2021 | Park | H04L 27/2603 |

OTHER PUBLICATIONS

Choi, et.al., "View on EHT Objectives and Technologies", IEEE 802.11-18/1171r0, Jul. 2018, 13 pages.

* cited by examiner

METHOD AND APPARATUS FOR APPLYING OPTIMIZED PHASE ROTATION IN CONSIDERATION OF VARIOUS RF CAPABILITIES IN BROADBAND WITH 80MHZ BASED PREAMBLE PUNCTURING IN WLAN SYSTEM

CROSS-REFERENCE TO RELATED APPLICATIONS

This application is the National Stage filing under 35 U.S.C. 371 of International Application No. PCT/KR2019/010636, filed on Aug. 21, 2019, which claims the benefit of earlier filing date and right of priority to Korean Application Nos. 10-2018-0107419, filed on Sep. 7, 2018, the contents of which are all hereby incorporated by reference herein in their entirety.

BACKGROUND OF THE DISCLOSURE

Field of the Disclosure

This specification relates to a scheme for transmitting a PPDU in a WLAN system and, most particularly, to a method and device for applying phase rotation that is optimized in a WLAN environment while considering 80 MHz-based preamble puncturing and various RF capabilities.

RELATED ART

The current IEEE 802.11/Wi-Fi network may provide low average latency in an environment without traffic flooding. However, since the worst-case latency may vary and change significantly, this may gravely influence application performance or limit the usage of real-time applications or time-sensitive applications. Therefore, a solution for providing more stable and reliable performance that can keep the worst-case latency or jitters under control is needs to be devised. Feasible enhancements and new functions of the IEEE 802.11 wireless LAN that may satisfy the requirements of such real-time applications are as follows.

Firstly, by expanding Time Sensitive Networking (TSN) functions so that IEEE 802.1 Time Sensitive Networking (TSN) functions for supporting real-time applications over IEEE 802.3 wired Ethernet can be operated over IEEE 802.11 wireless LAN, the real-time applications may be provided with better support on wireless media. Although TSN functions, such as traffic stream identification, time synchronization, integration with Ethernet bridging, and so on, are already applied to IEEE 802.11 wireless LAN, Time-Aware Shaping (IEEE 802.1Qbv standard) and redundancy through double/multiple links (Frame Replication and Elimination (FRE) function of the IEEE 802.1CB standard) are functions that need to be newly expanded and applied and supported in the IEEE 802.11 wireless LAN in order to resolve the problems of worst-case latency in the current Wi-Fi network. Moreover, the application of wireless LAN to other TSN functions, such as alignment with TSN management models, which is defined in the IEEE 802.1Qcc standard, also needs to be taken into consideration.

Secondly, multi-band operation is an important function that is needed to enable co-existence with other high throughput applications not only through real-time application support but also through traffic steering/separation.

And, finally, MAC and LHY layers of IEEE 802.11 need to be enhanced so that the worst-case latency can be more predictable, which is an important requirement for most of the real-time applications. Herein, the more predictable worst-case latency does not necessarily mean an extremely low latency. In this case, the capability of providing more improved performance for latency prediction is the main requirement. However, in some Use Cases, in addition to a predictable latency, a very low latency is also a crucial requirement. Since reliability is another important factor that needs to be enhanced in order to provide real-time application support, various functions that can enhance the overall reliability of IEEE 802.11 links are also needed. According to such requirements, feasible future enhancements of the MAC and PHY layers of IEEE 802.11 shall include reduced PHY overhead, predictable and efficient media access, improved support for transmitting time-sensitive small packets, enhanced management in order to provide performance with better predictability, co-existence of time-sensitive data, coordination between APs, double/multiple link transmission, and so on.

SUMMARY OF THE DISCLOSURE

Technical Objects

This specification proposes a method and device for applying phase rotation that is optimized while considering various RF capabilities in a broadband having 80 MHz-based preamble puncturing performed in a WLAN system.

Technical Solutions

An example of this specification proposes a method for transmitting a PPDU through a broadband in a WLAN system while considering 80 MHz-based preamble puncturing and various RF capabilities.

This embodiment may be performed in a network environment being supported by a next generation wireless LAN system. The next generation wireless LAN system is an enhanced version of the 802.11ax system, which can satisfy backward compatibility with the 802.11ax system. The next generation wireless LAN system may also correspond to an Extreme High Throughput (EHT) wireless LAN system or an 802.11be wireless LAN system.

This embodiment is performed by a transmitting device, and the transmitting device may correspond to an AP. A receiving device may correspond to an STA (non-AP STA).

This embodiment proposes a method and device for configuring a phase rotation value that can gain a PAPR that is optimized while considering both cases where 80 MHz-based preamble puncturing is performed in 240, 320 MHz bands and where a wireless device having different maximum transmission bandwidths supported by a Radio Frequency (RF) exists. 80 MHz-based preamble puncturing means that a broadband is punctured in 80 MHz band units. That is, proposed herein is a phase rotation value minimizing a maximum PAPR while applying 80 MHz-based preamble puncturing in 240 MHz/320 MHz bands and considering all RF capabilities of a wireless device having different maximum transmission bandwidths of an RF within a BSS. EHT PPDUs being proposed in this embodiment may all be transmitted/received in 240 MHz/320 MHz bands. Herein, however, the description will be limited only to the 320 MHz band.

A transmitting device generates the EHT Physical Protocol Data Unit (PPDU). The EHT PPDU includes a legacy preamble and an EHT field.

The transmitting device transmits the PPDU to a receiving device through a 320 MHz band having 80 MHz bands punctured.

The legacy preamble includes a Legacy-Short Training Field (L-STF) and a Legacy-Long Training Field (L-LTF). Additionally, the legacy preamble may further include a Legacy-Signal (L-SIG). The EHT field may include EHT-SIG, EHT-STF, EHT-LTF, and a data field. The legacy field may be a field that is supported by a wireless LAN system preceding 802.11be, and the EHT field may be a field that is supported by an 802.11be wireless LAN system.

The EHT PPDU is transmitted based on a radio frequency (RF). More specifically, the transmitting device may transmit an EHT PPDU within the 320 MHz band through a transmittable bandwidth supported by the RF (i.e., RF capacity).

The legacy preamble is generated by applying a first phase rotation value. That is, all fields included in the legacy preamble may commonly have the first phase rotation value applied thereto.

The first phase rotation value is determined based on a first method and a second method.

The first method is a method for obtaining an optimal PAPR of the L-STF and the L-LTF. The second method is a method for obtaining an optimal PAPR based on a maximum transmission bandwidth that is supported by the RF.

That is, the first phase rotation value is a phase rotation value that is defined for optimal PAPRs of L-STF and L-LTF. If the PAPRs of L-STF and L-LTF are great (or large), the first phase rotation value may be applied to the legacy preamble in order to minimize the PAPR values. Additionally, the first phase rotation value is also a phase rotation value for minimizing a maximum PAPR, which is obtained while considering all maximum transmission bandwidths supported by the RF. That is, the first phase rotation value may be a phase rotation value that is defined for obtaining optimal PAPRs of L-STF and L-LTF in a situation considering various RF capabilities.

The first phase rotation value is obtained based on a second phase rotation value and a third phase rotation value.

The second phase rotation value is a phase rotation value obtained by repeating a phase rotation value that is defined for an 80 MHz band in an 802.11ax system. Since the EHT PPDU is transmitted through the 320 MHz band, the second phase rotation value may be obtained by repeating four times the phase rotation value of the 80 MHz band, which optimizes the PAPRs in the L-STF and L-LTF and is applied in 20 MHz band units. If the PPDU is said to be transmitted through a 160 MHz band, the second phase rotation value may be obtained by repeating two times the phase rotation value of the 80 MHz band (optimizing the PAPRs in the L-STF and L-LTF and being applied in 20 MHz band units). And, if the PPDU is said to be transmitted through a 240 MHz band, the second phase rotation value may be obtained by repeating three times the phase rotation value (optimizing the PAPRs in the L-STF and L-LTF and being applied in 20 MHz band units).

The third phase rotation value is a phase rotation value being defined in 80 MHz band units in the 320 MHz band based on optimal PAPRs of the L-STF and the L-LTF. Since the 320 MHz band may be divided into 4 units of 80 MHz band, a third phase rotation value may be defined for each of the four 80 MHz bands. If the EHT PPDU is said to be transmitted through a 160 MHz band, a third phase rotation value may be defined for each of two 80 MHz bands, based on the optimal PAPRs of the L-STF and the L-LTF. If the EHT PPDU is said to be transmitted through a 240 MHz band, a third phase rotation value may be defined for each of three 80 MHz bands, based on the optimal PAPRs of the L-STF and the L-LTF.

That is, this embodiment proposes a method for additionally performing phase rotation (the third phase rotation value) for each 80 MHz band unit within a full band while applying a phase rotation value (the second phase rotation value) being defined for the 80 MHz band.

Hereinafter, a subcarrier range having the phase rotation value applied thereto will be described.

The 320 MHz is configured of subcarriers having subcarrier indexes from −512 to 511.

The second rotation phase value is [1 −1 −1 −1 1 −1 −1 −1 1 −1 −1 −1 1 −1 −1 −1]. This is because the rotation phase value being defined for the 80 MHz band has been repeated 4 times.

Among the second rotation phase value, a first value 1 may be applied to a subcarrier having subcarrier indexes from −512 to −449, among the second rotation phase value, a second value −1 may be applied to a subcarrier having subcarrier indexes from −448 to −385, among the second rotation phase value, a third value −1 may be applied to a subcarrier having subcarrier indexes from −384 to −321, and, among the second rotation phase value, a fourth value −1 may be applied to a subcarrier having subcarrier indexes from −320 to −257. That is, [1 −1 −1 −1] being the first to fourth values of the second rotation phase value may be applied to a first 80 MHz band within the 320 MHz band.

Among the second rotation phase value, a fifth value 1 may be applied to a subcarrier having subcarrier indexes from −256 to −193, among the second rotation phase value, a sixth value −1 may be applied to a subcarrier having subcarrier indexes from −192 to −129, among the second rotation phase value, a seventh value −1 may be applied to a subcarrier having subcarrier indexes from −128 to −65, and, among the second rotation phase value, an eighth value −1 may be applied to a subcarrier having subcarrier indexes from −64 to −1. That is, [1 −1 −1 −1] being the fifth to eighth values of the second rotation phase value may be applied to a second 80 MHz band within the 320 MHz band.

Among the second rotation phase value, a ninth value 1 may be applied to a subcarrier having subcarrier indexes from 0 to 63, among the second rotation phase value, a tenth value −1 may be applied to a subcarrier having subcarrier indexes from 64 to 127, among the second rotation phase value, an eleventh value −1 may be applied to a subcarrier having subcarrier indexes from 128 to 191, and, among the second rotation phase value, a twelfth value −1 may be applied to a subcarrier having subcarrier indexes from 192 to 255. That is, [1 −1 −1 −1] being the ninth to twelfth values of the second rotation phase value may be applied to a third 80 MHz band within the 320 MHz band.

Among the second rotation phase value, a thirteenth value 1 may be applied to a subcarrier having subcarrier indexes from 256 to 319, among the second rotation phase value, a fourteenth value −1 may be applied to a subcarrier having subcarrier indexes from 320 to 383, among the second rotation phase value, a fifteenth value −1 may be applied to a subcarrier having subcarrier indexes from 384 to 447, and, among the second rotation phase value, a sixteenth value −1 may be applied to a subcarrier having subcarrier indexes from 448 to 511. That is, [1 −1 −1 −1] being the thirteenth to sixteenth values of the second rotation phase value may be applied to a fourth 80 MHz band within the 320 MHz band.

For example, the third phase rotation value may be [1 1 −1 −1]. Since the 320 MHz band may be divided into 4 units of 80 MHz band, a third phase rotation value may be defined for each of the four 80 MHz bands.

Among the third rotation phase value, a first value 1 may be applied to a first 80 MHz band within the 320 MHz band, among the third rotation phase value, a second value 1 may be applied to a second 80 MHz band within the 320 MHz band, among the third rotation phase value, a third value −1 may be applied to a third 80 MHz band within the 320 MHz band, and, among the third rotation phase value, a fourth value −1 may be applied to a fourth 80 MHz band within the 320 MHz band.

The first phase rotation value may be obtained based on a multiplication of the second phase rotation value and the third phase rotation value. That is, the first phase rotation value may be obtained by multiplying the second phase rotation value and the third phase rotation value to align with the frequency band (or subcarrier index). At this point, the first phase rotation value is [1 −1 −1 −1 1 −1 −1 −1 −1 1 1 1 −1 1 1 1]. By applying the first phase rotation value to the legacy preamble, optimal PAPRs for L-STF and L-LTF may be ensured for the transmission of a 320 MHz band considering various RF capabilities and having 80 MHz-based preamble puncturing performed therein.

For example, the 80 MHz band may include all 80 MHz bands excluding a primary 80 MHz band. That is, although the primary 80 MHz band may always be used for the PPDU transmission, not all of the remaining 80 MHz bands excluding the primary 80 MHz band may be used for the PPDU transmission. The first and second phase rotation values may be obtained based on a preamble puncturing pattern. The preamble puncturing pattern may be a band pattern having punctured at least one 80 MHz band, among all 80 MHz bands excluding the primary 80 MHz band within the 320 MHz band.

That is, the preamble puncturing pattern may correspond to a pattern of all cases having at least one 80 MHz band punctured in the 320 MHz band. However, the first phase rotation value has one unified form and not a form having various values according to the preamble puncturing pattern.

Additionally, the maximum transmission bandwidth supported by the RF may be 80 MHz, 160 MHz, 240 MHz or 320 MHz. In case the maximum transmission bandwidth supported by the RF is 80 MHz, the transmitting device may transmit a PPDU by using one RF having 80 MHz capacity. In case the maximum transmission bandwidth supported by the RF is 160 MHz, the transmitting device may transmit a PPDU by using two RFs having 80 MHz capacity. In case the maximum transmission bandwidth supported by the RF is 240 MHz, the transmitting device may transmit a PPDU by using three RFs having 80 MHz capacity. In case the maximum transmission bandwidth supported by the RF is 320 MHz, the transmitting device may transmit a PPDU by using four RFs having 80 MHz capacity.

By comparing first to fourth PAPRs, one of the first to fourth PAPRs may be selected as an optimal PAPR that is obtained based on the maximum transmission bandwidth(s) supported by the RF. That is, the transmitting device may calculate a PAPR for each RF having various capacities so as to extract a maximum PAPR value, and, then, the transmitting device may compare the extracted PAPR values so as to determine an optimized phase rotation value. However, the first phase rotation value has one unified form and not a form having various values according to the RF having various capacities.

The first PAPR may be an optimal PAPR that is obtained when the maximum transmission bandwidth supported by the RF is 80 MHz. The second PAPR may be an optimal PAPR that is obtained when the maximum transmission bandwidth supported by the RF is 160 MHz. The third PAPR may be an optimal PAPR that is obtained when the maximum transmission bandwidth supported by the RF is 240 MHz. The fourth PAPR may be an optimal PAPR that is obtained when the maximum transmission bandwidth supported by the RF is 320 MHz.

The L-STF may be generated by applying the first phase rotation value to an L-STF sequence. Additionally, the L-LTF may be generated by applying the first phase rotation value to an L-LTF sequence.

The L-STF sequence may be a sequence being configured by repeating an L-STF sequence that is defined for a 20 MHz band. Since the L-STF is transmitted through the 320 MHz band, the L-STF sequence may be obtained by repeating the L-STF sequence of the 20 MHz band, which is defined in the existing 802.11ax. Similarly, if the L-STF is transmitted through a 160 MHz band, the L-STF sequence of the 20 MHz band, which is defined in the existing 802.11ax, may be repeated two times. And, if the L-STF is transmitted through a 240 MHz band, the L-STF sequence of the 20 MHz band, which is defined in the existing 802.11ax, may be repeated three times.

The L-STF sequence being defined for the 20 MHz band is sqrt(½)*[0 0 0 0 0 0 0 0 1+j 0 0 0 −1−j 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 0 0 1+j 0 0 0 1+j 0 0 0 0 0 0 0].

The L-LTF sequence may be a sequence being configured by repeating an L-LTF sequence that is defined for a 20 MHz band. Since the L-LTF is transmitted through the 320 MHz band, the L-LTF sequence may be obtained by repeating the L-LTF sequence of the 20 MHz band, which is defined in the existing 802.11ax. Similarly, if the L-LTF is transmitted through a 160 MHz band, the L-LTF sequence of the 20 MHz band, which is defined in the existing 802.11ax, may be repeated two times. And, if the L-LTF is transmitted through a 240 MHz band, the L-LTF sequence of the 20 MHz band, which is defined in the existing 802.11ax, may be repeated three times.

The L-LTF sequence being defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 −1 −1 1 1 −1 −1 1 1 −1 1 −1 1 1 1 1 0 0 0 0 0].

In the above-described embodiment, even when the PPDU is being transmitted through 80/160/240 MHz bands, a phase rotation value may be defined and applied to the legacy preamble by using the same method.

The EHT-SIG may include EHT-SIG-A and EHT-SIG-B. The EHT-SIG-B may include the RU information. That is, an AP may notify information on a tone plan at 80/160/240/320 MHz through the EHT-SIG-B within the PPDU. Additionally, EHT-STF, EHT-LTF, and data field being included in the EHT field may be transmitted and/or received from/in a band (RU) according to a tone plan at 80/160/240/320 MHz.

Additionally, the EHT-SIG may be generated by applying the first phase rotation value or the second phase rotation value. If an EHT PPDU has a preamble structure, such as that of 11ax, a field may be generated by applying a phase rotation value that even has the same EHT-SIG-B.

Effects of the Disclosure

According to an embodiment proposed in this specification, by defining a phase rotation value being applied to a legacy preamble in case of transmitting a PPDU through a 240/320 MHz band while considering all situations where 80 MHz-based preamble puncturing is performed and where a wireless device having different maximum transmission bandwidths supported by a Radio Frequency (RF) exists, a PAPR that is optimized for L-STF and L-LTF may be obtained. Thus, subcarrier efficiency and high throughput may be achieved.

DESCRIPTION OF EXEMPLARY EMBODIMENTS

When a certain component includes specific elements or a certain process includes specific steps in the disclosure, other elements or other steps may be further included. That is, the terms used in the disclosure are merely for describing particular embodiments, and are not intended to limit the scope of the disclosure.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (Signal)" may mean that "Signal" is proposed as an example of "control information". Further, "control information (i.e., signal)" may also mean that "signal" is proposed as an example of "control information".

The following examples of the present disclosure may be applied to various wireless communication systems. For example, the following examples of the present disclosure may be applied to a wireless local area network (WLAN) system. For example, the present disclosure may be applied to IEEE 802.11a/g/n/ac or IEEE 802.11ax. The present disclosure may also be applied to a newly proposed EHT standard or a new WLAN standard which has enhanced IEEE 802.11be.

Hereinafter, technical features of the WLAN system to which the present disclosure may be applied will be described to describe the technical features of the present disclosure.

In this specification, a band or frequency band may mean a frequency domain in which multiple channels are used/supported/defined. For example, a frequency band may include a 2.4 GHz, 5 GHz, 6 GHz, or 60 GHz band. Within the frequency band, multiple channels of 20 MHz, 40 MHz, 80 MHz, or 160 MHz, and so on, may be used/supported/defined. Channel numbers may be assigned for the multiple channels. In this specification, channel attributes (e.g., center frequency and/or bandwidth) according to the channel numbers may be predetermined.

Figure 1:
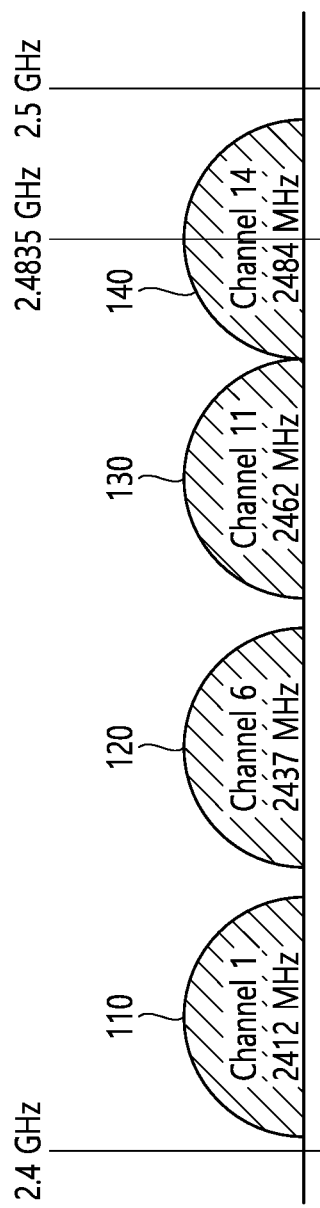
FIG. 1 illustrates an example of a channel used/supported/defined in a 2.4 GHz band.

FIG. 1 illustrates an example of channels used/supported/defined in a 2.4 GHz band.

The 2.4 GHz band may be referred to by other names such as a first band or the like. In addition, the 2.4 GHz band may refer to a frequency region in which channels with a center frequency adjacent to 2.4 GHz (e.g., channels with a center frequency located in 2.4 to 2.5 GHz) are used/supported/defined.

The 2.4 GHz band may include multiple 20 MHz channels. 20 MHz in the 2.4 GHz band may have multiple channel indexes (e.g., index 1 to index 14). For example, a center frequency of a 20 MHz channel to which channel index 1 is assigned may be 2.412 GHz, a center frequency of the 20 MHz channel to which channel index 2 is assigned may be 2.417 GHz, and a center frequency of the 20 MHz channel to which channel index N is assigned may be (2.407+0.005*N) GHz. The channel index may be referred to by various names such as channel number or the like. Specific values of the channel index and the center frequency may be changed.

FIG. 1 exemplarily illustrates four channels in a 2.4 GHz band. The illustrated first to fourth frequency regions (110 to 140) may each include one channel. For example, a first frequency region (110) may include channel #1 (a 20 MHz channel having index 1). Here, a center frequency of channel #1 may be set to 2412 MHz. A second frequency region (120) may include channel #6. Here, a center frequency of channel #6 may be set to 2437 MHz. A third frequency region (130) may include channel #11. Here, a center frequency of channel #11 may be set to 2462 MHz. A fourth frequency region (140) may include channel #14. Here, a center frequency of channel #14 may be set to 2484 MHz.

Figure 2:
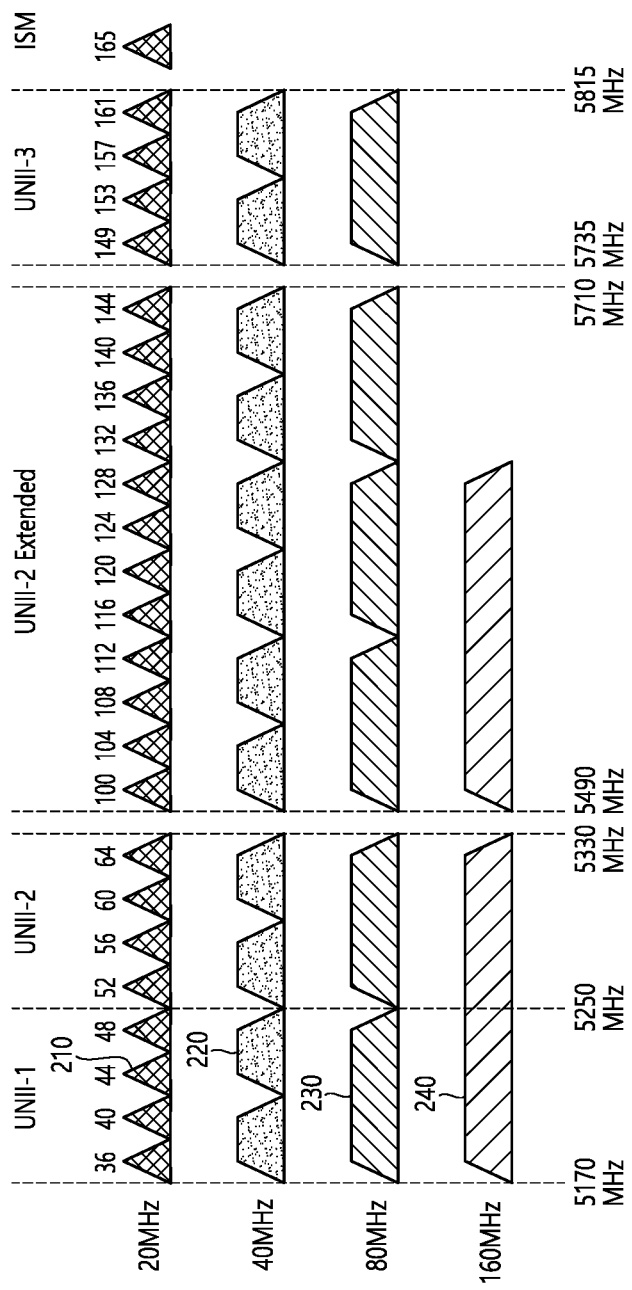
FIG. 2 illustrates an example of a channel used/supported/defined in a 5 GHz band.

FIG. 2 illustrates an example of a channel used/supported/defined in a 5 GHz band.

The 5 GHz band may be referred to by other names such as a second band. The 5 GHz band may refer to a frequency region (or frequency range) in which channels having a center frequency of 5 GHz or higher and less than 6 GHz (or less than 5.9 GHz) are used/supported/defined. Alternatively, the 5 GHz band may include a plurality of channels between 4.5 GHz and 5.5 GHz. The specific values illustrated in FIG. 2 may be changed.

A plurality of channels in the 5 GHz band include unlicensed national information infrastructure (UNII)-1, UNII-2, UNII-3, and ISM. UNII-1 may be called UNII Low. UNII-2 may include a frequency region called UNII Mid and UNII-2 Extended. UNII-3 may be called UNII-Upper.

A plurality of channels may be set in the 5 GHz band, and a bandwidth of each channel may be variously set to 20 MHz, 40 MHz, 80 MHz, or 160 MHz. For example, the 5170 MHz to 5330 MHz frequency region/range in UNII-1 and UNII-2 may be divided into eight 20 MHz channels. The 5170 MHz to 5330 MHz frequency region/range may be divided into four channels through the 40 MHz frequency region. The 5170 MHz to 5330 MHz frequency region/range may be divided into two channels through the 80 MHz frequency region. Alternatively, the 5170 MHz to 5330 MHz frequency region/range may be divided into one channel through the 160 MHz frequency region.

Figure 3:
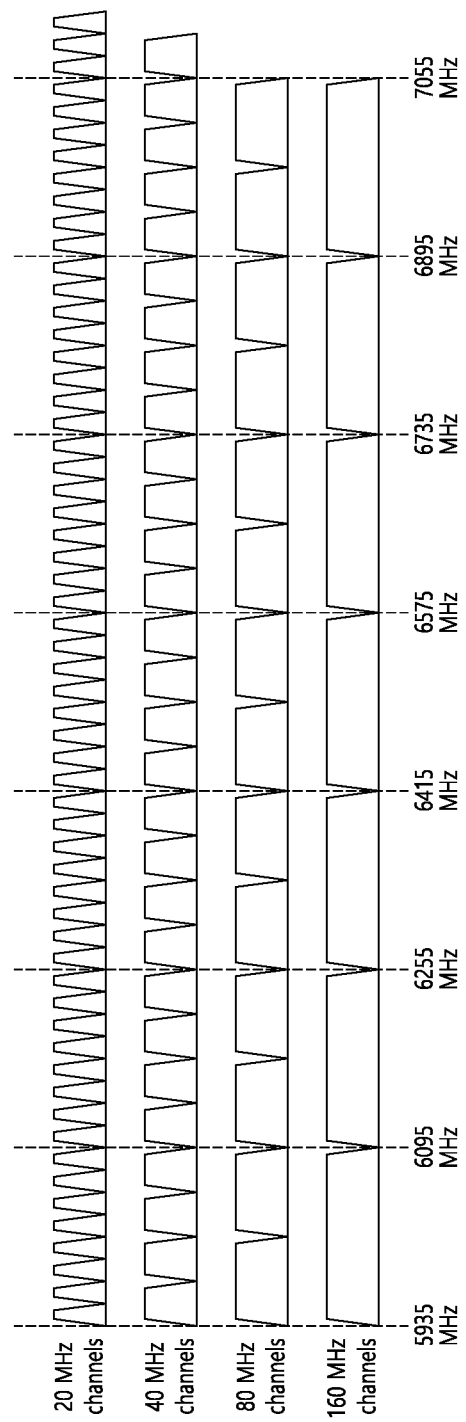
FIG. 3 illustrates an example of channels used/supported/defined in a 6 GHz band.

FIG. 3 illustrates an example of channels used/supported/defined in a 6 GHz band.

The 6 GHz band may be referred to by other names such as a third band. The 6 GHz band may refer to a frequency range in which channels having a center frequency of 5.9 GHz or higher are used/supported/defined. Specific numerical values illustrated in FIG. 3 may be changed.

For example, the 20 MHz channel of FIG. 3 may be defined from 5.940 GHz. Specifically, the leftmost channel among the 20 MHz channels of FIG. 3 may have an index number #1 (or a channel index, a channel number, etc.) and a center frequency of 5.945 GHz may be allocated. That is, the center frequency of channel having the index #N may be determined as (5.940+0.005*N) GHz.

Accordingly, indexes (or channel numbers) of the 20 MHz channel of FIG. 3 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. In addition, according to the aforementioned (5.940+0.005*N) GHz rule, indexes of the 40 MHz channel of FIG. 3 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227.

In the example of FIG. 3, 20, 40, 80, and 160 MHz channels are shown, but additionally, a 240 MHz channel or a 320 MHz channel may be added.

Hereinafter, a concept of conventional channel bonding will be described.

For example, in the IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding on a primary 20 MHz channel (P20 channel) and a secondary 20 MHz channel (S20 channel). In the channel bonding process, a backoff count/counter may be used. A backoff count value may be selected as a random value and may be decreased during a backoff interval. In general, when the backoff count value becomes 0, the STA may attempt to access the channel.

The STA performing channel bonding determines whether S20 channel has been maintained in an idle state during a predetermined period (e.g., point coordination function interframe space (PIFS)) at a time point when P20 channel is determined to be idle during a backoff interval and a backoff count value for P20 channel is 0. If the S20 channel is idle, the STA may perform bonding on the P20 channel and the S20 channel. That is, the STA may transmit a signal (PPDU) through a 40 MHz channel (i.e., a 40 MHz bonding channel) including the P20 channel and the S20 channel.

Figure 4:
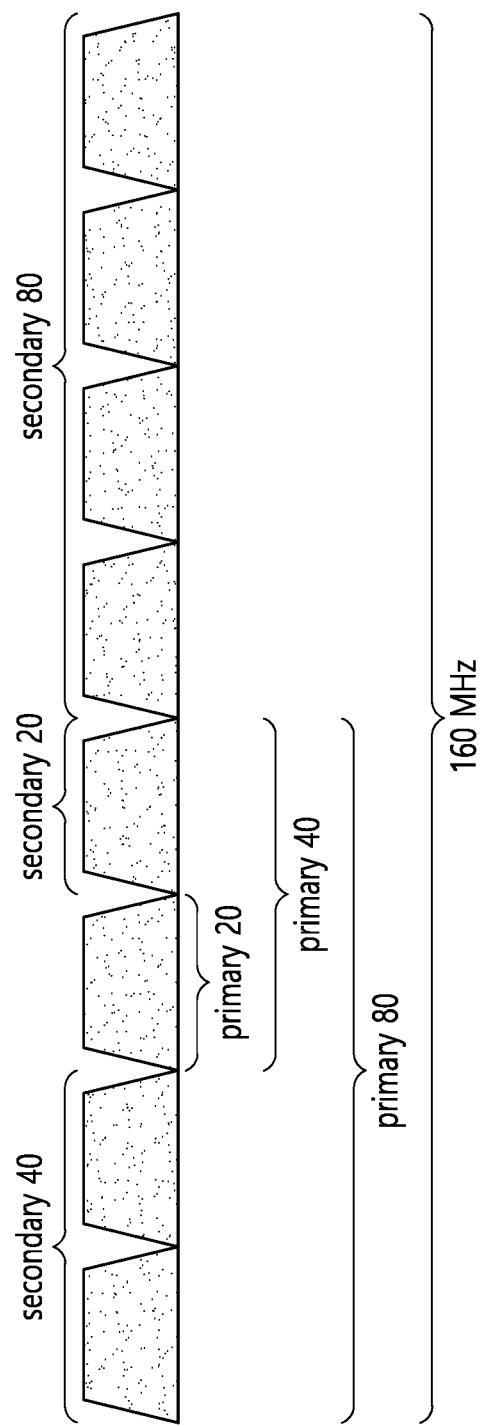
FIG. 4 illustrates an example of channel bonding.

FIG. 4 illustrates an example of channel bonding. As illustrated in FIG. 4, primary 20 MHz channel and secondary 20 MHz channel may configure a 40 MHz channel (primary 40 MHz channel) through channel bonding. That is, the bonded 40 MHz channel may include the primary 20 MHz channel and the secondary 20 MHz channel.

Channel bonding may be performed when a channel consecutive to the primary channel is idle. That is, primary 20 MHz channel, secondary 20 MHz channel, secondary 40 MHz channel, and secondary 80 MHz channel may be sequentially bonded. If the secondary 20 MHz channel is determined to be busy, channel bonding may not be performed even if other secondary channels are all idle. In addition, when it is determined that the secondary 20 MHz channel is idle and the secondary 40 MHz channel is busy, channel bonding may be performed only on the primary 20 MHz channel and the secondary 20 MHz channel.

The wireless LAN system includes one or more Basic Service Sets (BSSs). The BSS is a set of stations (STAs) which are successfully synchronized so as to be capable of communicating with each other. The BSS is not a concept indicating a specific region.

An infrastructure BSS includes one or more non-AP stations (non-AP STA1, non-AP STA2, non-AP STA3, non-AP STA4, non-AP STAa), an access point (AP) providing distribution services, and a distribution system (DS) connecting multiple APs. In an infrastructure BSS, the AP manages non-AP STAs of a BSS.

Conversely, an independent BSS (IBSS) is a BSS that operates in an Ad-Hoc mode. Since the IBSS does not include an access point (AP), a centralized management entity that performs a management function at the center does not exist. That is, in the IBSS, non-AP STAs are managed by a distributed manner. In the IBSS, all STAs may be constituted by movable STAs and constitute a self-contained network, since the STAs are not permitted to access the DS.

An STA is an arbitrary functional medium including medium access control (MAC) conforming to regulations of the Institute of Electrical and Electronics Engineers (IEEE) 802.11 standard and a physical layer interface for a wireless medium, and the STA may be used as a broad meaning including both an AP and a non-AP station.

A non-AP STA is an STA that is not an AP. Herein, the non-AP STA may also be referred to as a mobile terminal, a wireless device, a wireless transmit/receive unit (WTRU), user equipment (UE), a mobile station (MS), a mobile subscriber unit, or, simply, a user. Hereinafter, the non-AP STA will be referred to as an STA for convenience and simplicity in the description.

An AP is a functional entity that provides access to a DS by passing through a wireless medium for an STA that is associated with the corresponding AP. As a rule, communication between STAs in an infrastructure BSS including an AP is established by passing through the AP. However, in case a direct link is configured, direct communication may also be performed between the STAs. The AP may also be referred to as a central controller, a Base Station (BS), a Node-B, a Base Transceiver System (BTS), a site controller, or a managing STA.

Multiple infrastructure BSSs including a BSS may be interconnected through a Distribution System (DS). Multiple BSSs that are connected through a DS are referred to as an Extended Service Set (ESS). APs and/or STAs included in an ESS may communicate with one another. And, within a same ESS, an STA may move (or relocate) from one BSS to another BSS while performing communication without interruption In a wireless LAN system according to IEEE 802.11, a basic access mechanism of Medium Access Control (MAC) is a Carrier Sense Multiple Access with Collision Avoidance (CSMA/CA) mechanism. The CSMA/CA mechanism is also referred to as a Distributed Coordination Function (DCF) of IEEE 802.11 MAC and essentially adopts the "listen before talk" access mechanism. According to this type of access mechanism, before initiating transmitting the AP and/or STA senses a wireless channel or medium. Based on the sensing result, if it is determined that the medium is in an idle state, the AP and/or STA starts a frame transmission through the corresponding medium. Conversely, if the medium is sensed to be in an occupied state, instead of starting its transmission, the corresponding AP and/or STA configures a latency period for medium access and then waits.

The CSMA/CA mechanism may include virtual carrier sensing in addition to physical carrier sensing in which an AP and/or STA directly senses a medium. Virtual carrier sensing is used to compensate for any problem that may occur during access to a medium, such as a hidden node problem. For virtual carrier sensing, the MAC of a WLAN system uses a network allocation vector (NAV). The NAV is a value representing a time remaining for a medium to be available, which is indicated by an AP and/or STA currently using the medium or having the right (or authority) to use the medium to another AP and/or STA. Therefore, a value that is set as the NAV corresponds to a period during which an AP and/or STA transmitting the corresponding frame is scheduled to use a medium.

Along with DCF, an IEEE 802.11 MAC protocol provides a Hybrid Coordination Function (HCF) that is based on a Point Coordination Function (PCF), which periodically performs polling so that all receiving AP and/or STAs can receive data packets according to a polling-based synchronous access method. The HCF has an Enhanced Distributed Channel Access (EDCA) using a contention-based access method allowing a provider to provide data packets to multiple users and a HCF Controlled Channel Access (HCCA) using a non-contention based (or contention free) channel access method using a polling mechanism. The HCF includes a medium access mechanism for enhancing Quality of Service (QoS) of wireless LAN and may transmit QoS data to both contention period (CP) and contention free period (CFP).

In a wireless communication system, based on the characteristics of a wireless medium, when the power of an STA is turned on and its operations starts, the presence of a network cannot be known immediately. Therefore, regardless of the STA type, in order to access a network, the STA is required to perform a network discovery process. After discovering a network through the network discovery process, the STA selects a network to which it intends to subscribe through a network selection process. Thereafter, the corresponding STA subscribes to the selected network and performs data exchange operations with a transmitting end/receiving end.

In a wireless LAN system, the network discovery process is implemented as a scanning procedure. The scanning procedure is divided into passive scanning and active scanning. Passive scanning is performed based on a beacon frame periodically broadcasted by an AP. Generally, a wireless LAN AP broadcasts a beacon frame per specific interval (e.g., 100 msec). The beacon frame includes information on a BSS that it manages. The STA passively waits for the reception of a beacon frame in a specific channel. Once the STA obtains information on the network via beacon frame reception, the STA ends the scanning procedure in the specific channel. Since passive scanning is performed as long as the STA receives a beacon frame without having to transmit a separate frame, passive scanning is advantageous in that the overall overhead is small. However, passive scanning is disadvantageous in that the scanning time is extended in proportion to the transmission cycle period of the beacon frame.

In active scanning, an STA actively broadcasts a probe request frame from a specific channel and then requests network information from all APs that have received the broadcasted probe request frame. An AP, which has received the probe request frame, waits for a random period of time in order to prevent frame conflict (or collision) and, then, includes network information in a probe response frame and transmits the probe response frame to the corresponding STA. Thereafter, upon receiving the probe response frame and obtaining the network information, the STA ends the scanning procedure. Active scanning is advantageous in that the scanning procedure can be completed within a relatively short period of time. Conversely, since a request-response frame sequence is required, the overall overhead increases.

After completing the scanning procedure, the STA selects a network according to its specific standard and then performs an authentication procedure with the corresponding AP. The authentication procedure is carried out in the form of a 2-way handshake. After completing the authentication procedure, the STA carries out an association procedure with the corresponding AP.

The association procedure is also carried out in the form of a 2-way handshake. Firstly, the STA transmits an association request frame to the AP. The association request frame includes information on the capabilities of the STA. Based on this information, the AP determines whether or not to allow the AP to be associated with the corresponding STA. After determining whether or not to allow the association, the AP transmits an association response frame to the corresponding STA. The association response frame includes information indicating whether or not the association is allowed and information indicating reasons when the association is allowed/unsuccessful (or failed). The association response frame further includes information on capabilities that can be supported by the AP. In case the association is successfully completed, normal frame exchange is carried out between the AP and the STA. In case the association is unsuccessful (or failed), based on the information the reasons of failure included in the association response frame, the STA may attempt to performed the association procedure once again, or the STA may request association to another AP.

IEEE 802.11n is a technical standard that has been rather recently established in order to overcome the limitations in communication speed, which has been pointed out as the weak point of wireless LAN. An object of IEEE 802.11n is to increase network speed and reliability and to expand the operation range of the network. More specifically, IEEE 802.11n supports a high throughput (HT) having a data processing rate of up to 540 Mbps or more, and IEEE 802.11n is based on the Multiple Inputs and Multiple Outputs (MIMO) technology, which uses multiple antennas in both transmitters and receivers in order to minimize transmission errors and to optimize the data rate.

With the active supply of WLAN and diversification of applications using WLAN, the need for a new wireless LAN system that can support a higher throughput than the data processing speed supported by IEEE 802.11n has recently risen. A wireless LAN system supporting Very High Throughput (VHT) shall be the next version of the IEEE 802.11n wireless LAN system, which is one of the IEEE 802.11 wireless LAN systems that have recently been newly proposed to support a data processing rate of 1 Gbps or more for multiple users in a MAC service access point (SAP) and to support a throughput of 500 Mbps or more for a single user.

As a more improved version of the existing wireless LAN system, which supports 20 MHz and 40 MHz, the VHT wireless LAN system seeks to support 80 MHz, contiguous 160 MHz, non-contiguous 160 MHz bandwidth transmission, and/or a wider bandwidth transmission. In addition, as an improvement of the existing wireless LAN system, which supports a maximum of 64-Quadrature Amplitude Modulation (QAM), the VHT wireless LAN system supports 256QAM.

Since the VHT wireless LAN system supports a Multi User-Multiple Input Multiple Output (MU-MIMO) transmission method for a higher throughput, the AP may simultaneously transmit data frames to at least one or more MIMO-paired STAs. A number of the paired STAs may be equal to 4 or less. And, when the maximum number of spatial streams is equal to 8, each STA may be allocated with a maximum of 4 spatial streams.

In a wireless LAN system, an AP may simultaneously transmit data to an STA group, which includes one or more STAs, among a plurality of STAs being associated with the corresponding AP. Although an example of the AP performing MU-MIMO transmission to STAs is described herein, in a wireless LAN system supporting a Tunneled Direct Link Setup (TDLS) or Direct Link Setup (DLS), or a mesh network, an STA may use the MU-MIMO transmission method in order to transmit a PPDU to multiple STAs. Hereinafter, an example of an AP transmitting a PPDU to multiple STAs by using the MU-MIMO transmission method will be described in detail.

Data being transmitted to each STA may be transmitted through different spatial streams. As a PPDU being generated and transmitted from a physical layer of a wireless LAN system, or as a data field being included in the PPDU, a data packet that is transmitted by an AP (10) may be referred to as a frame. That is, a PPDU for single user (SU)-MIMO and/or MU-MIMO or a data field being included in the PPDU may be referred to as an MU packet. In the example of the present disclosure, it will be assumed that an STA group of transmission target STAs being MU-MIMO paired with the AP includes STA1, STA2, STA3, and STA4. At this point, since a spatial stream is not allocated to a specific STA of the transmission target STA group, data may not be transmitted. Meanwhile, although STAa is associated with the AP, it will be assumed that STAa is not included in the transmission target STA group.

In the wireless LAN system, in order to support MU-MIMO transmission, an identifier may be allocated for the transmission target STA group, and this will be referred to as a Group ID. The AP may transmit a Group ID management frame including group definition information for allocating a group ID to STAs supporting MU-MIMO transmission. And, accordingly, the group ID may be allocated to the STAs prior to the PPDU transmission. One STA may be allocated with multiple group IDs.

Figure 5:
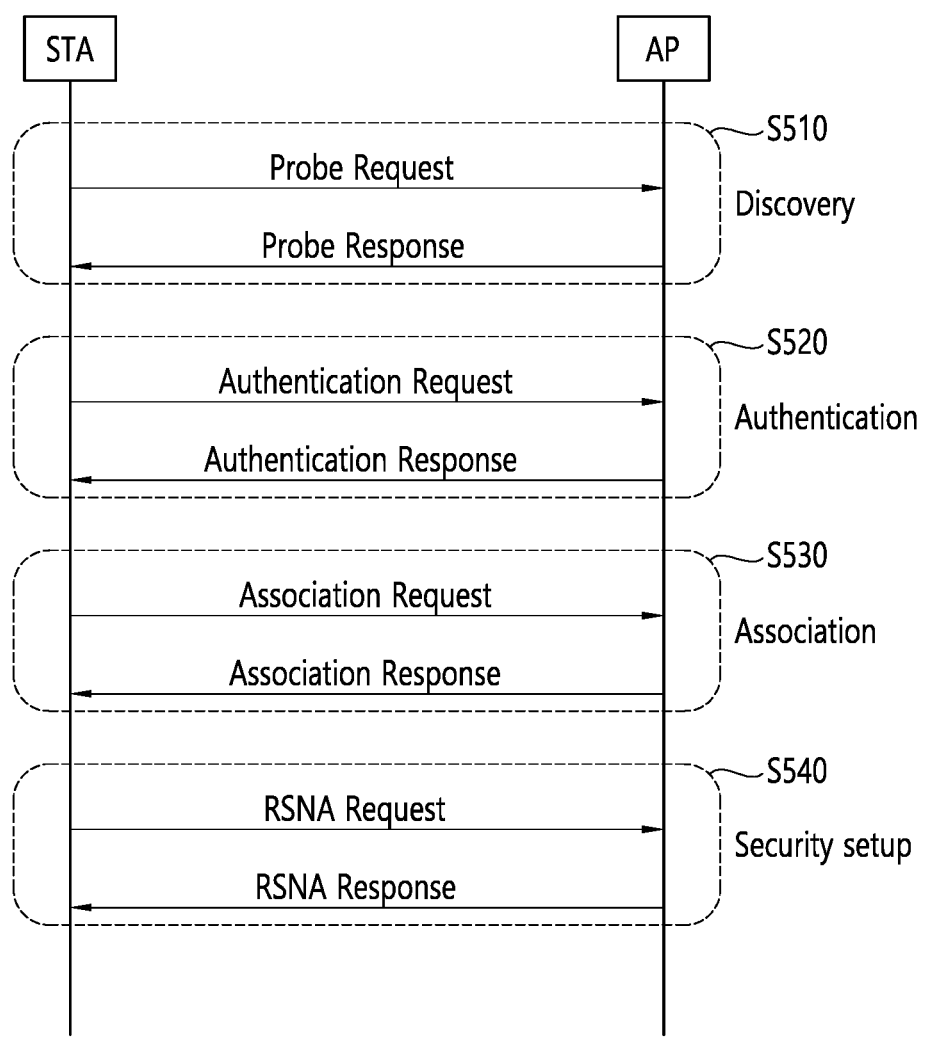
FIG. 5 is a diagram describing a general link setup process.

FIG. 5 is a diagram describing a general link setup process.

As shown in step S510, an STA may perform a network discovery operation. The network discovery operation may include a scanning operation of the STA. That is, in order to allow the STA to access a network, the STA needs to find (or discovery) of a network to which it can participate (or a network to which it can be involved). Before being involved in a wireless network, the STA needs to identify a compatible network, and the process of identifying a network that exists in a specific region is referred to as scanning. The scanning method includes active scanning and passive scanning.

FIG. 5 shows an exemplary network discovery operation including an active scanning process. In active scanning, the STA performing scanning moves to and from channels and transmits a probe request frame in order to search for neighboring APs existing in the surroundings. Then, the STA waits for a response to the transmitted probe request frame. A responder transmits a probe response frame to the STA, which has transmitted the probe request frame, as a response to the transmitted probe request frame. Herein, the responder may be a last STA that has transmitted a beacon frame from a BSS of a channel, which is being scanned. In a BSS, since an AP transmits a beacon frame, the AP may be the responder. And, in an IBSS, since STAs within the IBSS take turns in transmitting a beacon frame, the responder is not consistent. For example, an STA, which has transmitted a probe request frame in Channel Number 1, and which has received a probe response frame in Channel Number 1, may store the BSS-related information included in the received probe response frame. And, then, the STA may move to a next channel (e.g., channel Number 2) and may perform scanning (i.e., transmitting/receiving a probe request/response in Channel Number 2) by using the same method.

Although it is not indicated in the example of FIG. 5, the scanning operation may also be performed by using a passive scanning method. The STA that has performed scanning based on the passive scanning method may wait for a beacon frame while moving to and from channels. As one of the management frames in IEEE 802.11, the beacon frame is periodically transmitted in order to notify the presence of a wireless network to the STA, and to allow the STA to participate (or be involved) in the wireless network. In a BSS, the AP performs the role of periodically transmitting a beacon frame. And, in an IBSS, STAs take turns in transmitting a beacon frame. When an STA performing the scanning operation receives a beacon frame, the STA stores the information on the BSS, which is included in the beacon frame, and then moves to another channel and records beacon frame information from each channel. The STA that has received a beacon frame may store the BSS-related information included in the received beacon frame and may move to a next channel so as to perform scanning in the next channel by using the same method.

The STA that has discovered a network may perform an authentication process through step S520. In order to be clearly differentiated from a security setup process of step S540, which will be described in detail later on, the authentication process may be referred to as a first authentication process. The authentication process of S520 may include a process of having an STA transmit an authentication request frame to an AP, and having an AP transmit an authentication response frame to the corresponding STA in response to the authentication request frame. An authentication frame that is used for the authentication request/response corresponds to a management frame.

The authentication frame may include information on an authentication algorithm number, an authentication transaction sequence number, a status code, a challenge text, a Robust Security Network (RSN), a Finite Cyclic Group, and so on.

The STA may transmit an authentication request frame to the AP. Based on the information included in the authentication request frame, the AP may determine whether or not to authorize (or allow) the authentication of the corresponding STA. The AP may provide the authentication result to the STA through an authentication response frame.

The successfully authenticated STA may perform an association process based on step S530. The association process includes a process of having the STA transmit an association request frame to the AP, and a process of having the AP transmit an association response frame to the STA as a response to the association request frame. For example, the association request frame may include information related to various capabilities, and information on beacon listen intervals, service set identifiers (SSIDs), supported rates, supported channels, RSN, mobility domain, supported operating classes, Traffic Indication Map (TIM) Broadcast request, interworking service capabilities, and so on. For example, the association response frame may include information related to various capabilities, and information on status codes, Association ID (AID), supported rates, Enhanced Distributed Channel Access (EDCA) parameter sets, Received Channel Power Indicator (RCPI), Received Signal to Noise Indicator (RSNI), mobility domain, timeout intervals (association comeback time), overlapping BSS scan parameters, TIM Broadcast response, QoS map, and so on.

Thereafter, in step S540, the STA may perform a security setup process. The security setup process of step S540 may, for example, include a process of performing a private key setup via 4-way handshaking through an Extensible Authentication Protocol over LAN (EAPOL) frame.

Figure 6:
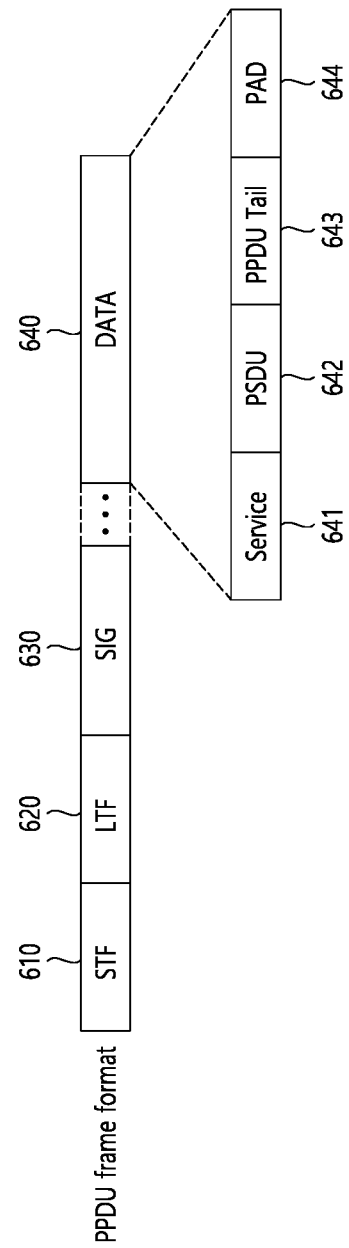
FIG. 6 shows an example of a PPDU being transmitted/received by an STA of this specification.

FIG. 6 shows an example of a PPDU being transmitted/received by an STA of this specification.

The example of FIG. 6 shows the representative fields of a PPDU. And, the order of the fields shown in FIG. 6 may be variously changed.

The PPDU of FIG. 6 may include a short training field (STF) (610).

The STF (610) may be specified as L-STF, HT-STF, VHT-STF, HE-STF, EHT-STF, and so on, which will be described in detail later on. The STF (610) may be used for frame detection, automatic gain control (AGC), diversity detection, coarse frequency/time synchronization, and so on.

The PPDU of FIG. 6 may include a long training field (LTF) (620).

The LTF (620) may be specified as L-LTF, HT-LTF, VHT-LTF, HE-LTF, EHT-LTF, and so on, which will be described in detail later on. The LTF (620) may be used for fine frequency/time synchronization and channel prediction.

The PPDU of FIG. 6 may include an SIG (630).

The SIG (630) may be specified as L-SIG, HT-SIG, VHT-SIG, HE-SIG, EHT-SIG, and so on, which will be described in detail later on. The SIG (630) may include control information for decoding the PPDU.

The PPDU of FIG. 6 may include a Data field (640).

The Data field (640) may include a SERVICE field (641), a Physical layer Service Data Unit (PSDU) (642), a PPDU TAIL bit (643), and a padding bit (644). Part of the bits of the SERVICE field (641) may be used for synchronization of a descrambler at the receiving end. The PSDU (642) corresponds to a MAC Protocol Data Unit (MPDU), which is defined in a MAC layer, and may include data being generated/used in a high layer. The PPDU TAIL bit (643) may be used in order to return an encoder to a 0 state. The padding bit (644) may be used for aligning (or matching) a data field length to a predetermined unit.

Figure 7:
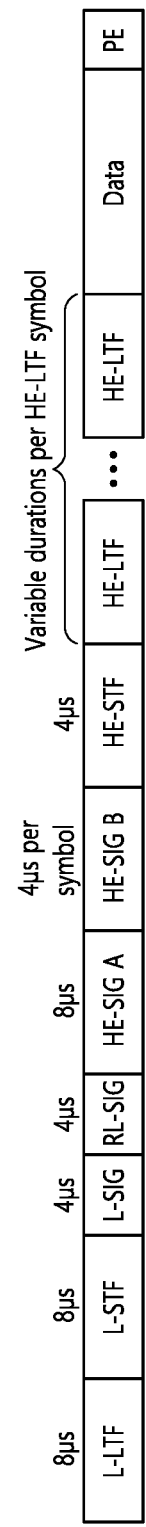
FIG. 7 is a diagram showing another example of an HE-PPDU.

FIG. 7 is a diagram showing another example of an HE-PPDU.

The example of FIG. 7 may be applied to an IEEE 802.11ax or high efficiency (HE) wireless LAN system. A PPDU format according to IEEE 802.11ax may be defined as 4 different types. And, the example of FIG. 7 shows an example of MU-PPDU, which is used in MU communication. However, part of the technical characteristics applied to the fields shown in FIG. 7 may also be used in SU communication or UL-MU communication, without modification.

The technical characteristics of HE-PPDU shown in FIG. 7 may also be applied to EHT-PPDU, which will be newly proposed. For example, the technical characteristics applied to HE-SIG may also be applied to EHT-SIG, and the technical characteristics applied to HE-STF/LTF may also be applied to EHT-SFT/LTF.

An L-STF shown in FIG. 7 may include a short training orthogonal frequency division multiplexing (OFDM) symbol. The L-STF may be used for frame detection, automatic gain control (AGC), diversity detection, and coarse frequency/time synchronization.

An L-LTF shown in FIG. 7 may include a long training orthogonal frequency division multiplexing (OFDM) symbol. The L-LTF may be used for fine frequency/time synchronization and channel prediction.

An L-SIG shown in FIG. 7 may be used for transmitting control information. The L-SIG may include information related to data rate and data length. Further, the L-SIG may be repeatedly transmitted. That is, a new format in which the L-SIG is repeated (e.g., this may be referred to as R-LSIG) may be configured.

An HE-SIG-A shown in FIG. 7 may include the control information common to the receiving stations.

More specifically, the HE-SIG-A may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field indicating whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth, 9) a field indicating the number of symbols of the HE-LTF, 10) a field indicating the length of the HE-LTF and a CP length, 11) a field indicating whether an OFDM symbol exists for LDPC coding, 12) a field indicating control information related to packet extension (PE), 13) a field indicating information on a CRC field of the HE-SIG-A, and so on. A detailed field of the HE-SIG-A may be added or partially omitted. Further, some fields of the HE-SIG-A may be partially added or omitted in other environments other than a multi-user (MU) environment.

An HE-SIG-B shown in FIG. 7 may be included only in a case where the PPDU is for multiple users (MUs), as described above. Principally, an HE-SIG-A or an HE-SIG-B may include resource allocation information (or virtual resource allocation information) for at least one receiving STA.

The HE-STF shown in FIG. 7 may be used for enhancing automatic gain control estimation in a multiple input multiple output (MIMO) environment or OFDMA environment.

The HE-LTF shown in FIG. 7 may be used for estimating a channel in the MIMO environment or OFDMA environment.

The size of fast Fourier transform (FFT)/inverse fast Fourier transform (IFFT) applied to the HE-STF and the fields after the HE-STF, as shown in FIG. 7, and the size of the FFT/IFFT applied to the fields before the HE-STF may be different. For example, the size of the FFT/IFFT applied to the HE-STF and the fields after the HE-STF may be four times larger than the size of the FFT/IFFT applied to the fields before the HE-STF.

For example, when at least one of the L-STF, L-LTF, L-SIG, HE-SIG-A, and HE-SIG-B fields on the PPDU of FIG. 7 is referred to as a first field/part, at least one of the data field, HE-STF, and HE-LTF may be referred to as a second field/part. The first field may include a field related to a legacy system and the second field may include a field related to an HE system. In this case, the fast Fourier transform (FFT) size and the inverse fast Fourier transform (IFFT) size may be defined as a size which is N times (wherein N is a natural number, e.g., N=1, 2, and 4) larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of contiguous 160 MHz or non-contiguous 160 MHz.

In other words, subcarrier spacing may have a size which is 1/N times (wherein N is the natural number, e.g., N=4, the subcarrier spacing is set to 78.125 kHz) the subcarrier spacing used in the legacy wireless LAN system. That is, subcarrier spacing having a size of 312.5 kHz, which is the legacy subcarrier spacing, may be applied to the first field/part of the HE PPDU and a subcarrier spacing having a size of 78.125 kHz may be applied to the second field/part of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs, and the IDFT/DFT length applied to each symbol of the second field of the HE PPDU may be expressed as 3.2 μs*4 (=12.8 μs). The length of the OFDM symbol may be a value that is obtained by adding the length of a guard interval (GI) to the IDFT/DFT length. The length of the GI may have various values such as 0.4 μs, 0.8 μs, 1.6 μs, 2.4 μs, and 3.2 μs.

As described above, the technical characteristic wherein different subcarrier spacing sizes are applied to one PPDU may be directly applied to EHT-PPDU as well. That is, the subcarrier spacing having a size of 312.5 kHz may be applied to the first field/part of the EHT-PPDU and the subcarrier spacing having a size of 78.125 kHz may be applied to the second field/part of the EHT-PPDU. The first field/part of the EHT-PPDU may include L-LTF, L-STF, L-SIG, EHT-SIG-A, and/or EHT-SIG-B. And, the second field/part of the EHT-PPDU may include EHT-STF, EHT-LTF, and/or data field. Such differentiation of the first part/second part of the EHT-PPDU may be varied.

In addition, UL MU communication is also supported in the WLAN system. A trigger frame is defined for UL MU communication. The trigger frame may include ID information on a plurality of STAs participating in UL MU communication and radio resources (e.g., RU information) used in UL MU communication.

Figure 8:
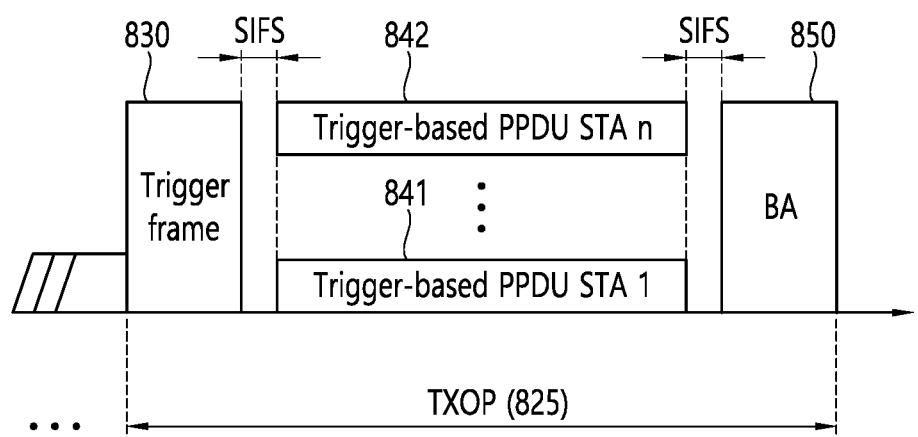
FIG. 8 illustrates an example of UL MU communication.

FIG. 8 illustrates an example of UL MU communication.

According to the example of FIG. 8, the AP transmits a trigger frame (830). The trigger frame may be defined in the form of a MAC frame and may be included in a PPDU of various formats and transmitted from the AP. That is, when a PPDU including the trigger frame (830) is received by the STA, UL MU communication starts after a short interframe space (SIFS) period. Specifically, a plurality of STAs (i.e., STA 1 to STA n) indicated by the trigger frame (830) perform UL-MU communication based on an uplink resource (i.e., RU) indicated by the trigger frame 830. Specifically, the plurality of STAs (i.e., STA 1 to STA n) transmits a trigger-based (TB) PPDU according to the IEEE 802.11ax standard to the AP. A plurality of TB PPDUs transmitted by the plurality of STAs is transmitted in the same time period, and information on the same time period may be included in the trigger frame (830). Thereafter, the AP may transmit an ACK/NACK signal for TB PPDUs (841 and 842) through a block ACK (BA). UL MU communication may be performed within a TXOP (825) period acquired by the AP.

Figure 9:
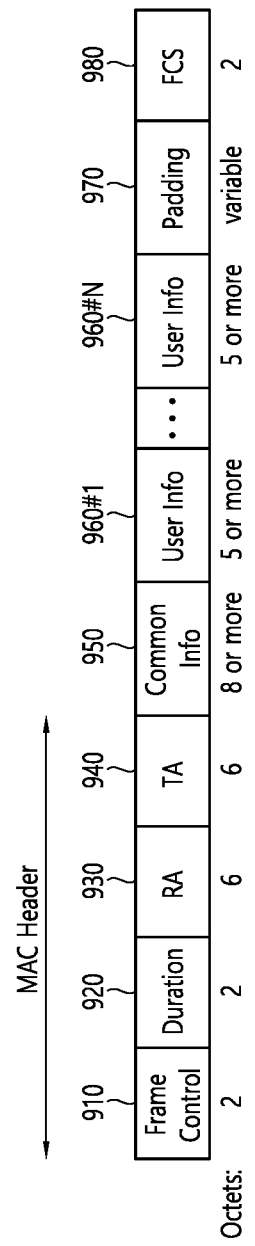
FIG. 9 illustrates an example of a trigger frame.

FIG. 9 illustrates an example of a trigger frame. The trigger frame of FIG. 9 may allocate resources for uplink multi-user transmission (MU) and may be transmitted from the AP. The trigger frame may include a MAC frame and may be included in a PPDU.

Some of the fields illustrated in FIG. 9 may be omitted and other fields may be added. Also, a length of each field may be changed to be different from that shown.

A frame control field (910) of FIG. 9 may include information on a version of a MAC protocol and other additional control information, and a duration field (920) may include time information for setting up a network allocation vector (NAV) described below or information on an identifier (e.g., AID) of the terminal.

In addition, an RA field (930) may include address information of a receiving STA of the corresponding trigger frame and may be omitted as necessary. A TA field (940) includes address information of an STA (e.g., AP) that transmits the corresponding trigger frame, and a common information field (950) includes common control information applied to the receiving STA that receives the corresponding trigger frame.

Figure 10:
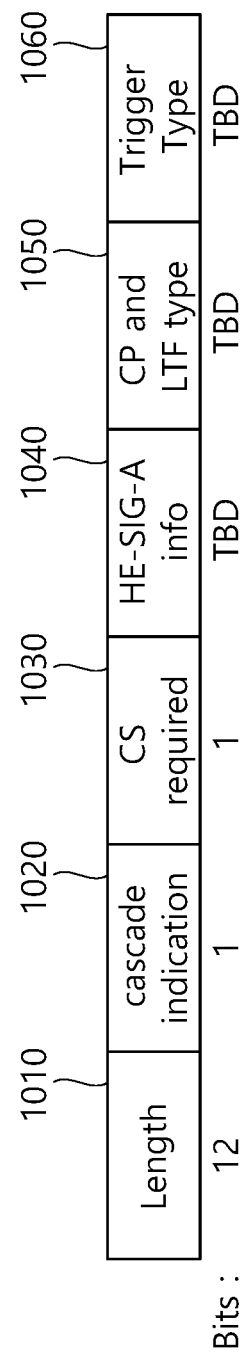
FIG. 10 illustrates an example of a common information field.

FIG. 10 illustrates an example of a common information field. Some of the subfields of FIG. 10 may be omitted and other subfields may be added. In addition, a length of each of the illustrated subfields may be changed.

An illustrated length field (1010) has the same value as a length field of an L-SIG field of an uplink PPDU transmitted in response to a corresponding trigger frame, and the length field of the L-SIG field of the uplink PPDU represents a length of the uplink PPDU. As a result, the length field (1010) of the trigger frame may be used to indicate the length of the corresponding uplink PPDU.

In addition, a cascade indication field (1020) indicates whether a cascade operation is performed. The cascade operation means that downlink MU transmission and uplink MU transmission are performed together in the same TXOP. That is, it means that, after downlink MU transmission is performed, uplink MU transmission is performed after a preset time (e.g., SIFS). During the cascade operation, only one transmitting device (e.g., AP) that performs downlink communication may exist and a plurality of transmitting devices (e.g., non-APs) that perform uplink communication may exist.

A CS required field (1030) indicates whether to consider a state of a wireless medium or a network allocation vector (NAV) in a situation in which a receiving device receiving the corresponding trigger frame transmits a corresponding uplink PPDU.

An HE-SIG-A information field (1040) includes information for controlling content of an SIG-A field (i.e., HE-SIG A field) of the uplink PPDU transmitted in response to the corresponding trigger frame.

A CP and LTF type field (1050) may include information on a length of an LTF and a length of a CP of the uplink PPDU transmitted in response to the corresponding trigger frame. A trigger type field (1060) may indicate a purpose for using the corresponding trigger frame, for example, normal triggering, triggering for beamforming, a request for block ACK/NACK, and the like.

Meanwhile, a remaining description of FIG. 9 is added as follows.

It is preferred to include per user information fields (960#1 to 960#N) corresponding to the number of receiving STAs that receive the trigger frame of FIG. 9. The per user information fields may be referred to as "RU allocation fields".

In addition, the trigger frame of FIG. 9 may include a padding field (970) and a frame check sequence field (980).

It is preferred that each of the per user information fields (960#1 to 960#N) illustrated in FIG. 9 includes a plurality of subfields.

Figure 11:
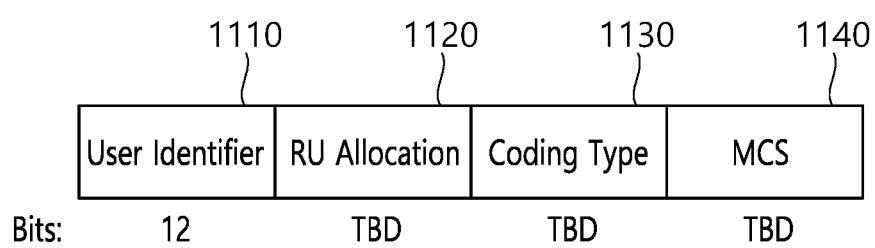
FIG. 11 illustrates an example of a subfield included in a per user information field.

FIG. 11 illustrates an example of subfields included in the per user information field. Some of the subfields of FIG. 11 may be omitted and other subfields may be added. In addition, a length of each of the illustrated subfields may be changed.

A user identifier field (1110) of FIG. 11 indicates an identifier of an STA (i.e., a receiving STA) to which per user information corresponds, and an example of the identifier may be the entirety of a portion of an AID.

In addition, an RU Allocation field (1120) may be included. That is, when the receiving STA identified by the user identifier field (1110) transmits an uplink PPDU in response to the trigger frame of FIG. 9, the receiving STA transmits the corresponding uplink PPDU through an RU indicated by the RU allocation field (1120). In this case, it is preferable that the RU indicated by the RU allocation field (1120) indicates the RUs illustrated in FIGS. 9, 10, and 11.

The subfields of FIG. 11 may include a coding type field (1130). The coding type field (1130) may indicate a coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Further, the subfields of FIG. 11 may include an MCS field (1140). The MCS field (1140) may indicate an MCS scheme applied to the uplink PPDU transmitted in response to the trigger frame of FIG. 9.

Meanwhile, the STA may transmit various feedback schedules (e.g., buffer status report or information on a channel status) based on UL OFDMA random access (UORA) defined according to the IEEE 802.11ax standard.

Figure 12:
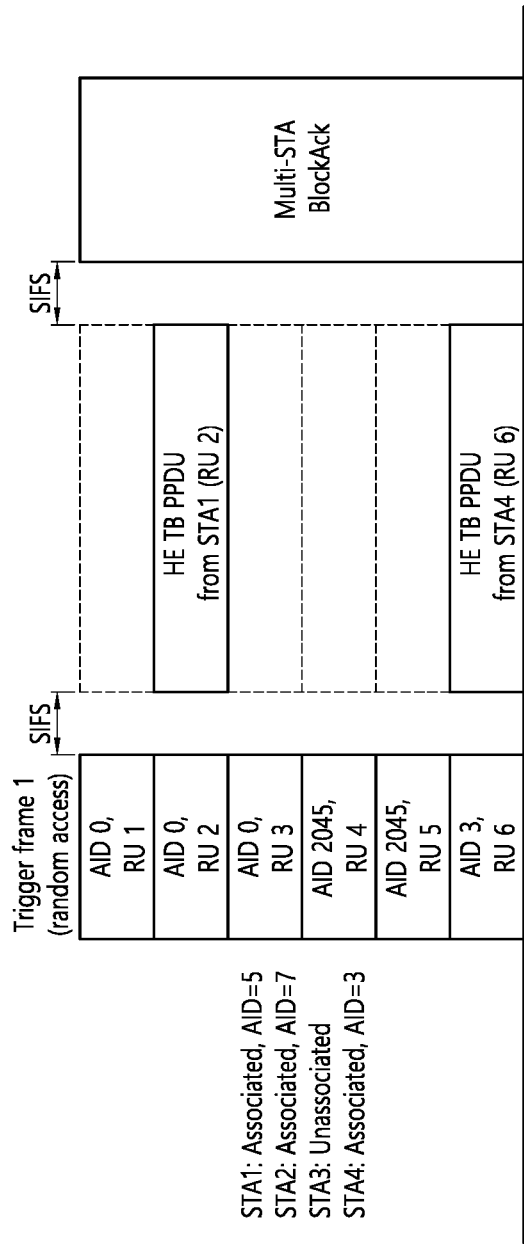
FIG. 12 illustrates a method of performing UORA in a WLAN system.

FIG. 12 illustrates a method of performing UORA in a WLAN system.

As illustrated, the AP may allocate six RU resources as illustrated in FIG. 12 through a trigger frame (e.g., FIGS. 9 to 11). Specifically, the AP may allocate a first RU resource (AID 0, RU 1), a second RU resource (AID 0, RU 2), a third RU resource (AID 0, RU 3), a fourth RU resource (AID 2045, RU 4), a fifth RU resource (AID 2045, RU 5), and a sixth RU resource (AID 2045, RU 6). Information on AID 0 or AID 2045 may be included, for example, in the user identification field of FIG. 11. Information on RU 1 to RU 6 may be included, for example, in the RU allocation field of FIG. 11. AID=0 may refer to a UORA resource for an associated STA, and AID=2045 may refer to a UORA resource for an unassociated STA. Accordingly, the first to third RU resources of FIG. 12 may be used as UORA resources for the associated STA, the fourth and fifth RU resources of FIG. 12 may be used for the unassociated STA, and the sixth RU resource of FIG. 12 may be used as a resource for a normal UL MU.

In the example of FIG. 12, an OFDMA random access BackOff (OBO) counter of STA1 is reduced to 0, so that STA1 randomly selects the second RU resource (AID 0, RU 2). In addition, since an OBO counter of STA2/3 is greater than 0, uplink resources are not allocated to STA2/3. In addition, since an AID (i.e., AID=3) of the STA4 is included in the trigger frame in FIG. 12, the resource of RU 6 is allocated to the STA4 without backoff.

Specifically, since STA1 of FIG. 12 is an associated STA, there are a total of three eligible RA RUs (RU 1, RU 2, and RU 3) for STA1, and accordingly, STA1 decreases the OBO counter by 3, and thus the OBO counter is zero. In addition, since STA2 of FIG. 12 is an associated STA, there are a total of 3 eligible RA RUs (RU 1, RU 2, and RU 3) for STA2, and accordingly, STA2 decreases the OBO counter by 3, but the OBO counter is greater than 0. In addition, since STA3 of FIG. 12 is an unassociated STA, there are a total of two eligible RA RUs (RU 4 and RU 5) for STA3, and accordingly, STA3 decreases the OBO counter by 2, but the OBO counter is greater than 0.

Figure 13:
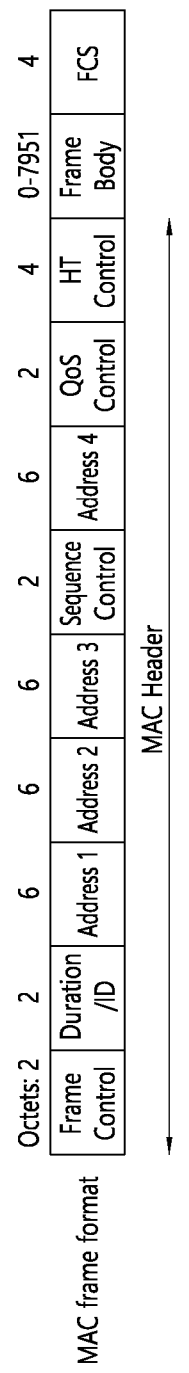
FIG. 13 illustrates an example of a MAC frame.

FIG. 13 illustrates an example of a MAC frame.

The MAC frame of FIG. 13 may be included in a physical layer service data unit (PSDU) included in the data field of the PPDU. A length of each field illustrated in FIG. 13 may be changed, and some of the fields may be omitted. As shown, the MAC frame may include a MAC header.

The data field may include a service field, a physical layer service data unit (PSDU), and a PPDU tail bit, and may optionally include a padding bit. Some bits of the service field may be used for synchronization of a descrambler at a receiving end. The PSDU may correspond to a MAC protocol data unit (MPDU) defined in a MAC layer and may include data generated/used in a higher layer. The PPDU tail bit may be used to return an encoder to a zero state. The padding bit may be used to adjust the length of the data field in a specific unit.

The MPDU is defined according to various MAC frame formats, and a basic MAC frame includes a MAC header, a frame body, and a frame check sequence (FCS). The MAC frame may include an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a subtype, whether it is transmitted during a contention free period (CFP), QoS capability of a transmitting STA, or the like. In a control frame of which a subtype is PS-poll, the duration/ID field may include an AID of a transmitting STA (e.g., through 14 LSBs), and two MSBs may be set to 1. (ii) In frames transmitted by a point coordinator (PC) or a non-QoS STA during a CFP, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, the duration/ID field is used to indicate a TXOP duration, and B0 to B14 may be used to indicate an actual TXOP duration. The actual TXOP duration indicated by B0 to B14 may be any one of 0 to 32767, and a unit thereof may be a microsecond (us). However, if the duration/ID field indicates a fixed TXOP duration value (e.g., 32768), B15=1 and B0 to B14=0. If set to B14=1 and B15=1, the duration/ID field is used to indicate an AID, and B0 to B13 indicate one AID ranging from 1 to 2007.

A frame control field of the MAC header may include Protocol Version, Type, Subtype, To DS, From DS, More Fragment, Retry, Power Management, More Data, Protected Frame, and Order subfields.

Hereinafter, a resource unit (RU) used in the PPDU will be described. The RU may include a plurality of subcarriers (or tones). The RU may be used in the case of transmitting signals to multiple STAs based on the OFDMA technique. Also, the RU may be defined even when a signal is transmitted to one STA. The RU may be used for STF, LTF, data field, and the like.

Figure 14:
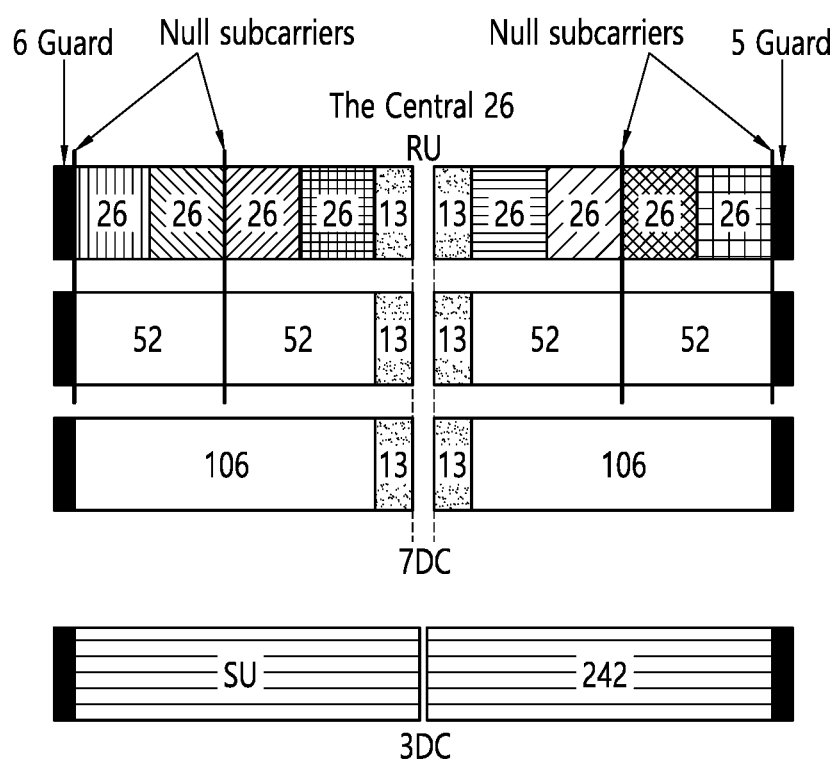
FIG. 14 illustrates a layout of resource units (RUs) used in a 20 MHz band.

FIG. 14 illustrates a layout of resource units (RUs) used in a band of 20 MHz.

As illustrated in FIG. 14, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 14, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 14 may be used not only for multiple users (MUs) but also for a single user (SU), in which case one 242-unit may be used and three DC tones may be inserted as illustrated in the lowermost part of FIG. 14.

Although FIG. 14 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 15:
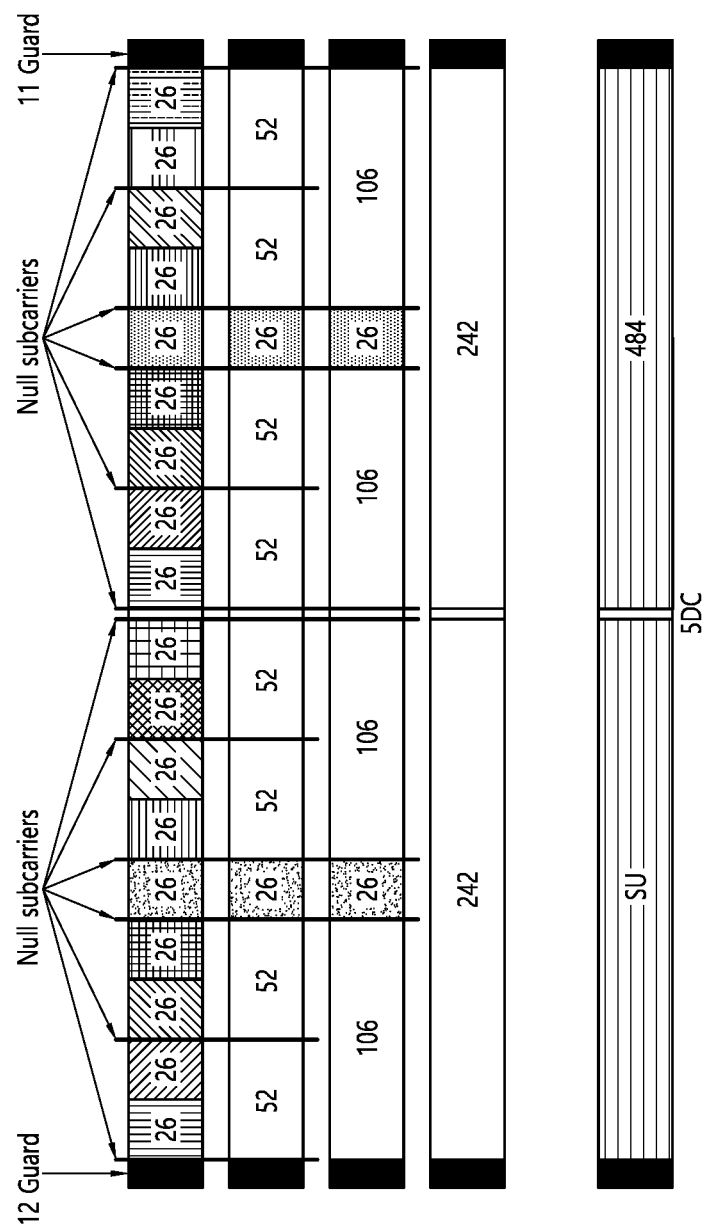
FIG. 15 illustrates a layout of RUs used in a 40 MHz band.

FIG. 15 illustrates a layout of RUs used in a band of 40 MHz.

Similarly to FIG. 9 in which RUs having various sizes are used, a 26-RU, a 52-RU, a 106-RU, a 242-RU, a 484-RU, and the like may be used in an example of FIG. 15. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 15, when the layout of the RUs is used for a single user, a 484-RU may be used. The specific number of RUs may be changed similarly to FIG. 14.

Figure 16:
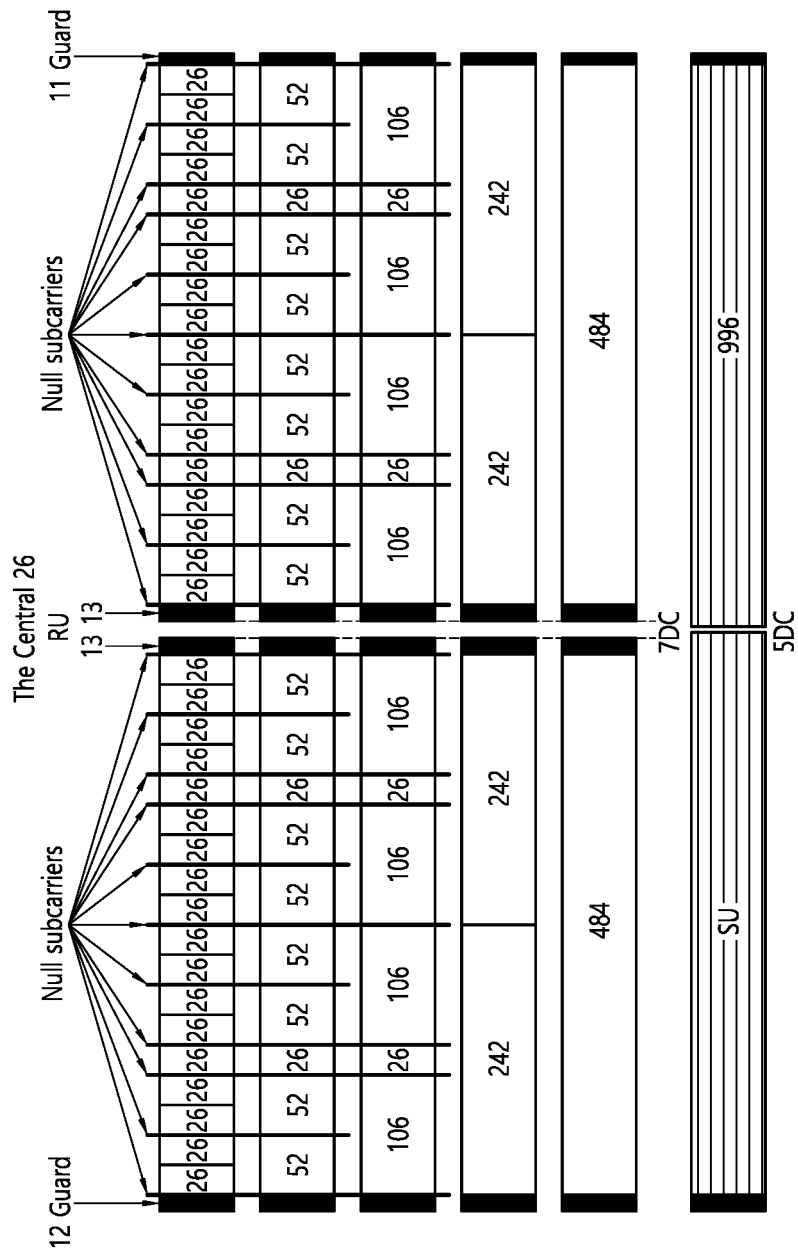
FIG. 16 illustrates a layout of RUs used in an 80 MHz band.

FIG. 16 illustrates a layout of RUs used in a band of 80 MHz.

Similarly to FIG. 14 and FIG. 15 in which RUs having various sizes are used, a 26-RU, a 52-RU, a 106-RU, a 242-RU, a 484-RU, a 996-RU, and the like may be used in an example of FIG. 16. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 16, when the layout of the RUs is used for a single user, a 996-RU may be used, in which case five DC tones may be inserted.

The specific number of RUs may be changed similarly to FIG. 14 and FIG. 15.

In the conventional 11ax, a tone plan for full band and OFDMA transmission is designed at 20/40/80/80+80/160 MHz, and a 160 MHz tone plan is used by simply repeating the existing 80 MHz tone plan two times. This is designed by considering a case of performing transmission based on two RFs. And, therefore, this may be an appropriate tone plan for a case of non-contiguous 80+80 MHz. However, in a case of contiguous 160 MHz, a situation where transmission is performed by using one RF may be considered. And, in this case, since a large number of subcarriers are wasted in the existing (or conventional) tone plan, a new tone plan for increasing efficiency and throughput of the subcarriers that are being used may be proposed.

1. New 160 MHz Tone Plan

<Full Band>

In case of performing transmission by using a full band, a new RU may be proposed, and a size of the new RU may be determined by considering various DCs in accordance with an influence of a DC offset and by considering a 160 MHz Guard tone of the conventional 11ax. The existing 11ax guard tones are left 12 and right 11, and the number of DCs of 80 MHz is equal to 5 or 7. Based on this structure, the new RU of a full band is 2020RU or 2018RU.

12/11 guard tone, 5DC, 2020RU

12/11 guard tone, 7DC, 2018RU

Considering the influence of the DC offset at 160 MHz, it is not preferable to use less than 5/7 DCs, which is the number(s) of DCs used at 80 MHz, and 5/7 DCs may be sufficient in light of performance (or capability). Considering the following OFDMA tone plan, a maximum of 7 DCs may be appropriate. The DCs in the OFDMA tone plan shown below are designed based on 7DC and 5DC in the existing 80 MHz OFDMA tone plan. And, it is not preferable to use DCs that are less than 5 DCs, and, in light of performance, 5/7 DCs may be sufficient. 7DC is used at 20 MHz and 80 MHz, wherein central 26RU (13+13 RUs) is used in the existing 11ax.

<OFDMA Tone Plan>

The OFDMA tone plan may be expressed by using the existing 996RU and 26RU (13+13 RUs) as shown below. In the following structure, G denotes guard tone, and N denotes null tone.

12G+996RU+13RU+7DC+13RU+996RU+11G
12G+996RU+1N+13RU+5DC+13RU+1N+996RU+11G

In the structures presented above, the number of DCs and the number of null subcarriers on both sides may be configured by the performance of the central 26RU (13+13 RUs) according to the influence of the DC offset and interference. Considering the influence of interference, 5 DCs and 1 null carrier on both sides may be an advantageous structure.

Two types of configurations of 996RU may be proposed as follows.

996RU=484RU+1N+26RU+1N+484RU
996RU=1N+484RU+26RU+484RU+1N

The first structure is configured to reduce the influence of the interference from/to an adjacent RU by putting a null tone on both sides of the 26RU, and the second structure is configured to reduce the influence of the interference between 484RU and its adjacent RU. Since a RU using a small number of subcarriers, such as 26RU, causes significant influence on performance, it may be preferable to use the first structure.

The 484RU has a structure of two 242RUs as in the existing 11ax.

484RU=242RU+242RU

The 242RU has the following structure as in the existing 11ax.

242RU=1N+106RU+1N+26RU+1N+106RU+1N

The 106RU has the following structure as in the existing 11ax.

106RU=52RU+2N+52RU

The 52RU has the following structure as in the existing 11ax.

52RU=26RU+26RU 2. 320 MHz tone plan

The configuration of 320 MHz may consider various options as follows.

Option 1: Combination of Four Existing 11ax 80 MHz Tone Plans

This combination takes into account both contiguous and non-contiguous situations and may be expressed as shown below.

80+80+80+80 MHz/160+80+80 MHz/80+160+80 MHz/80+80+160 MHz/240+80 MHz/80+240 MHz/320 MHz

+means a non-contiguous situation, and 160/240/320 means that 2/3/4 of 80 MHz tone plans are contiguously aligned in succession.

<In Case there is a Contiguous Band>

In case 160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case 240 MHz is used, a tone index of the 80 MHz tone plan in the middle is the same as the tone index of the existing 80 MHz tone plan, and a tone index of the leftmost 80 MHz tone plan is tone index −1024 of the existing 80 MHz tone plan, and atone index of the rightmost 80 MHz tone plan is tone index+1024 of the existing 80 MHz tone plan.

In case 320 MHz is used, a tone index of a first 80 MHz tone plan starting from the left is tone index −1536 of the existing 80 MHz tone plan, and a tone index of a second 80 MHz tone plan is tone index −512 of the existing 80 MHz tone plan, and a tone index of a third 80 MHz tone plan is tone index+512 of the existing 80 MHz tone plan, and a tone index of a fourth 80 MHz tone plan is tone index+1536 of the existing 80 MHz tone plan.

The various non-contiguous combinations presented above may also use different bands as well as the same band. For example, at 80+160+80 MHz, each 80/160/80 MHz bandwidth may be transmitted by using the 2.4 GHz/5 GHz/6 GHz band.

Option 2: Combination of Two New 160 MHz Tone Plans

This combination takes into account both contiguous and non-contiguous situations and may be expressed as shown below.

160+160 MHz/320 MHz

+means a non-contiguous situation, and 320 MHz means that two new 160 MHz tone plans are contiguously aligned.

<In Case there is a Contiguous Band>

In case 320 MHz is used, a tone index of the 160 MHz tone plan on the left side is tone index −1024 of a new 160 MHz tone plan, and a tone index of the 160 MHz tone plan on the right side is tone index+1024 of a new 160 MHz tone plan.

The non-contiguous combination presented above may also use different bands as well as the same band. For example, at 160+160 MHz, each 160 MHz bandwidth may be transmitted by using the 2.4 GHz/5 GHz band.

Option 3: Combination of Two Existing 11ax 80 MHz Tone Plans and One New 160 MHz tone plan This combination takes into account both contiguous and non-contiguous situations and may be expressed as shown below.

c80+c80+n160 MHz/c80+n160 MHz+c80/n160+c80+c80 MHz/cc160+n160 MHz/n160+cc160 MHz/ncc320 MHz/cnc320 MHz/ccn320 MHz +means a non-contiguous situation, and each of c80 MHz, cc160 MHz, and n160 MHz means the existing 11ax 80 MHz tone plan, two contiguous existing 11ax 80 MHz tone plans, and a new 160 MHz tone plan, respectively. ncc320 MHz/cnc320 MHz/ccn320 MHz means a contiguous alignment of a new 160 MHz tone plan and two existing 11ax 80 MHz tone plans. And, ncc/cnc/ccn indicates a contiguous (or sequential) order of each tone plan.

<In Case there is a Contiguous Band>

In case cc160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case ncc320 MHz is used, a tone index of the 160 MHz tone plan on the left side is tone index −1024 of the new 160 MHz tone plan, a tone index of the next 80 MHz tone plan is tone index+512 of the existing 80 MHz tone plan, and a tone index of the last 80 MHz tone plan is tone index+1536 of the existing 80 MHz tone plan.

In case cnc320 MHz is used, a tone index of the 80 MHz tone plan on the left side is tone index −1536 of the existing 80 MHz tone plan, a tone index of the 160 MHz tone plan in the middle is the same tone index of the new 160 MHz tone plan, and a tone index of the last 80 MHz tone plan is tone index+1536 of the existing 80 MHz tone.

In case ccn320 MHz is used, a tone index of the 80 MHz tone plan on the left side is tone index −1536 of the existing 80 MHz tone plan, a tone index of the next 80 MHz tone plan is the tone index −512 of the existing 80 MHz tone plan, and a tone index of the last 160 MHz tone plan is tone index+1024 of the new 160 MHz tone plan.

In the option presented above, various combinations of tone plans having different structures of c80 and n160 may be considered. In this case, there lies a disadvantage in that an indication related to RU allocation may become very complicated. Therefore, in order to reduce signaling overhead, the combinations may be limited to using only structures having specific orders. For example, only c80+c80+n160 MHz/ccn320 MHz may be used.

The various non-contiguous combinations presented above may also use different bands as well as the same band. For example, at c80+n160+c80 MHz, each c80/n160/c80 MHz bandwidth may be transmitted by using the 2.4 GHz/5 GHz/6 GHz band.

Option 4: Alternative 320 MHz Tone Plan Considering the Usage of One RF

In the case of contiguous 320 MHz, a situation where transmission is performed by using one RF may be considered. And, in this case, since 320 MHz, which is configured of a combination of 160 MHz or 80 MHz tone plans, has a large number of wasted subcarriers, a new tone plan may be proposed in order to increase efficiency and throughput of the subcarriers that are used. Various alternative tone plans will be proposed as follows.

A. Alternative 320 MHz Tone Plan 1

In case of configuring 320 MHz with two contiguous 160 MHz tone plans, 12 left/11 right guard tones are used, and these may be directly applied to the alternative 320 MHz tone plan without modification. Additionally, in case of performing transmission by using a full band, a new RU may be proposed, and various DCs may be considered according to the influence of the DC offset, and a size of the new RU may be determined by considering the guard tone size. The number of DCs of 80 MHz of the existing 11ax is equal to 5 or 7. And, considering this, the new RU of the full band is 4068RU or 4066RU.

12/11 guard tone, 5DC, 4068RU (RU subcarrier index is −2036:−3, 3:2036)

12/11 guard tone, 7DC, 4066RU (RU subcarrier index is −2036:−4, 4:2036)

Considering the effects of DC offset at 320 MHz, it is not preferable to use less than 5/7 DCs, which is the number of DCs used at 80 MHz, and 5/7 DCs may be sufficient in light of performance (or capability). Considering the OFDMA tone plan used in 2020RU, which is presented below, a maximum of 7 DCs may be appropriate. Since the number of DCs in the OFDMA tone plan is designed based on the 7 DCs used in the existing 11ax 80 MHz OFDMA tone plan, it is not preferable to use a number of DCs that is smaller than 7, and, in light of performance, 7 DCs may also be sufficient at 320 MHz.

The OFDMA tone plan may be expressed by using the existing 2020RU and 26RU (13+13 RUs) as shown below.

12G+2020RU+13RU+7DC+13RU+2020RU+11G

Two types of configurations of 2020RU may be proposed as follows.

2020RU=996RU+1N+26RU+1N+996RU
2020RU=1N+996RU+26RU+996RU+1N

The first structure is configured to reduce the influence of the interference from/to an adjacent RU by putting a null tone on both sides of the 26RU, and the second structure is configured to reduce the influence of the interference between 996RU and its adjacent RU. Since a RU using a small number of subcarriers, such as 26RU, causes significant influence on performance, it may be preferable to use the first structure.

Two types of configurations of 996RU may be proposed as in the new 160 MHz.

996RU=484RU+1N+26RU+1N+484RU
996RU=1N+484RU+26RU+484RU+1N

The 484RU has a structure of two 242RUs as in the existing 11ax.

484RU=242RU+242RU

The 242RU has the following structure as in the existing 11ax.

242RU=1N+106RU+1N+26RU+1N+106RU+1N

The 106RU has the following structure as in the existing 11ax.

106RU=52RU+2N+52RU

The 52RU has the following structure as in the existing 11ax.

52RU=26RU+26RU 3. 240 MHz

An AP may transmit a PPDU by using a bandwidth of 240 MHz, and 240 MHz may be configured by combining three existing 11ax 80 MHz tone plans. This combination takes into account both contiguous and non-contiguous situations and may be expressed as follows. 80+80+80 MHz/160+80 MHz/80+160 MHz/240 MHz +means a non-contiguous situation, and 160/240 means that ⅔ of 80 MHz tone plans are contiguously aligned in succession.

<In Case there is a Contiguous Band>

In case 160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case 240 MHz is used, a tone index of the 80 MHz tone plan in the middle is the same as the tone index of the existing 80 MHz tone plan, and a tone index of the leftmost 80 MHz tone plan is tone index −1024 of the existing 80 MHz tone plan, and atone index of the rightmost 80 MHz tone plan is tone index+1024 of the existing 80 MHz tone plan.

A pilot subcarrier shall also be calibrated according to its position. And, in case 160 MHz is used, a pilot tone index of the 80 MHz tone plan on the left side is pilot tone index −512 of the existing 80 MHz tone plan, and a pilot tone index of the 80 MHz tone plan on the right side is pilot tone index+512 of the existing 80 MHz tone plan.

In case 240 MHz is used, a pilot tone index of the 80 MHz tone plan in the middle is the same as the pilot tone index of the existing 80 MHz tone plan, and a pilot tone index of the leftmost 80 MHz tone plan is pilot tone index −1024 of the existing 80 MHz tone plan, and a pilot tone index of the rightmost 80 MHz tone plan is pilot tone index+1024 of the existing 80 MHz tone plan.

Alternatively, the existing 11ax 80 MHz tone plan and the new 160 MHz tone plan may be used, and both contiguous and non-contiguous situations may be considered and expressed as follows.

c80+n160 MHz/n160 MHz+c80/nc240 MHz/cn240 MHz

+means a non-contiguous situation, and each of c80 MHz and n160 MHz means the existing 11ax 80 MHz tone plan and a new 160 MHz tone plan, respectively. nc240 MHz/cn240 MHz means a contiguous alignment of the new 160 MHz tone plan and the existing 11ax 80 MHz tone plan. And, nc/cn indicates a contiguous (or sequential) order of each tone plan.

In case nc240 MHz is used, a tone index of the 160 MHz tone plan on the left side is tone index −512 of the new 160

MHz tone plan, and a tone index of 80 MHz on the right side is tone index+1024 of the existing 80 MHz tone plan.

In case cn240 MHz is used, a tone index of the 80 MHz tone plan on the left side is tone index −1024 of the existing 80 MHz tone plan, and a tone index of 160 MHz on the right side is tone index+512 of the new 160 MHz tone plan.

A pilot subcarrier shall also be calibrated according to its position. And, in case nc240 MHz is used, a pilot tone index of the 160 MHz tone plan on the left side is pilot tone index −512 of the new 160 MHz tone plan, and a pilot tone index of 80 MHz on the right side is pilot tone index+1024 of the existing 80 MHz tone plan.

In case cn240 MHz is used, a pilot tone index of the 80 MHz tone plan on the left side is pilot tone index −1024 of the existing 80 MHz tone plan, and a pilot tone index of 160 MHz on the right side is pilot tone index+512 of the new 160 MHz tone plan.

The various non-contiguous combinations presented above may also use different bands as well as the same band. For example, at 80+80+80 MHz, each 80 MHz bandwidth may be transmitted by using the 2.4 GHz/5 GHz/6 GHz band.

More specifically, a tone plan of 240 MHz may be configured by broadly using 3 different methods.

Option 1: combination of three 80 MHz tone plans (80+80+80)

Option 2: combination of two 80 MHz tone plans and one new 160 MHz tone plan (160+80/80+160)

Option 3: alternative 240 MHz tone plan (240)

A non-contiguous situation may also be a case where different bands are used. An index of a RU subcarrier may be calibrated according to its position.

An index of a 240 MHz pilot subcarrier may be calibrated according to its position as follows.

160 MHz: existing 80 MHz±512 (RU tone index also the same)

240 MHz: existing 80 MHz±1024, existing 80 MHz (RU tone index also the same), new 160 MHz±512 (RU tone index also the same)

Tone plan 1

In case of using a full band, a new RU may be proposed by considering the guard tones and DC tones. The existing 11ax 80 MHz and 160 MHz use 12 right and 11 left guard tones, and these guard tones are also used in 240 MHz without modification. When considering actual interference from an adjacent channel or interference to an adjacent channel, the usage of these guard tones shall not cause any significant problem. Additionally, a number of DCs equal to or greater than the number of DCs used in the existing 80 MHz, which is 5 or 7 DCs, shall be used. However, when considering the DC offset, the usage of 5 or 7 DCs shall not cause any significant problem. Considering this, a tone plan may be proposed as presented below. In the following, G denotes guard tone, and N denotes null tone.

1. Alternative 240 MHz tone plan 1

<Full Band Tone Plan>

12/11 guard, DC 5 or 7, RU 3044 or 3042

<OFMDA tone plan>

12G+996RU+1N+26RU+1N+996RU (5DC)+1N+26RU+1N+996RU+11G

996RU on both sides=484RU+1N+26RU+1N+484RU (ver1) (or 1N+484RU+26RU+484RU+1N (ver2))

996RU (5DC) in the middle=484RU+13RU+7DC+13RU+484RU (the same as existing 80 MHz)

484RU=242RU+242RU

242RU=1N+106RU+1N+26RU+1N+106RU+1N

106RU=52RU+2N+52RU

52RU=26RU+26RU

In a full band, 5 or 7 DCs are configured according to the influence of the DC offset. The number of DCs may be smaller than that of 80 MHz/160 MHz but not larger than 7, which is used in OFDMA.

The two-configuration option of the 996RU on both sides may be viewed in light of ensured performance (or capability) of 26RU or ensured performance of 484RU. Configurations of the 996RU in the middle and the RUs that follow are the same as the existing ax.

More specifically, the configuration of the 996RU on both sides may be proposed in two different structures. A first structure is a structure that puts a null tone on both sides of the 26RU in order to reduce the influence of the interference to/from an adjacent RU, and a second structure is a structure that is capable of reducing the influence of the interference between the 484RU and its adjacent RU. Since a RU using a small number of subcarriers, such as 26RU, causes significant influence on performance, it may be preferable to use the first structure.

The 996RU in the middle uses the same 996RU tone plan of the existing 80 MHz without modification. Additionally, 484/242/106/52RU may use the same structure as the existing (or conventional) 11ax without modification.

4. Exemplary Tone Plans

Figure 17:
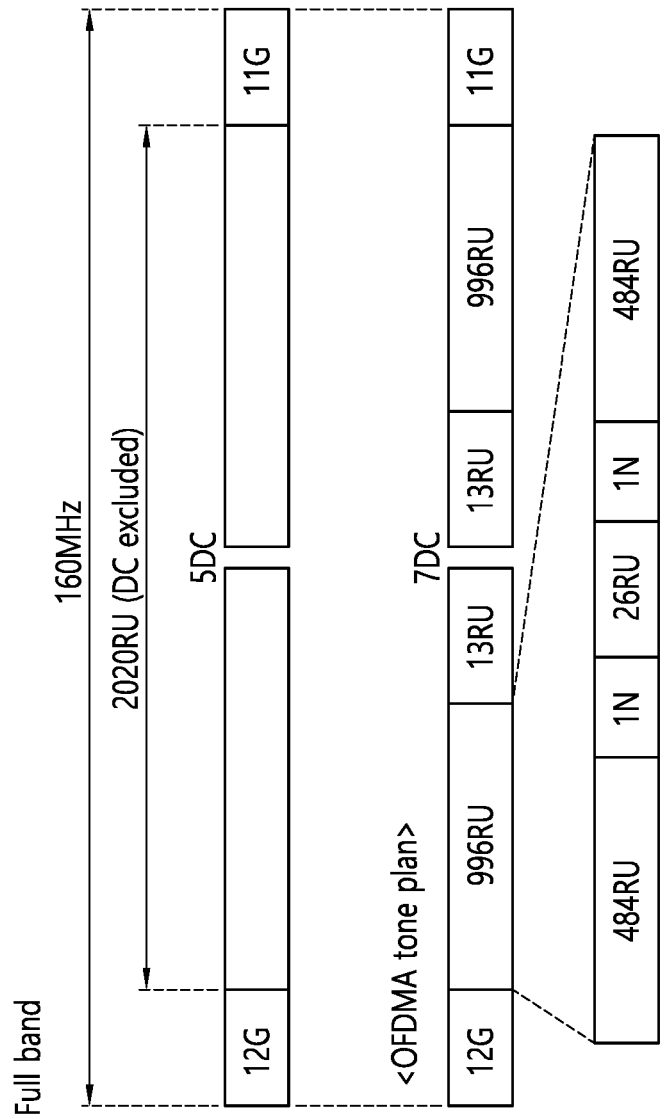
FIG. 17 shows an example of a tone plan in a 160 MHz band according to the present embodiment.

FIG. 17 shows an example of a tone plan in a 160 MHz band according to the present embodiment.

A tone plan in case of a full band and a tone plan in case of applying OFDMA are both illustrated in FIG. 17.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 17 is for one embodiment only, and thus the 12 guard tones and the 11 guard tones may change in locations. When 7 DC tones are located at the center of 160 MHz, the data may be transmitted in 2018RU.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 17 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 18:
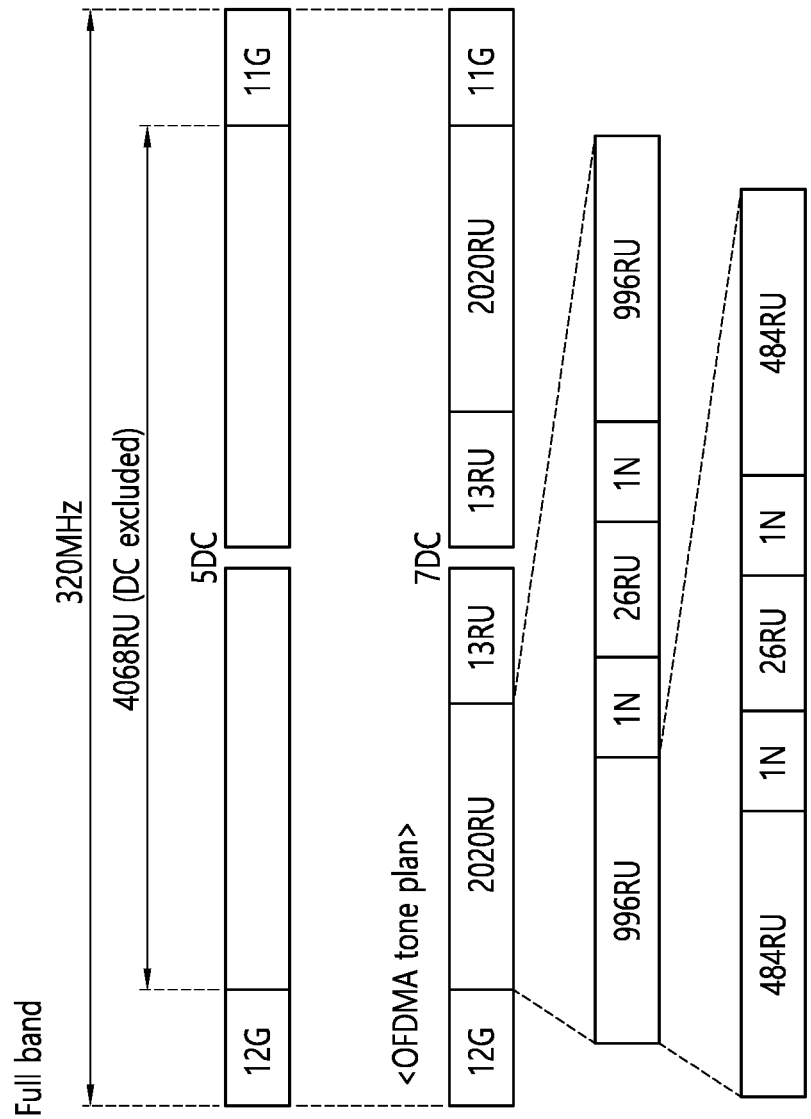
FIG. 18 shows an example of a tone plan in a 320 MHz band according to the present embodiment.

FIG. 18 shows an example of a tone plan in a 320 MHz band according to the present embodiment.

A tone plan in case of a full band and a tone plan in case of applying OFDMA are both illustrated in FIG. 18.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 18 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 18 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 19:
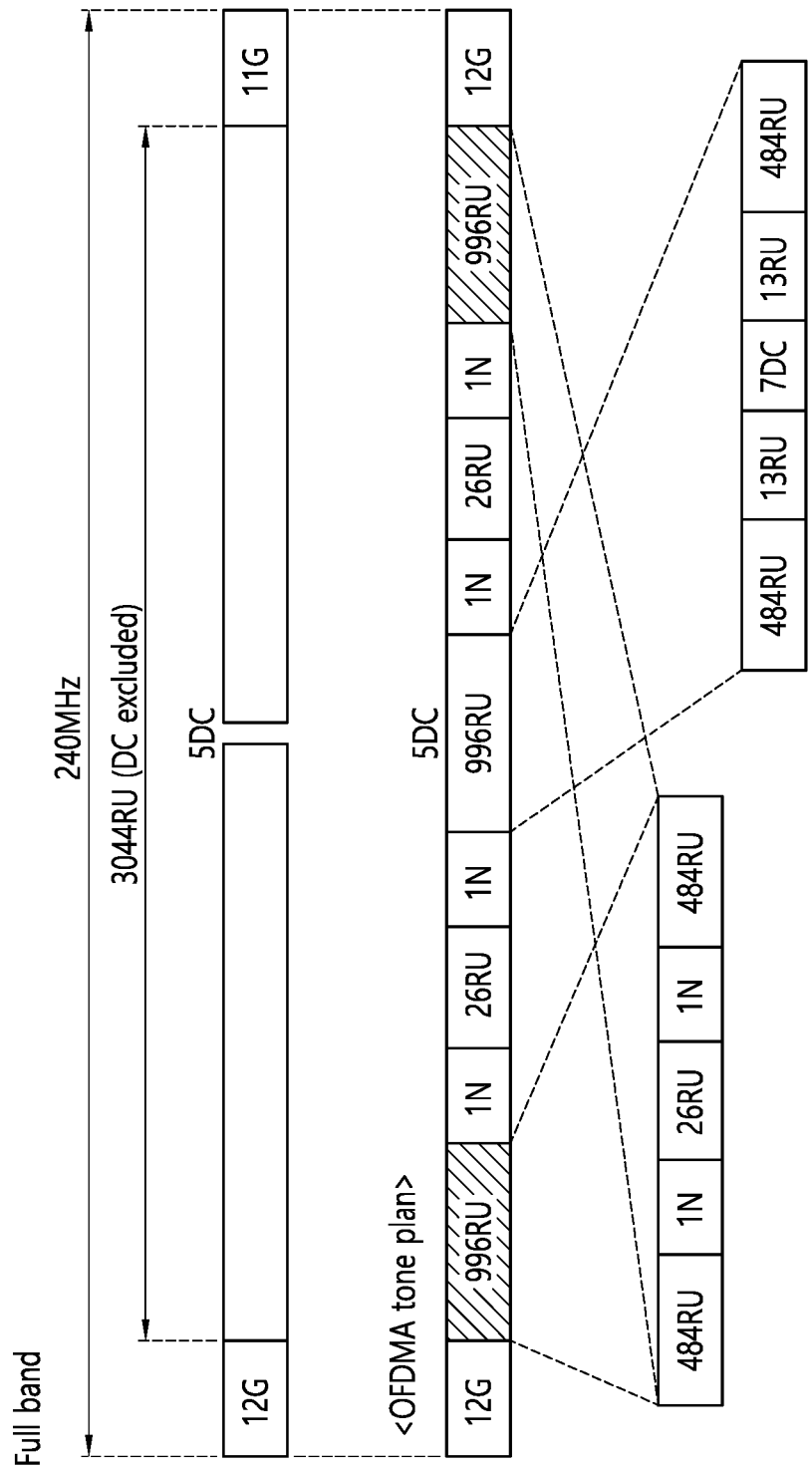
FIG. 19 shows an example of a tone plan in a 240 MHz band according to the present embodiment.

FIG. 19 shows an example of a tone plan in a 240 MHz band according to the present embodiment.

FIG. 19 illustrates both a tone plan in case of a full band and a tone plan in a case where OFDMA is applied, which are described above in tone plan 1.

Firstly, in case of a full band, a tone plan of 240 MHz may be configured in the order of 12 guard tones, 3044RU, 5 DC tones, and 11 guard tones. 5 DC tones may be positioned in the middle of the 160 MHz, and data may be transmitted from the 3044RU. However, FIG. 19 is merely an exemplary embodiment. And, therefore, the positions of the 12 guard tones and the 11 guard tones may be changed, and, if 7 DC tones are positioned in the middle of the 240 MHz, data may be transmitted from 3042RU.

In the case where OFDMA is applied, a tone plan of 320 MHz may be configured in the order of 12 guard tones, 996RU, 1N, 26RU, 1N, 996RU, 5 DC tones, 1N, 26RU, 1N, 996RU, and 11 guard tones.

Additionally, the 996RU on both ends may be configured of 484RU, 1 null tone, 26RU, 1 null tone, and 484RU. And, the 996RU in the middle may be configured of 484RU, 13RU, 7 DC tones, 13.RU, and 484RU. However, FIG. 19 is merely an exemplary embodiment. And, therefore, the positions of the 12 guard tones and the 11 guard tones may be changed, and the 996RU on both ends may be configured of 1 null tone, 484RU, 26RU, 484RU, and 1 null tone.

Since the tone plan may have the same structure as the existing 11ax starting from the 484RU, the structure will not be shown in the drawing.

5. Technical Objects that are to be Achieved in the Present Disclosure

This specification proposes phase rotation being applied to a legacy preamble in case of transmitting a packet by using 80/160/240/320 MHz in a wireless LAN system (802.11). Most particularly, proposed herein is a phase rotation that is optimized by considering preamble puncturing adopted to 11ax at 80/160 MHz, and by applying 80 MHz-based preamble puncturing at 240/320 MHz as well as considering a device situation wherein a device has various RF capabilities, i.e., different maximum transmittable bandwidths of the RF.

In a wireless LAN 802.11 system, transmission of increased stream(s) is being considered by using a wider band or a larger number of antennas than the existing 11ax, in order to increase the peak throughput. Additionally, a method of using an aggregation of various bands is also being considered.

This specification considers a case of using a wide band, i.e., a case of transmitting a packet by using 80/160/240/320 MHz, and proposes phase rotation being applied to a legacy preamble of such case. Most particularly, by considering preamble puncturing adopted to 11ax at 80/160 MHz, and by applying 80 MHz-based preamble puncturing at 240/320 MHz, phase rotation that is optimized in such situation is proposed.

Firstly, an encoding procedure of a PPDU may be described as follows.

An L-STF included in the PPDU may be configured according to the following procedure.

a) Determine the channel bandwidth from the TXVECTOR parameter CH_BANDWIDTH, b) Sequence generation: Generate the L-STF sequence over the channel bandwidth as described in 27.3.10.3 (L-STF). Apply a 3 dB power boost if transmitting an HE ER SU PPDU as described in 27.3.10.3 (L-STF).

c) Phase rotation: Apply appropriate phase rotation for each 20 MHz subchannel as described in 27.3.9 (Mathematical description of signals) and 21.3.7.5 (Definition of tone rotation).

d) CSD per STS: If th TXVECTOR parameter BEAM_CHANGE is 0, apply CSD per STS for each space-time stream and frequency segment as described in 27.3.10.2.2 (Cyclic shift for HE modulated fields).

e) Spatial mapping: If the TXVECTOR parameter BEAM_CHANGE is 0, apply the A matrix and the Q matrix as described in 27.3.10.3 (L-STF).

f) IDFT: Compute the inverse discrete Fourier transform.

g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).

h) Insert GI and apply windowing: Prepend a GI ($T_{GI,Pre\text{-}HE}$) and apply windowing as described in 27.3.9 (Mathematical description of signals).

i) Analog and RF: Upconvert the resulting complex baseband waveform associated with each transmit chain to an RF signal according to the center frequency of the desired channel and transmit. Refer to 27.3.9 (Mathematical description of signals) and 27.3.10 (HE preamble) for details.

An L-LTF included in the PPDU may be configured according to the following procedure.

a) Determine the channel bandwidth from the TXVECTOR parameter CH_BANDWIDTH, b) Sequence generation: Generate the L-STF sequence over the channel bandwidth as described in 27.3.10.3 (L-STF). Apply a 3 dB power boost if transmitting an HE ER SU PPDU as described in 27.3.10.3 (L-STF).

c) Phase rotation: Apply appropriate phase rotation for each 20 MHz subchannel as described in 27.3.9 (Mathematical description of signals) and 21.3.7.5 (Definition of tone rotation).

d) CSD per STS: If th TXVECTOR parameter BEAM_CHANGE is 0, apply CSD per STS for each space-time stream and frequency segment as described in 27.3.10.2.2 (Cyclic shift for HE modulated fields).

e) Spatial mapping: If the TXVECTOR parameter BEAM_CHANGE is 0, apply the A matrix and the Q matrix as described in 27.3.10.3 (L-STF).

f) IDFT: Compute the inverse discrete Fourier transform.

g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).

h) Insert GI and apply windowing: Prepend a GI ($T_{GI,L\text{-}LTF}$) and apply windowing as described in 27.3.9 (Mathematical description of signals).

i) Analog and RF: Upconvert the resulting complex baseband waveform associated with each transmit chain to an RF signal according to the center frequency of the desired channel and transmit. Refer to 27.3.9 (Mathematical description of signals) and 27.3.10 (HE preamble) for details.

An L-SIG included in the PPDU may be configured according to the following procedure.

a) Set the RATE: subfield in the SIGNAL field to 6 Mb/s. Set the LENGTH, Parity, and Tail fields in the SIGNAL field as described in 27.3.10.5 (L-SIG), b) BCC encoder: Encode the SIGNAL field by a convolutional encoder at the rate of R=½ as described in 27.3.11.5.1 (Binary convolutional coding and puncturing).

c) BCC interleaver: Interleave as described in 17.3.5.7 (BCC interleavers).

d) Constellation Mapper: BPSK modulate as described in 27.3.11.9 (Constellation mapping).

e) Pilot insertion: Insert pilots as described in 27.3.10.5 (L-SIG).

f) Extra tone insertion: Four extra tones are inserted in subcarriers k∈({−28, 27, 27, 28} for channel estimation purpose and the values on these four extra tones are {−1, −1, −1, 1}, respectively. Apply a 3 dB power boost to the four extra tones if transmitting an HE ER SU PPDU as described in 27.3.10.5 (L-SIG).

g) Duplication and phase rotation: Duplicate the L-SIG field over each occupied 20 MHz subchannel of the channel bandwidth. Apply appropriate phase rotation for each occupied 20 MHz subchannel as described in 27.3.9 (Mathematical description of signals and 21.3.7.5 (Definition of tone rotation).

h) CSD per STS If the TXVECTOR parameter BEAM_CHANGE is 0, apply CS) per STS for each space-time stream and frequency segment as described in 27.3.10.2.2 (Cyclic shift for HE modulated fields) before spatial mapping.

i) Spatial mapping: If the TXVECTOR parameter BEAM_
CHANGE is 0, apply the A matrix and Q matrix as described in 27.3.10.5 (L-SIG).

j) IDFT: Compute the inverse discrete Fourier transform.

k) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).

l) Insert GI and apply windowing: Prepend a GI ($T_{GI,Pre-HE}$) and apply windowing as described in 27.3.9 (Mathematical description of signals).

m) Analog and RF: Upconvert the resulting complex baseband waveform associated with each transmit chain Refer to 27.3.9 (Mathematical description of signals) and 27.3.10 (HE preamble) for details.

The L-STF, L-LTF, and L-SIG may apply adequate phase rotation in 20 MHz subchannel units (ref c) of the L-STF, c) of the L-LTF, and g) of the L-SIG). At this point, L-SIG may be duplicated in 20 MHz units when transmitted from a bandwidth equal to or larger than 40 MHz and may apply each phase transmission one by one (ref g) of L-SIG). The phase rotation may be described in more detail as follows.

The following shows a phase rotation being used in a legacy preamble and HE-SIG-A/B in the existing 11ax.

Function $\Upsilon_{k,BW}$ is used for indicating a rotation of a tone. The $\Upsilon_{k,BW}$ may be defined by a phase rotation value. In $\Upsilon_{k,BW}$, the bandwidth (BW) is determined by TXVECTOR parameter CH_BANDWIDTH, which is defined in the following table. At this point, k is a subcarrier index.

TABLE 1

| CH_BANDWIDTH | $\Upsilon_{k,BW}$ |
|---|---|
| CBW20 | $\Upsilon_{k,20}$ |
| CBW40 | $\Upsilon_{k,40}$ |
| CBW80 | $\Upsilon_{k,80}$ |
| CBW160 | $\Upsilon_{k,160}$ |
| CBW80 + 80 | $\Upsilon_{k,80}$ per frequency segment |

Hereinafter, $\Upsilon_{k,BW}$ according to the bandwidth will be defined.

For a 20 MH PPDU transmission, $$\Upsilon_{k,20}=1$$

For a 40 MH PPDU transmissions, $$\gamma_{k,40} = \begin{cases} 1, & k < 0 \\ j, & k \geq 0 \end{cases}$$

For an 8 MHZ PPDU transmission.

$$\gamma_{k,80} = \begin{cases} 1, & k < -64 \\ -1, & k \geq -64 \end{cases}$$

For an 80+80 MHz PPDU transmission, each 80 MHz frequency segment shall use a phase rotation for the 80 MHz PPDU transmission.

For a 160 MHz PPDU transmission, $$\gamma_{k,160} = \begin{cases} 1, & k < -192 \\ -1, & -192 \leq k < 0 \\ 1, & 0 \leq k < 64 \\ -1, & 64 \leq k \end{cases}$$

As it is apparent in the description presented above, 160 MHz is used by repeating the phase rotation of 80 MHz two times.

In Wi-Fi succeeding 11ax, a wider band may be used in order to enhance the peak throughput, and this application considers a band of up to 240/320 MHz. Additionally, although the form of the packet that is to be used is unknown, it will be apparent that the start of the packet will be a legacy preamble for its co-existence with the existing legacy. Additionally, by using more enhanced hardware and RF, a situation where a contiguous 160/240/320 MHz packet is transmitted by using one RF may also be considered. The present application proposes various methods of phase rotation for optimizing PAPR in L-STF and L-LTF by considering such situations. And, most particularly, by considering preamble puncturing proposed in 11ax at 80/160 MHz, and by applying 80 MHz-based preamble puncturing at 240/320 MHz, the present application proposes a maximum PAPR for minimizing the phase rotation. In this case, the phase rotation considers a method having one unified form and not a method having different values according to the preamble puncturing pattern. For example, when considering 20 MHz-based 11ax preamble puncturing at 80/160 MHz, a primary 20 MHz may always be used for PPDU transmission, whereas a secondary 20/40/80 MHz may not be used for the PPDU transmission. Alternatively, when considering 80 MHz-based preamble puncturing at 240/320 MHz, a primary 80 MHz may always be used for PPDU transmission, whereas a secondary 80/160 MHz may not be used for the PPDU transmission. In such various preamble puncturing patterns, a specific phase rotation is applied, and, by calculating a PAPR for each preamble puncturing pattern, a maximum PAPR value is extracted. Even in a case where another phase rotation is applied, this is repeated so as to extract a maximum PAPAR from each phase rotation. Thereafter, by comparing the extracted maximum PAPR values, an optimized phase rotation may be selected.

The following shows various 80 MHz preamble puncturing patterns. O represents an 80 MHz channel that is used, and X represents an 80 MHz channel that is not used.

240 MHz: {OOO}, {OOX}, {OXO}, {OXX}, {XOO}, {XOX}, {XXO}
320 MHz: {OOOO}, {OOOX}, {OOXO}, {OOXX}, {OXOO}, {OXOX}, {OXXO}, {OXXX}, {XOOO}, {XOOX}, {XOXO}, {XOXX}, {XXOO}, {XXOX}, {XXXO}

Additionally, the maximum transmittable bandwidths being considered in this specification are 80/160/240/320 MHz. Also, herein, only a contiguous situation is considered. That is, for each preamble puncturing pattern, the following situations at each bandwidth shall be considered. In an 80 MHz transmission, only one PAPR is considered, and in a 160 MHz transmission, a PAPR of a first 80 MHz, a PAPR of a second 80 MHz, and a PAPR of the full 160 MHz, i.e., a total of 3 PAPRs are considered. In a 240 MHz transmission, a PAPR of a first 80 MHz, a PAPR of a second 80 MHz, a PAPR of a third 80 MHz, a PAPR of a first 160 MHz configured by associating the first 80 MHz and the second 80 MHz, a PAPR of a second 160 MHz configured by associating the second 80 MHz and the third 80 MHz, and a PAPR of the full 240 MHz, i.e., a total of 6 PAPRs are considered. In a 320 MHz transmission, a PAPR of a first 80 MHz, a PAPR of a second 80 MHz, a PAPR of a third 80 MHz, a PAPR of a fourth 80 MHz, a PAPR of a first 160 MHz configured by associating the first 80 MHz and the second 80 MHz, a PAPR of a second 160 MHz configured by associating the second 80 MHz and the third 80 MHz, a PAPR of a third 160 MHz configured by associating the third 80 MHz and the fourth 80 MHz, a PAPR of a first 240 MHz configured by associating the first 80 MHz, the second 80 MHz, and the third 80 MHz, a PAPR of a second 240 MHz configured by associating the second 80 MHz, the third 80 MHz, and the fourth 80 MHz, and a PAPR of the full 320 MHz, i.e., a total of 10 PAPRs are considered.

Meanwhile, in 11ax, since the same phase rotation of the existing 11ac is applied at 80/160 MHz without modification, without considering the preamble puncturing, a good PAPR cannot be ensured. Therefore, this specification provides a solution that can reduce the PAPR and increase hardware efficiency by proposing a new phase rotation considering preamble puncturing not only in a 240/320 MHz situation but also in an 80/160 MHz situation.

The following are L-STF and L-LTF sequence corresponding to 20 MHz. And, in a wide bandwidth, these sequences are directly applied to each 20 MHz bandwidth without modification.

L-STF=sqrt(½)*[0 0 0 0 0 0 0 0 1+j 0 0 0 −1 −j 0 0 0 1+j 0 0 0 −1 −j 0 0 0 −1 −j 0 0 0 1+j 0 0 0 0 0 0 0 −1−j 0 0 0 −1−j 0 0 0 1+j 0 0 0 1+j 0 0 0 1+j 0 0 0 1+j 0 0 0 0 0 0 0]

L-LTF=[0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0]

As presented above, in a signal that is repeated in a frequency domain, the PAPR may become very large, and, in order to reduce the increased PAPR, a phase rotation is applied, as proposed below. Additionally, in the proposed phase rotation situation, a maximum PAPR in the L-STF and L-LTF considering preamble puncturing will be proposed as follows.

A. 80 MHz (apply 20 MHz preamble puncturing, when 80 MHz band is represented by subcarrier index, −128≤k<127, wherein k is subcarrier index)

1) Apply Existing Phase Rotation without Modification

As shown below the existing phase rotation may be applied without modification. However, in situations where preamble puncturing is considered, this may not be preferable since the maximum PAPR may be relatively larger than the proposals of A. 2) and 3), which will hereinafter be described in detail.

Gamma_k,80=1 if k<−64
−1 if −64≤k

TABLE 2

| L-STF | L-LTF |
|---|---|
| 6.8606 | 7.9370 |

Gamma_k,BW means a phase rotation value in k subcarrier index of a contiguous BW bandwidth.

2) PAPR-Optimized Phase Rotation being Applied for Each 20 MHz Bandwidth

The following indicates the phase rotation being applied in 20 MHz bandwidth units for optimizing PAPR in L-STF and the PAPR.

Gamma_k,80=1 if k<−64
j if −64≤k<0
1 if 0≤k<64
j if 64≤k
or
Gamma_k,80=1 if k<−64
−j if −64≤k<0
1 if 0≤k<64
−j if 64≤k

TABLE 3

| L-STF | L-LTF |
|---|---|
| 5.8219 | 6.8980 |

The following indicates the phase rotation being applied in 20 MHz bandwidth units for optimizing PAPR in L-LTF and the PAPR.

Gamma_k,80=1 if k<−64
1 if −64≤k<0
−1 if 0≤k<64
−1 if 64≤k

TABLE 4

| L-STF | L-LTF |
|---|---|
| 5.8847 | 6.6178 |

The three phase rotations presented above have similar PAPRs within each field. However, if only one PAPR value is to be selected, in light of the overall packet, a phase rotation optimizing the L-LTF that has the larger PAPR may be preferred.

3) Phase Rotation Having Similar Performance as PAPR-Optimized Phase Rotation being Applied for Each 20 MHz Bandwidth The following shows a phase rotation having similar PAPR as the phase rotations proposed above in A. 2) and its PAPR.

Gamma_k,80=1 if k<−64
−1 if −64≤k<0
−1 if 0≤k<64
1 if 64≤k

TABLE 5

| L-STF | L-LTF |
|---|---|
| 5.9681 | 6.7153 |

B. 160 MHz (apply 20 MHz preamble puncturing, when 160 MHz band is represented by subcarrier index, −256≤k<255)

160 MHz includes both contiguous 160 MHz/non-contiguous 160 MHz, and the non-contiguous 160 MHz may be 80+80 MHz. Most particularly, in case of the non-contiguous situation, each channel may be positioned in different bands. And, even in such case, for simplification, the phase rotation shown below may be applied without modification, or since it is apparent that different RFs may be used, and since this has no influence on the PAPR, each phase rotation may be applied according to the channel size being used within the band. This may also be applied in 240/320 MHz.

The contiguous/non-contiguous 160 MHz phase rotations that are proposed below may be applied without modification to the 160 MHz part of a non-contiguous transmission situation of the wider 240/320 MHz.

1) Repeat 80 MHz phase rotation

This is a same approach as the method used in the existing 11ax. And, in a situation where a contiguous/non-contiguous 160 MHz packet is transmitted for each 80 MHz by using two RFs, the phase rotation used in each RF may be the same and may be easily implemented. The contiguous 160 MHz may be expressed as shown below, and the maximum PAPR is also as shown below.

Gamma_k,160=1 if k<−192
1 if −192≤k<−128
−1 if −128≤k<−64
−1 if −64≤k<0
1 if 0≤k<64
1 if 64≤k<128
−1 if 128≤k<192
−1 if 192≤k

TABLE 6

| L-STF | L-LTF |
|---|---|
| 8.4454 | 9.1864 |

Gamma_k,160=1 if k<−192
−1 if −192≤k<−128
−1 if −128≤k<−64
1 if −64≤k<0
1 if 0≤k<64
−1 if 64≤k<128
−1 if 128≤k<192
1 if 192≤k

TABLE 7

| L-STF | L-LTF |
|---|---|
| 8.4874 | 9.1864 |

Gamma_k,160=1 if k<−192
j if −192≤k<−128
1 if −128≤k<−64
j if −64≤k<0
1 if 0≤k<64
j if 64≤k<128
1 if 128≤k<192
j if 192≤k

TABLE 8

| L-STF | L-LTF |
|---|---|
| 8.3369 | 9.4172 |

Gamma_k,160=1 if k<−192
−j if −192≤k<−128
1 if −128≤k<−64
−j if −64≤k<0
1 if 0≤k<64
−j if 64≤k<128
1 if 128≤k<192
−j if 192≤k

TABLE 9

| L-STF | L-LTF |
|---|---|
| 8.3369 | 9.4172 |

Gamma_k,160=1 if k<−192
−1 if −192≤k<−128
−1 if −128≤k<−64
−1 if −64≤k<0
1 if 0≤k<64
−1 if 64≤k<128
−1 if 128≤k<192
−1 if 192≤k

TABLE 10

| L-STF | L-LTF |
|---|---|
| 9.8709 | 10.9473 |

When considering a non-contiguous 160 MHz, i.e., 80+80 MHz, the proposal of A shall be applied to each 80 MHz without modification.

In the various proposals that are presented above, repetition of an existing phase rotation that did not have a good PAPR at 80 MHz (phase rotation of the existing 160 MHz) has a poorer PAPR as compared to other phase rotations. Therefore, this may not be preferable.

2) Repeat 80 MHz Phase Rotation and Add Phase Rotation in 80 MHz Bandwidth Units This is a method of optimizing the PAPR even more by repeating the 80 MHz phase rotation two times and additionally applying a phase rotation in each 80 MHz unit. In a situation where a contiguous/non-contiguous 160 MHz packet is transmitted for each 80 MHz by using two RFs, this is a situation where the same 80 MHz phase rotation is applied to each RF and where additional phase rotation per 80 MHz is being applied.

In this case, with the exception for the fifth phase rotation of the case where the existing 80 MHz phase rotation is applied (B. 1), the other phase rotations are all the same, and a case of repeating the existing 80 MHz phase rotation and adding phase rotations is 80 MHz bandwidth units is as follows.

Gamma_k,160=1 if k<−192
−1 if −192≤k<−128
−1 if −128≤k<−64
−1 if −64≤k<0
−1 if 0≤k<64
1 if 64≤k<128
1 if 128≤k<192
1 if 192≤k

TABLE 11

| L-STF | L-LTF |
|---|---|
| 8.1473 | 9.1912 |

In light of the overall packet, the first two phase rotations of B. 1), which minimize the PAPR of the L-LTF having the greater PAPR value, may be preferred. And, when also considering the L-STF, the first phase rotation of B. 1) may be preferred.

3) PAPR-Optimized Phase Rotation being Applied for Each 20 MHz Bandwidth

This method is a phase rotation that is applied in 20 MHz bandwidth units for optimizing the PAPR in a case where a contiguous 160 MHz packet is transmitted by using one RF. And, the phase rotation is as follows. The subcarrier index may be calibrated and applied to a non-contiguous 160 MHz. That is, in the following equations, phase rotation of −256≤k<0 may be applied to an 80 MHz having a low frequency, and phase rotation of 0≤k<256 may be applied to an 80 MHz having a high frequency). Since the phase rotation being applied to each RF capable of transmitting a maximum of 80 MHz varies depending upon the bandwidth position, the implementation may become complicated.

The phase rotation(s) optimized in L-STF is as follows.
Gamma_k,160=1 if k<−192
j if −192≤k<−128
1 if −128≤k<−64
j if −64≤k<0
−j if 0≤k<64
−1 if 64≤k<128
−j if 128≤k<192
−1 if 192≤k
or
Gamma_k,160=1 if k<−192
−j if −192≤k<−128
1 if −128≤k<−64
−j if −64≤k<0
j if 0≤k<64
−1 if 64≤k<128
j if 128≤k<192
−1 if 192≤k

TABLE 12

| L-STF | L-LTF |
|---|---|
| 8.0872 | 9.3379 |

The phase rotation(s) optimized in L-LTF is as follows.
Gamma_k,160=1 if k<−192
1 if −192≤k<−128
−1 if −128≤k<−64
−1 if −64≤k<0
−j if 0≤k<64
j if 64≤k<128
j if 128≤k<192
−j if 192≤k
or
Gamma_k,160=1 if k<−192
1 if −192≤k<−128
−1 if −128≤k<−64
−1 if −64≤k<0
j if 0≤k<64
−j if 64≤k<128
−j if 128≤k<192
j if 192≤k
or
Gamma_k,160=1 if k<−192
−1 if −192≤k<−128
−1 if −128≤k<−64
1 if −64≤k<0
j if 0≤k<64
j if 64≤k<128
−j if 128≤k<192
−j if 192≤k
or
Gamma_k,160=1 if k<−192
−1 if −192≤k<−128
−1 if −128≤k<−64
1 if −64≤k<0
−j if 0≤k<64
−j if 64≤k<128
j if 128≤k<192
j if 192≤k

TABLE 13

| L-STF | L-LTF |
|---|---|
| 8.4274 | 9.0720 |

Although the complexity in the implementation may be increased, the PAPR is slightly better than the proposals of 1) and 2), and the phase rotation of the second group of 3), which minimizes the PAPR of the L-LTF having the greater PAPR value, in light of the overall packet, may be preferred.

C. 240 MHz (apply 80 MHz preamble puncturing, when 240 MHz band is represented by subcarrier index, −384≤k<383)

240 MHz includes both contiguous 240 MHz/non-contiguous 240 MHz, and the non-contiguous 240 MHz may be 160+80/80+160/80+80+80 MHz. The contiguous/non-contiguous 240 MHz phase rotations that are proposed below may be applied without modification to the 240 MHz part of a non-contiguous transmission situation of the wider 320 MHz.

1) Repeat 80 MHz Phase Rotation

This is a same approach as the method used in the existing 11ax. And, in a situation where a contiguous/non-contiguous 240 MHz packet is transmitted for each 80 MHz by using multiple RFs, the phase rotations may all be the same, which may facilitate the implementation. The contiguous 240 MHz may be expressed as shown below, and the maximum PAPR is also as shown below.

Gamma_k,240=1 if k<−320
1 if −320≤k<−256
−1 if −256≤k<−192
−1 if −192≤k<−128
1 if −128≤k<−64
1 if −64≤k<0
−1 if 0≤k<64
−1 if 64≤k<128
1 if 128≤k<192
1 if 192≤k<256
−1 if 256≤k<320
−1 if 320≤k

TABLE 14

| L-STF | L-LTF |
|---|---|
| 10.2254 | 10.6149 |

Gamma_k,240=1 if k<−320
−1 if −320≤k<−256
−1 if −256≤k<−192
1 if −192≤k<−128
1 if −128≤k<−64
−1 if −64≤k<0
−1 if 0≤k<64
1 if 64≤k<128
1 if 128≤k<192
−1 if 192≤k<256
−1 if 256≤k<320
1 if 320≤k

TABLE 15

| L-STF | L-LTF |
|---|---|
| 10.1962 | 10.6138 |

Gamma_k,240=1 if k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k

TABLE 16

| L-STF | L-LTF |
|---|---|
| 9.9421 | 11.1323 |

Gamma_k,240=1 if k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k

TABLE 17

| L-STF | L-LTF |
|---|---|
| 9.9421 | 11.1777 |

Gamma_k,240=1 if k<−320
−1 if −320≤k<−256
−1 if −256≤k<−192
−1 if −192≤k<−128
1 if −128≤k<−64
−1 if −64≤k<0
−1 if 0≤k<64
−1 if 64≤k<128
1 if 128≤k<192
−1 if 192≤k<256
−1 if 256≤k<320
−1 if 320≤k

TABLE 18

| L-STF | L-LTF |
|---|---|
| 7.5202 | 8.5981 |

In a non-contiguous 240 MHz, the phase rotations of each contiguous 80/160 MHz may be proposed as shown in 1) of A and B.

The simple repetition of the phase rotation that is presented in the above-described various proposals has a relatively poor PAPR as compared to the following proposal of 2), and, most particularly, the repetition of the existing phase rotation has a poorer PAPR as compared to other phase rotations. Therefore, the proposals presented above may not be preferable.

2) Repeat 80 MHz Phase Rotation and Add Phase Rotation in 80 MHz Bandwidth Units This is a method of optimizing the PAPR even more by repeating the 80 MHz phase rotation three times and additionally applying a phase rotation in each 80 MHz unit. In a situation where a contiguous/non-contiguous 240 MHz packet is transmitted for each 80 MHz/160 MHz by using multiple RFs, this is a situation where the same 80 MHz phase rotation is applied to each RF and additional phase rotation per 80 MHz is applied.

The following indicates a phase rotation having the phase rotation being optimized in 80 MHz bandwidth units added thereto in L-STF and the PAPR.

Gamma_k,240=1 if k<−320
1 if −320≤k<−256
−1 if −256≤k<−192
−1 if −192≤k<−128
j if −128≤k<−64
j if −64≤k<0
−j if 0≤k<64
−j if 64≤k<128
1 if 128≤k<192
1 if 192≤k<256
−1 if 256≤k<320
−1 if 320≤k
or
Gamma_k,240=1 if k<−320
1 if −320≤k<−256
−1 if −256≤k<−192

−1 if −192≤k<−128
−j if −128≤k<−64
−j if −64≤k<0
j if 0≤k<64
j if 64≤k<128
1 if 128≤k<192
1 if 192≤k<256
−1 if 256≤k<320
−1 if 320≤k

TABLE 19

| L-STF | L-LTF |
| --- | --- |
| 9.0988 | 9.7910 |

Gamma_k,240=1 if k<−320
−1 if −320≤k<−256
−1 if −256≤k<−192
1 if −192≤k<−128
j if −128≤k<−64
−j if −64≤k<0
−j if 0≤k<64
j if 64≤k<128
1 if 128≤k<192
−1 if 192≤k<256
−1 if 256≤k<320
1 if 320≤k
or
Gamma_k,240=1 if k<−320
−1 if −320≤k<−256
−1 if −256≤k<−192
1 if −192≤k<−128
−j if −128≤k<−64
j if −64≤k<0
j if 0≤k<64
−j if 64≤k<128
1 if 128≤k<192
−1 if 192≤k<256
−1 if 256≤k<320
1 if 320≤k

TABLE 20

| L-STF | L-LTF |
| --- | --- |
| 9.0831 | 9.7256 |

Gamma_k,240=1 if k<−320
j if −320≤k<−256
1 if −256≤k<−192
j if −192≤k<−128
1 if −128≤k<−64
j if −64≤k<0
1 if 0≤k<64
j if 64≤k<128
−1 if 128≤k<192
−j if 192≤k<256
−1 if 256≤k<320
−j if 320≤k
or
Gamma_k,240=1 if k<−320
j if −320≤k<−256
1 if −256≤k<−192
j if −192≤k<−128
−1 if −128≤k<−64
−j if −64≤k<0

−1 if 0≤k<64
−j if 64≤k<128
−1 if 128≤k<192
−j if 192≤k<256
−1 if 256≤k<320
−j if 320≤k

TABLE 21

| L-STF | L-LTF |
| --- | --- |
| 8.9150 | 10.0373 |

Gamma_k,240=1 if k<−320
−j if −320≤k<−256
1 if −256≤k<−192
−j if −192≤k<−128
1 if −128≤k<−64
−j if −64≤k<0
1 if 0≤k<64
−j if 64≤k<128
−1 if 128≤k<192
j if 192≤k<256
−1 if 256≤k<320
j if 320≤k
or
Gamma_k,240=1 if k<−320
−j if −320≤k<−256
1 if −256≤k<−192
−j if −192≤k<−128
−1 if −128≤k<−64
j if −64≤k<0
−1 if 0≤k<64
j if 64≤k<128
−1 if 128≤k<192
j if 192≤k<256
−1 if 256≤k<320
j if 320≤k

TABLE 22

| L-STF | L-LTF |
| --- | --- |
| 8.9075 | 10.0373 |

Gamma_k,240=1 if k<−320
−1 if −320≤k<−256
−1 if −256≤k<−192
−1 if −192≤k<−128
1 if −128≤k<−64
−1 if −64≤k<0
−1 if 0≤k<64
−1 if 64≤k<128
1 if 128≤k<192
−1 if 192≤k<256
−1 if 256≤k<320
−1 if 320≤k
or
Gamma_k,240=1 if k<−320
−1 if −320≤k<−256
−1 if −256≤k<−192
−1 if −192≤k<−128
j if −128≤k<−64
−j if −64≤k<0
−j if 0≤k<64
−j if 64≤k<128
1 if 128≤k<192

−1 if 192≤k<256
−1 if 256≤k<320
−1 if 320≤k
or
Gamma_k,240=1 if k<−320
−1 if −320≤k<−256
−1 if −256≤k<−192
−1 if −192≤k<−128
−j if −128≤k<−64
j if −64≤k<0
j if 0≤k<64
j if 64≤k<128
1 if 128≤k<192
−1 if 192≤k<256
−1 if 256≤k<320
−1 if 320≤k

TABLE 23

| L-STF | L-LTF |
|---|---|
| 7.5202 | 8.5981 |

The following indicates a phase rotation having the phase rotation being optimized in 80 MHz bandwidth units added thereto in L-LTF and the PAPR.
Gamma_k,240=1 if k<−320
1 if −320≤k<−256
−1 if −256≤k<−192
−1 if −192≤k<−128
j if −128≤k<−64
j if −64≤k<0
−j if 0≤k<64
−j if 64≤k<128
1 if 128≤k<192
1 if 192≤k<256
−1 if 256≤k<320
−1 if 320≤k
or
Gamma_k,240=1 if k<−320
1 if −320≤k<−256
−1 if −256≤k<−192
−1 if −192≤k<−128
−j if −128≤k<−64
−j if −64≤k<0
j if 0≤k<64
j if 64≤k<128
1 if 128≤k<192
1 if 192≤k<256
−1 if 256≤k<320
−1 if 320≤k
[Table 24]

TABLE 24

| L-STF | L-LTF |
|---|---|
| 9.0988 | 9.7910 |

Gamma_k,240=1 if k<−320
−1 if −320≤k<−256
−1 if −256≤k<−192
1 if −192≤k<−128
1 if −128≤k<−64
−1 if −64≤k<0
−1 if 0≤k<64
1 if 64≤k<128
−1 if 128≤k<192
1 if 192≤k<256
1 if 256≤k<320
−1 if 320≤k
or
Gamma_k,240=1 if k<−320
−1 if −320≤k<−256
−1 if −256≤k<−192
1 if −192≤k<−128
−1 if −128≤k<−64
1 if −64≤k<0
1 if 0≤k<64
−1 if 64≤k<128
−1 if 128≤k<192
1 if 192≤k<256
1 if 256≤k<320
−1 if 320≤k
or
Gamma_k,240=1 if k<−320
−1 if −320≤k<−256
−1 if −256≤k<−192
1 if −192≤k<−128
j if −128≤k<−64
−j if −64≤k<0
−j if 0≤k<64
j if 64≤k<128
1 if 128≤k<192
−1 if 192≤k<256
−1 if 256≤k<320
1 if 320≤k
or
Gamma_k,240=1 if k<−320
−1 if −320≤k<−256
−1 if −256≤k<−192
1 if −192≤k<−128
−j if −128≤k<−64
j if −64≤k<0
j if 0≤k<64
−j if 64≤k<128
1 if 128≤k<192
−1 if 192≤k<256
−1 if 256≤k<320
1 if 320≤k

TABLE 25

| L-STF | L-LTF |
|---|---|
| 9.0910/9.0831 | 9.7256 |

Gamma_k,240=1 if k<−320
j if −320≤k<−256
1 if −256≤k<−192
j if −192≤k<−128
1 if −128≤k<−64
j if −64≤k<0
1 if 0≤k<64
j if 64≤k<128
−1 if 128≤k<192
−j if 192≤k<256
−1 if 256≤k<320
−j if 320≤k
or
Gamma_k,240=1 if k<−320
j if −320≤k<−256
1 if −256≤k<−192
j if −192≤k<−128

−1 if −128≤k<−64
−j if −64≤k<0
−1 if 0≤k<64
−j if 64≤k<128
−1 if 128≤k<192
−j if 192≤k<256
−1 if 256≤k<320
−j if 320≤k

TABLE 26

| L-STF | L-LTF |
|---|---|
| 8.9150 | 10.0373 |

Gamma_k,240=1 if k<−320
−j if −320≤k<−256
1 if −256≤k<−192
−j if −192≤k<−128
1 if −128≤k<−64
−j if −64≤k<0
1 if 0≤k<64
−j if 64≤k<128
−1 if 128≤k<192
j if 192≤k<256
−1 if 256≤k<320
j if 320≤k
or
Gamma_k,240=1 if k<−320
−j if −320≤k<−256
1 if −256≤k<−192
−j if −192≤k<−128
−1 if −128≤k<−64
j if −64≤k<0
−1 if 0≤k<64
j if 64≤k<128
−1 if 128≤k<192
j if 192≤k<256
−1 if 256≤k<320
j if 320≤k

TABLE 27

| L-STF | L-LTF |
|---|---|
| 8.9075 | 10.0373 |

Gamma_k, 240=1 if k<−320
−1 if −320≤k<−256
−1 if −256≤k<−192
−1 if −192≤k<−128
1 if −128≤k<−64
−1 if −64≤k<0
−1 if 0≤k<64
−1 if 64≤k<128
−1 if 128≤k<192
1 if 192≤k<256
1 if 256≤k<320
1 if 320≤k
or
Gamma_k,240=1 if k<−320
−1 if −320≤k<−256
−1 if −256≤k<−192
−1 if −192≤k<−128
−1 if −128≤k<−64
1 if −64≤k<0
1 if 0≤k<64
1 if 64≤k<128
−1 if 128≤k<192
1 if 192≤k<256
1 if 256≤k<320
1 if 320≤k

TABLE 28

| L-STF | L-LTF |
|---|---|
| 7.5346 | 8.5907 |

A subcarrier index may be calibrated and also applied to a non-contiguous 240 MHz. And, in the equation presented above, the phase rotation of −384≤k<−128 may be applied to the 80 MHz having a lowest frequency, the phase rotation of −128≤k<128 may be applied to the 80 MHz having a second lowest frequency, and the phase rotation of 128≤k<384 may be applied to the 80 MHz having a highest frequency.

In light of the overall packet, the seventh group of phase rotations, which minimizes the PAPR of the L-LTF having the greater PAPR value, may be preferred.

D. 320 MHz (apply 80 MHz preamble puncturing, when 320 MHz band is represented by subcarrier index, −512≤k<511)

320 MHz includes both contiguous 320 MHz/non-contiguous 320 MHz, and the non-contiguous 320 MHz may be 240+80/80+240/160+160/160+80+80/80+160+80/80+80+160/80+80+80+80 MHz.

1) Repeat 80 MHz Phase Rotation

This is a same approach as the method used in the existing 11ax. And, in a situation where a contiguous/non-contiguous 320 MHz packet is transmitted for each 80 MHz/160 MHz/240 MHz by using multiple RFs, the phase rotations may all be the same, which may facilitate the implementation. The contiguous 320 MHz may be expressed as shown below, and the maximum PAPR is also as shown below.

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k<384
−1 if 384≤k<448
−1 if 448≤k<512

TABLE 29

| L-STF | L-LTF |
|---|---|
| 11.2703 | 11.8144 |

Gamma_k,320=1 if k<−448
1 if −448≤k<−384
−1 if −384≤k<−320
1 if −320≤k<−256
1 if −256≤k<−192
−1 if −192≤k<−128

−1 if −128≤k<−64
1 if −64≤k<0
1 if 0≤k<64
−1 if 64≤k<128
−1 if 128≤k<192
1 if 192≤k<256
1 if 256≤k<320
−1 if 320≤k<384
−1 if 384≤k<448
1 if 448≤k<512

TABLE 30

| L-STF | L-LTF |
|---|---|
| 11.2703 | 11.8144 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k<384
1 if 384≤k<448
j if 448≤k<512

TABLE 31

| L-STF | L-LTF |
|---|---|
| 11.1203 | 12.2568 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k<384
1 if 384≤k<448
−j if 448≤k<512

TABLE 32

| L-STF | L-LTF |
|---|---|
| 11.1203 | 12.2931 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

[Table 33]

TABLE 33

| L-STF | L-LTF |
|---|---|
| 8.2600 | 9.2473 |

In a non-contiguous 320 MHz, the phase rotations of each contiguous 80/160/240 MHz may be proposed as shown in 1) of A and B and in 1) of C.

The simple repetition of the phase rotation that is presented in the above-described various proposals has a relatively poor PAPR as compared to the following proposal of 2), and, most particularly, the repetition of the existing phase rotation has a poorer PAPR as compared to other phase rotations. Therefore, the proposals presented above may not be preferable.

2) Repeat 80 MHz Phase Rotation and Add Phase Rotation in 80 MHz Bandwidth Units This is a method of optimizing the PAPR even more by repeating the 80 MHz phase rotation four times and additionally applying a phase rotation in each 80 MHz unit. In a situation where a contiguous/non-contiguous 320 MHz packet is transmitted for each 80 MHz/160 MHz/240 MHz by using multiple RFs, this is a situation where the same 80 MHz phase rotation is applied to each RF and additional phase rotation per 80 MHz is applied.

The following indicates a phase rotation having the phase rotation being optimized in 80 MHz bandwidth units added thereto in L-STF and L-LTF and the PAPR.

Gamma_k,320=1 if k<−448
1 if −448≤k<−384
−1 if −384≤k<−320
−1 if −320≤k<−256
j if −256≤k<−192
j if −192≤k<−128
−j if −128≤k<−64
−j if −64≤k<0
1 if 0≤k<64
1 if 64≤k<128
−1 if 128≤k<192
−1 if 192≤k<256
j if 256≤k<320
j if 320≤k<384
−j if 384≤k<448
−j if 448≤k<512 or

Gamma_k,320=1 if k<−448
1 if −448≤k<−384
−1 if −384≤k<−320
−1 if −320≤k<−256
−j if −256≤k<−192
−j if −192≤k<−128
j if −128≤k<−64
j if −64≤k<0

1 if 0≤k<64
1 if 64≤k<128
−1 if 128≤k<192
−1 if 192≤k<256
−j if 256≤k<320
−j if 320≤k<384
j if 384≤k<448
j if 448≤k<512

TABLE 34

| L-STF | L-LTF |
|---|---|
| 9.3305 | 9.8631 |

Gamma_k,320=1 if k<−448
−1 if −448≤k<−384
−1 if −384≤k<−320
1 if −320≤k<−256
j if −256≤k<−192
−j if −192≤k<−128
−j if −128≤k<−64
j if −64≤k<0
1 if 0≤k<64
−1 if 64≤k<128
−1 if 128≤k<192
1 if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
−j if −256≤k<−192
j if −192≤k<−128
j if −128≤k<−64
−j if −64≤k<0
1 if 0≤k<64
−1 if 64≤k<128
−1 if 128≤k<192
1 if 192≤k<256
−j if 256≤k<320
j if 320≤k<384
j if 384≤k<448
−j if 448≤k<512

TABLE 35

| L-STF | L-LTF |
|---|---|
| 9.3515 | 9.9461 |

Gamma_k,320=1 if k<−448
j if −448≤k<−384
1 if −384≤k<−320
j if −320≤k<−256
−j if −256≤k<−192
1 if −192≤k<−128
−j if −128≤k<−64
1 if −64≤k<0
1 if 0≤k<64
j if 64≤k<128
1 if 128≤k<192
j if 192≤k<256
−j if 256≤k<320
1 if 320≤k<384
−j if 384≤k<448
1 if 448≤k<512

TABLE 36

| L-STF | L-LTF |
|---|---|
| 8.8825 | 10.2593 |

Gamma_k,320=1 if k<−448
−j if −448≤k<−384
1 if −384≤k<−320
−j if −320≤k<−256
j if −256≤k<−192
1 if −192≤k<−128
j if −128≤k<−64
1 if −64≤k<0
1 if 0≤k<64
−j if 64≤k<128
1 if 128≤k<192
−j if 192≤k<256
j if 256≤k<320
1 if 320≤k<384
j if 384≤k<448
1 if 448≤k<512

TABLE 37

| L-STF | L-LTF |
|---|---|
| 8.8825 | 10.2593 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 38

| L-STF | L-LTF |
|---|---|
| 7.7653 | 8.4665 |

A subcarrier index may be calibrated and also applied to a non-contiguous 320 MHz. And, in the equation presented above, the phase rotation of −512≤k<−256 may be applied to the 80 MHz having a lowest frequency, the phase rotation of −256≤k<0 may be applied to the 80 MHz having a second lowest frequency, the phase rotation of 0≤k<256 may be applied to the 80 MHz having a third lowest frequency, and the phase rotation of 256≤k<512 may be applied to the 80 MHz having a highest frequency.

Although the complexity in the implementation may be increased, since the PAPR is good, this may be a preferred method. And, most particularly, the fifth group of phase rotations, which minimizes the PAPR of the L-LTF having the greater PAPR value, may be preferred.

3) Repeat 160 MHz Phase Rotation

In this method, by repeating the 160 MHz phase rotation (the phase rotation proposed in B) two times, and in a situation where a contiguous/non-contiguous 320 MHz packet is transmitted for each 160 MHz by using multiple RFs, the phase rotations may all be the same, which may facilitate the implementation. However, the phase rotation being applied to each RF capable of transmitting a maximum of 80 MHz/240 MHz may vary depending upon the bandwidth position. The contiguous 320 MHz may be expressed as shown below, and the maximum PAPR is also as shown below.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
1 if 0≤k<64
j if 64≤k<128
1 if 128≤k<192
j if 192≤k<256
−j if 256≤k<320
−1 if 320≤k<384
−j if 384≤k<448
−1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
1 if 0≤k<64
−j if 64≤k<128
1 if 128≤k<192
−j if 192≤k<256
j if 256≤k<320
−1 if 320≤k<384
j if 384≤k<448
−1 if 448≤k<512

TABLE 39

| L-STF | L-LTF |
|---|---|
| 10.7332 | 12.1712 |

Gamma_k,320=1 if k<−448
1 if −448≤k<−384
−1 if −384≤k<−320
−1 if −320≤k<−256
−j if −256≤k<−192
j if −192≤k<−128
j if −128≤k<−64
−j if −64≤k<0
1 if 0≤k<64
1 if 64≤k<128
−1 if 128≤k<192
−1 if 192≤k<256
−j if 256≤k<320
j if 320≤k<384
j if 384≤k<448
−j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
1 if 0≤k<64
1 if 64≤k<128
−1 if 128≤k<192
−1 if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
1 if 0≤k<64
−1 if 64≤k<128
−1 if 128≤k<192
1 if 192≤k<256
j if 256≤k<320
j if 320≤k<384
−j if 384≤k<448
−j if 448≤k<512
or
Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
j if −64≤k<0
1 if 0≤k<64
−1 if 64≤k<128
−1 if 128≤k<192
1 if 192≤k<256
−j if 256≤k<320
−j if 320≤k<384
j if 384≤k<448
j if 448≤k<512

TABLE 40

| L-STF | L-LTF |
|---|---|
| 11.2703 | 11.8163 |

Gamma_k,320=1 if k<−448
−1 if −448≤k<−384
−1 if −384≤k<−320
−1 if −320≤k<−256
1 if −256≤k<−192

−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

TABLE 41

| L-STF | L-LTF |
|---|---|
| 8.2600 | 9.2473 |

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k<384
−1 if 384≤k<448
−1 if 448≤k<512

TABLE 42

| L-STF | L-LTF |
|---|---|
| 11.2703 | 11.8144 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
1 if 0≤k<64
−1 if 64≤k<128
−1 if 128≤k<192
1 if 192≤k<256
1 if 256≤k<320
−1 if 320≤k<384
−1 if 384≤k<448
1 if 448≤k<512

TABLE 43

| L-STF | L-LTF |
|---|---|
| 11.2703 | 11.8144 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k<384
1 if 384≤k<448
j if 448≤k<512

TABLE 44

| L-STF | L-LTF |
|---|---|
| 11.1203 | 12.2568 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k<384
1 if 384≤k<448
−j if 448≤k<512

TABLE 45

| L-STF | L-LTF |
|---|---|
| 11.1203 | 12.2931 |

Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0
1 if 0≤k<64
−1 if 64≤k<128
−1 if 128≤k<192
−1 if 192≤k<256
−1 if 256≤k<320
1 if 320≤k<384
1 if 384≤k<448
1 if 448≤k<512

TABLE 46

| L-STF | L-LTF |
|---|---|
| 10.3686 | 11.4791 |

A subcarrier index may be calibrated and also applied to any form of non-contiguous 320 MHz. And, in the equation presented above, the phase rotation of $-512 \leq k < -256$ may be applied to the 80 MHz having a lowest frequency, the phase rotation of $-256 \leq k < 0$ may be applied to the 80 MHz having a second lowest frequency, the phase rotation of $0 \leq k < 256$ may be applied to the 80 MHz having a third lowest frequency, and the phase rotation of $256 \leq k < 512$ may be applied to the 80 MHz having a highest frequency.

However, the PAPR is not always good in all cases. The simple repetition of the phase rotation that is presented in the above-described various proposals has a relatively poor PAPR as compared to the following proposal of 4). And, therefore, the proposals presented above may not be preferable.

4) Repeat 160 MHz Phase Rotation and Add Phase Rotation in 160 MHz Bandwidth Units In this method, by repeating the 160 MHz phase rotation (the phase rotation proposed in B) two times, and by additionally applying phase rotation in each 160 MHz unit, the PAPR may be more optimized. In a situation where a contiguous/non-contiguous 320 MHz packet is transmitted for each 160 MHz by using two RFs, this is a situation where the same 160 MHz phase rotation is applied to each RF and additional phase rotation per 160 MHz is applied. However, the phase rotation being applied to each RF capable of transmitting a maximum of 80 MHz/240 MHz may vary depending upon the bandwidth position.

The following indicates a phase rotation having the phase rotation being optimized in 160 MHz bandwidth units added thereto in L-STF and L-LTF and the PAPR.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
−1 if 0≤k<64
−j if 64≤k<128
−1 if 128≤k<192
−j if 192≤k<256
j if 256≤k<320
1 if 320≤k<384
j if 384≤k<448
1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
−1 if 0≤k<64
j if 64≤k<128
−1 if 128≤k<192
j if 192≤k<256
−j if 256≤k<320
1 if 320≤k<384
−j if 384≤k<448
1 if 448≤k<512

TABLE 47

| L-STF | L-LTF |
|---|---|
| 8.8322 | 9.9083 |

Gamma_k,320=1 if k<−448
1 if −448≤k<−384
−1 if −384≤k<−320
−1 if −320≤k<−256
−j if −256≤k<−192
j if −192≤k<−128
j if −128≤k<−64
−j if −64≤k<0
−1 if 0≤k<64
−1 if 64≤k<128
1 if 128≤k<192
1 if 192≤k<256
j if 256≤k<320
−j if 320≤k<384
−j if 384≤k<448
j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
−1 if 0≤k<64
−1 if 64≤k<128
1 if 128≤k<192
1 if 192≤k<256
−j if 256≤k<320
j if 320≤k<384
j if 384≤k<448
−j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
−1 if 0≤k<64
1 if 64≤k<128
1 if 128≤k<192
−1 if 192≤k<256
−j if 256≤k<320
−j if 320≤k<384
j if 384≤k<448
j if 448≤k<512
or
Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
j if −64≤k<0
−1 if 0≤k<64
1 if 64≤k<128

1 if 128≤k<192
−1 if 192≤k<256
j if 256≤k<320
j if 320≤k<384
−j if 384≤k<448
−j if 448≤k<512

TABLE 48

| L-STF | L-LTF |
|---|---|
| 8.9784 | 9.7256 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 49

| L-STF | L-LTF |
|---|---|
| 7.7653 | 8.4665 |

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
−1 if 0≤k<64
−1 if 64≤k<128
1 if 128≤k<192
1 if 192≤k<256
−1 if 256≤k<320
−1 if 320≤k<384
1 if 384≤k<448
1 if 448≤k<512

TABLE 50

| L-STF | L-LTF |
|---|---|
| 9.6486 | 10.3406 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
−1 if 0≤k<64

1 if 64≤k<128
1 if 128≤k<192
−1 if 192≤k<256
−1 if 256≤k<320
1 if 320≤k<384
1 if 384≤k<448
−1 if 448≤k<512

TABLE 51

| L-STF | L-LTF |
|---|---|
| 9.7113 | 10.4069 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
−1 if 0≤k<64
−j if 64≤k<128
−1 if 128≤k<192
−j if 192≤k<256
−1 if 256≤k<320
−j if 320≤k<384
−1 if 384≤k<448
−j if 448≤k<512

TABLE 52

| L-STF | L-LTF |
|---|---|
| 9.5624 | 10.6578 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
−1 if 0≤k<64
j if 64≤k<128
−1 if 128≤k<192
j if 192≤k<256
−1 if 256≤k<320
j if 320≤k<384
−1 if 384≤k<448
j if 448≤k<512

TABLE 53

| L-STF | L-LTF |
|---|---|
| 9.5624 | 10.6578 |

Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0

−1 if 0≤k<64
1 if 64≤k<128
1 if 128≤k<192
1 if 192≤k<256
1 if 256≤k<320
−1 if 320≤k<384
−1 if 384≤k<448
−1 if 448≤k<512

TABLE 54

| L-STF | L-LTF |
|---|---|
| 8.2391 | 9.1188 |

A subcarrier index may be calibrated and also applied to any form of non-contiguous 320 MHz. And, in the equation presented above, the phase rotation of −512≤k<−256 may be applied to the 80 MHz having a lowest frequency, the phase rotation of −256≤k<0 may be applied to the 80 MHz having a second lowest frequency, the phase rotation of 0≤k<256 may be applied to the 80 MHz having a third lowest frequency, and the phase rotation of 256≤k<512 may be applied to the 80 MHz having a highest frequency.

Since the proposal presented above may have higher complexity and poorer PAPR as compared to the proposals of D. 2), this method may not be preferable.

A same value may be multiplied to the phase rotation value, which is proposed above, and then used (e.g., 1 or −1 or j or −j may be multiplied and used), or the order may be changed and used (e.g., the order may be changed to an order starting from a low frequency to a high frequency, and [1 −1 −1 −1 1 −1 −1 −1] may be used by being changed to [−1 −1 −1 1 −1 −1 −1 1]), or the order may be changed and the same value may be multiplied thereto and used (e.g., the order may be changed to an order starting from a low frequency to a high frequency, and [1 −1 −1 −1 1 −1 −1 −1] may have its order changed and then multiplied by −1 so that [1 1 1 −1 1 1 1 −1] can be used). And, in this case, the same PAPR is given.

Hereinafter, an example of an OFDMA transmission in a 160 MHz, 240 MHz or 320 MHz band according to the present embodiment will be described in detail.

Herein, an AP may transmit a PPDU to STA 1 to STA 3. The PPDU may include control information including information on atone plan. The STA 1 to STA 3 may transmit and receive data in RU units based on the information on the tone plan at 160 MHz, 240 MHz, or 320 MHz.

That is, the AP may transmit information on the tone plan to all STAs within the BSS at 160 MHz, 240 MHz, or 320 MHz, and the STA may obtain scheduling information of its data based on the information on the tone plan. Thus, among all the STAs within the BSS, STA 1 to STA 3 having data may transmit and receive data through the allocated RU based on the information on the tone plan. The data may include both downlink data and uplink data.

Figure 20:
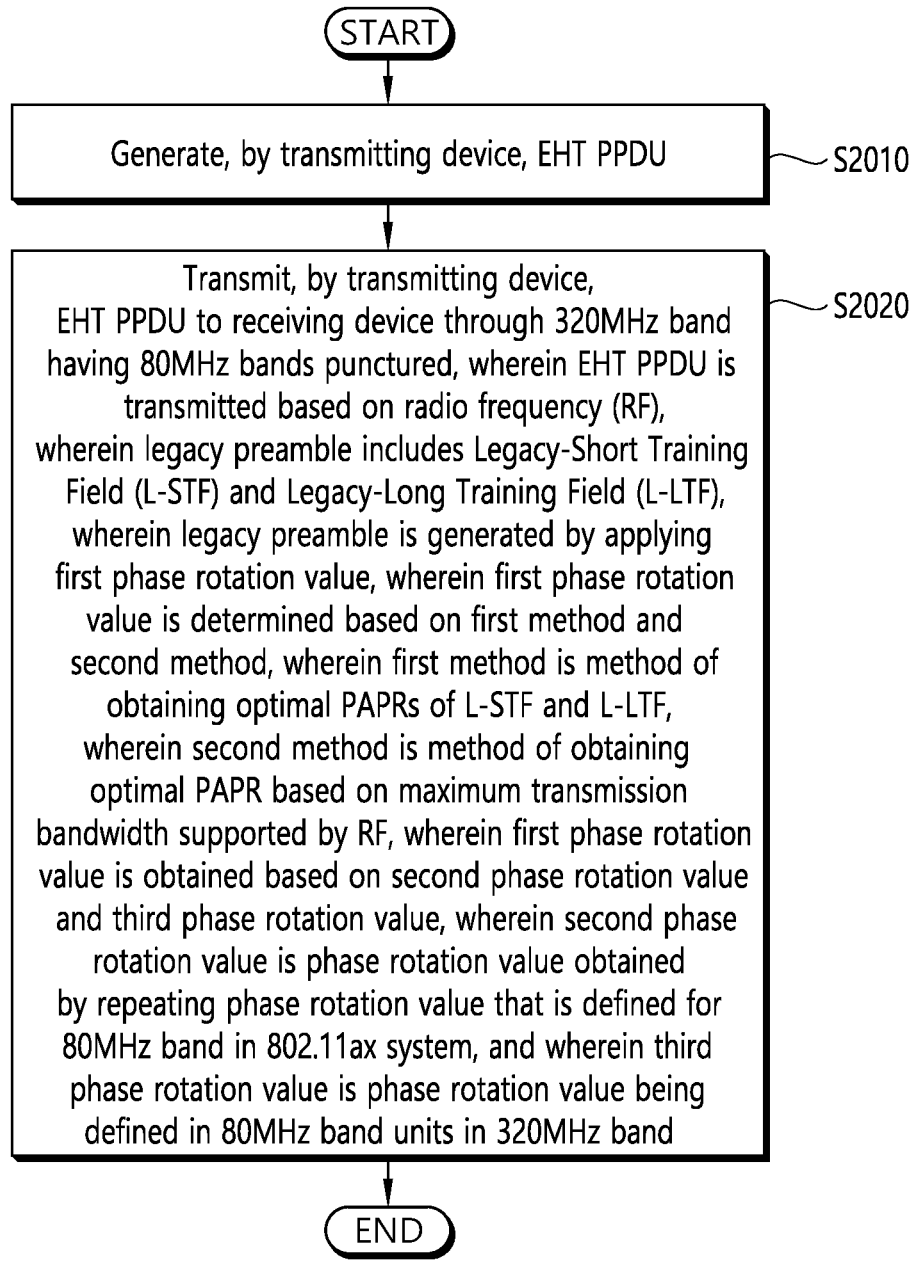
FIG. 20 is a flow chart showing a procedure for transmitting an EHT PPDU according to the present embodiment.

FIG. 20 is a flow chart showing a procedure for transmitting an EHT PPDU according to the present embodiment.

The example of FIG. 20 may be performed in a network environment being supported by a next generation wireless LAN system. The next generation wireless LAN system is an enhanced version of the 802.11ax system, which can satisfy backward compatibility with the 802.11ax system. The next generation wireless LAN system may also correspond to an Extreme High Throughput (EHT) wireless LAN system or an 802.11be wireless LAN system.

The example of FIG. 20 is performed by a transmitting device, and the transmitting device may correspond to an AP. A receiving device may correspond to an STA (non-AP STA).

This embodiment proposes a method and device for configuring a phase rotation value that can gain a PAPR that is optimized while considering both cases where 80 MHz-based preamble puncturing is performed in 240, 320 MHz bands and where a wireless device having different maximum transmission bandwidths supported by a Radio Frequency (RF) exists. 80 MHz-based preamble puncturing means that a broadband is punctured in 80 MHz band units. That is, proposed herein is a phase rotation value minimizing a maximum PAPR while applying 80 MHz-based preamble puncturing in 240 MHz/320 MHz bands and considering all RF capabilities of a wireless device having different maximum transmission bandwidths of an RF within a BSS. EHT PPDUs being proposed in this embodiment may all be transmitted/received in 240 MHz/320 MHz bands. Herein, however, the description will be limited only to the 320 MHz band.

In step S2010, a transmitting device generates the EHT Physical Protocol Data Unit (PPDU). The EHT PPDU includes a legacy preamble and an EHT field.

In step S2020, the transmitting device transmits the PPDU to a receiving device through a 320 MHz band having 80 MHz bands punctured.

The legacy preamble includes a Legacy-Short Training Field (L-STF) and a Legacy-Long Training Field (L-LTF). Additionally, the legacy preamble may further include a Legacy-Signal (L-SIG). The EHT field may include EHT-SIG, EHT-STF, EHT-LTF, and a data field. The legacy field may be a field that is supported by a wireless LAN system preceding 802.11be, and the EHT field may be a field that is supported by an 802.11be wireless LAN system.

The EHT PPDU is transmitted based on a radio frequency (RF). More specifically, the transmitting device may transmit an EHT PPDU within the 320 MHz band through a transmittable bandwidth supported by the RF (i.e., RF capacity).

The legacy preamble is generated by applying a first phase rotation value. That is, all fields included in the legacy preamble may commonly have the first phase rotation value applied thereto.

The first phase rotation value is determined based on a first method and a second method.

The first method is a method for obtaining an optimal PAPR of the L-STF and the L-LTF. The second method is a method for obtaining an optimal PAPR based on a maximum transmission bandwidth that is supported by the RF.

That is, the first phase rotation value is a phase rotation value that is defined for optimal PAPRs of L-STF and L-LTF. If the PAPRs of L-STF and L-LTF are great (or large), the first phase rotation value may be applied to the legacy preamble in order to minimize the PAPR values. Additionally, the first phase rotation value is also a phase rotation value for minimizing a maximum PAPR, which is obtained while considering all maximum transmission bandwidths supported by the RF. That is, the first phase rotation value may be a phase rotation value that is defined for obtaining optimal PAPRs of L-STF and L-LTF in a situation considering various RF capabilities.

The first phase rotation value is obtained based on a second phase rotation value and a third phase rotation value.

The second phase rotation value is a phase rotation value obtained by repeating a phase rotation value that is defined for an 80 MHz band in an 802.11ax system. Since the EHT PPDU is transmitted through the 320 MHz band, the second phase rotation value may be obtained by repeating four times the phase rotation value of the 80 MHz band, which optimizes the PAPRs in the L-STF and L-LTF and is applied in 20 MHz band units. If the PPDU is said to be transmitted through a 160 MHz band, the second phase rotation value may be obtained by repeating two times the phase rotation value of the 80 MHz band (optimizing the PAPRs in the L-STF and L-LTF and being applied in 20 MHz band units). And, if the PPDU is said to be transmitted through a 240 MHz band, the second phase rotation value may be obtained by repeating three times the phase rotation value (optimizing the PAPRs in the L-STF and L-LTF and being applied in 20 MHz band units).

The third phase rotation value is a phase rotation value being defined in 80 MHz band units in the 320 MHz band based on optimal PAPRs of the L-STF and the L-LTF. Since the 320 MHz band may be divided into 4 units of 80 MHz band, a third phase rotation value may be defined for each of the four 80 MHz bands. If the EHT PPDU is said to be transmitted through a 160 MHz band, a third phase rotation value may be defined for each of two 80 MHz bands, based on the optimal PAPRs of the L-STF and the L-LTF. If the EHT PPDU is said to be transmitted through a 240 MHz band, a third phase rotation value may be defined for each of three 80 MHz bands, based on the optimal PAPRs of the L-STF and the L-LTF.

That is, this embodiment proposes a method for additionally performing phase rotation (the third phase rotation value) for each 80 MHz band unit within a full band while applying a phase rotation value (the second phase rotation value) being defined for the 80 MHz band.

Hereinafter, a subcarrier range having the phase rotation value applied thereto will be described.

The 320 MHz is configured of subcarriers having subcarrier indexes from −512 to 511.

The second rotation phase value is [1 −1 −1 −1 1 −1 −1 −1 1 −1 −1 −1 1 −1 −1 −1]. This is because the rotation phase value being defined for the 80 MHz band has been repeated 4 times.

Among the second rotation phase value, a first value 1 may be applied to a subcarrier having subcarrier indexes from −512 to −449, among the second rotation phase value, a second value −1 may be applied to a subcarrier having subcarrier indexes from −448 to −385, among the second rotation phase value, a third value −1 may be applied to a subcarrier having subcarrier indexes from −384 to −321, and, among the second rotation phase value, a fourth value −1 may be applied to a subcarrier having subcarrier indexes from −320 to −257. That is, [1 −1 −1 −1] being the first to fourth values of the second rotation phase value may be applied to a first 80 MHz band within the 320 MHz band.

Among the second rotation phase value, a fifth value 1 may be applied to a subcarrier having subcarrier indexes from −256 to −193, among the second rotation phase value, a sixth value −1 may be applied to a subcarrier having subcarrier indexes from −192 to −129, among the second rotation phase value, a seventh value −1 may be applied to a subcarrier having subcarrier indexes from −128 to −65, and, among the second rotation phase value, an eighth value −1 may be applied to a subcarrier having subcarrier indexes from −64 to −1. That is, [1 −1 −1 −1] being the fifth to eighth values of the second rotation phase value may be applied to a second 80 MHz band within the 320 MHz band.

Among the second rotation phase value, a ninth value 1 may be applied to a subcarrier having subcarrier indexes from 0 to 63, among the second rotation phase value, a tenth value −1 may be applied to a subcarrier having subcarrier indexes from 64 to 127, among the second rotation phase value, an eleventh value −1 may be applied to a subcarrier having subcarrier indexes from 128 to 191, and, among the second rotation phase value, a twelfth value −1 may be applied to a subcarrier having subcarrier indexes from 192 to 255. That is, [1 −1 −1 −1] being the ninth to twelfth values of the second rotation phase value may be applied to a third 80 MHz band within the 320 MHz band.

Among the second rotation phase value, a thirteenth value 1 may be applied to a subcarrier having subcarrier indexes from 256 to 319, among the second rotation phase value, a fourteenth value −1 may be applied to a subcarrier having subcarrier indexes from 320 to 383, among the second rotation phase value, a fifteenth value −1 may be applied to a subcarrier having subcarrier indexes from 384 to 447, and, among the second rotation phase value, a sixteenth value −1 may be applied to a subcarrier having subcarrier indexes from 448 to 511. That is, [1 −1 −1 −1] being the thirteenth to sixteenth values of the second rotation phase value may be applied to a fourth 80 MHz band within the 320 MHz band.

For example, the third phase rotation value may be [1 1 −1 −1]. Since the 320 MHz band may be divided into 4 units of 80 MHz band, a third phase rotation value may be defined for each of the four 80 MHz bands.

Among the third rotation phase value, a first value 1 may be applied to a first 80 MHz band within the 320 MHz band, among the third rotation phase value, a second value 1 may be applied to a second 80 MHz band within the 320 MHz band, among the third rotation phase value, a third value −1 may be applied to a third 80 MHz band within the 320 MHz band, and, among the third rotation phase value, a fourth value −1 may be applied to a fourth 80 MHz band within the 320 MHz band.

The first phase rotation value may be obtained based on a multiplication of the second phase rotation value and the third phase rotation value. That is, the first phase rotation value may be obtained by multiplying the second phase rotation value and the third phase rotation value to align with the frequency band (or subcarrier index). At this point, the first phase rotation value is [1 −1 −1 −1 1 −1 −1 −1 −1 1 1 1 −1 1 1 1]. By applying the first phase rotation value to the legacy preamble, optimal PAPRs for L-STF and L-LTF may be ensured for the transmission of a 320 MHz band considering various RF capabilities and having 80 MHz-based preamble puncturing performed therein.

For example, the 80 MHz band may include all 80 MHz bands excluding a primary 80 MHz band. That is, although the primary 80 MHz band may always be used for the PPDU transmission, not all of the remaining 80 MHz bands excluding the primary 80 MHz band may be used for the PPDU transmission. The first and second phase rotation values may be obtained based on a preamble puncturing pattern. The preamble puncturing pattern may be a band pattern having punctured at least one 80 MHz band, among all 80 MHz bands excluding the primary 80 MHz band within the 320 MHz band.

That is, the preamble puncturing pattern may correspond to a pattern of all cases having at least one 80 MHz band punctured in the 320 MHz band. However, the first phase rotation value has one unified form and not a form having various values according to the preamble puncturing pattern.

Additionally, the maximum transmission bandwidth supported by the RF may be 80 MHz, 160 MHz, 240 MHz or 320 MHz. In case the maximum transmission bandwidth supported by the RF is 80 MHz, the transmitting device may transmit a PPDU by using one RF having 80 MHz capacity. In case the maximum transmission bandwidth supported by the RF is 160 MHz, the transmitting device may transmit a PPDU by using two RFs having 80 MHz capacity. In case the maximum transmission bandwidth supported by the RF is 240 MHz, the transmitting device may transmit a PPDU by using three RFs having 80 MHz capacity. In case the maximum transmission bandwidth supported by the RF is 320 MHz, the transmitting device may transmit a PPDU by using four RFs having 80 MHz capacity.

By comparing first to fourth PAPRs, one of the first to fourth PAPRs may be selected as an optimal PAPR that is obtained based on the maximum transmission bandwidth(s) supported by the RF. That is, the transmitting device may calculate a PAPR for each RF having various capacities so as to extract a maximum PAPR value, and, then, the transmitting device may compare the extracted PAPR values so as to determine an optimized phase rotation value. However, the first phase rotation value has one unified form and not a form having various values according to the RF having various capacities.

The first PAPR may be an optimal PAPR that is obtained when the maximum transmission bandwidth supported by the RF is 80 MHz. The second PAPR may be an optimal PAPR that is obtained when the maximum transmission bandwidth supported by the RF is 160 MHz. The third PAPR may be an optimal PAPR that is obtained when the maximum transmission bandwidth supported by the RF is 240 MHz. The fourth PAPR may be an optimal PAPR that is obtained when the maximum transmission bandwidth supported by the RF is 320 MHz.

The L-STF may be generated by applying the first phase rotation value to an L-STF sequence. Additionally, the L-LTF may be generated by applying the first phase rotation value to an L-LTF sequence.

The L-STF sequence may be a sequence being configured by repeating an L-STF sequence that is defined for a 20 MHz band. Since the L-STF is transmitted through the 320 MHz band, the L-STF sequence may be obtained by repeating the L-STF sequence of the 20 MHz band, which is defined in the existing 802.11ax. Similarly, if the L-STF is transmitted through a 160 MHz band, the L-STF sequence of the 20 MHz band, which is defined in the existing 802.11ax, may be repeated two times. And, if the L-STF is transmitted through a 240 MHz band, the L-STF sequence of the 20 MHz band, which is defined in the existing 802.11ax, may be repeated three times.

The L-STF sequence being defined for the 20 MHz band is sqrt(½)*[0 0 0 0 0 0 0 0 1+j 0 0 0 −1 −j 0 0 0 1+j 0 0 0 −1 −j 0 0 0 −1 −j 0 0 0 1+j 0 0 0 0 0 0 0 −1 −j 0 0 0 −1 −j 0 0 0 1+j 0 0 0 1+j 0 0 0 1+j 0 0 0 1+j 0 0 0 0 0 0 0].

The L-LTF sequence may be a sequence being configured by repeating an L-LTF sequence that is defined for a 20 MHz band. Since the L-LTF is transmitted through the 320 MHz band, the L-LTF sequence may be obtained by repeating the L-LTF sequence of the 20 MHz band, which is defined in the existing 802.11ax. Similarly, if the L-LTF is transmitted through a 160 MHz band, the L-LTF sequence of the 20 MHz band, which is defined in the existing 802.11ax, may be repeated two times. And, if the L-LTF is transmitted through a 240 MHz band, the L-LTF sequence of the 20 MHz band, which is defined in the existing 802.11ax, may be repeated three times.

The L-LTF sequence being defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 1 −1 −1 1 −1 −1 1 −1 1 1 −1 −1 1 −1 −1 1 1 1 1 1 0 0 0 0 0].

In the above-described embodiment, even when the PPDU is being transmitted through 80/160/240 MHz bands, a phase rotation value may be defined and applied to the legacy preamble by using the same method.

The EHT-SIG may include EHT-SIG-A and EHT-SIG-B. The EHT-SIG-B may include the RU information. That is, an AP may notify information on a tone plan at 80/160/240/320 MHz through the EHT-SIG-B within the PPDU. Additionally, EHT-STF, EHT-LTF, and data field being included in the EHT field may be transmitted and/or received from/in a band (RU) according to a tone plan at 80/160/240/320 MHz.

Additionally, the EHT-SIG may be generated by applying the first phase rotation value or the second phase rotation value. If an EHT PPDU has a preamble structure, such as that of 11ax, a field may be generated by applying a phase rotation value that even has the same EHT-SIG-B.

Figure 21:
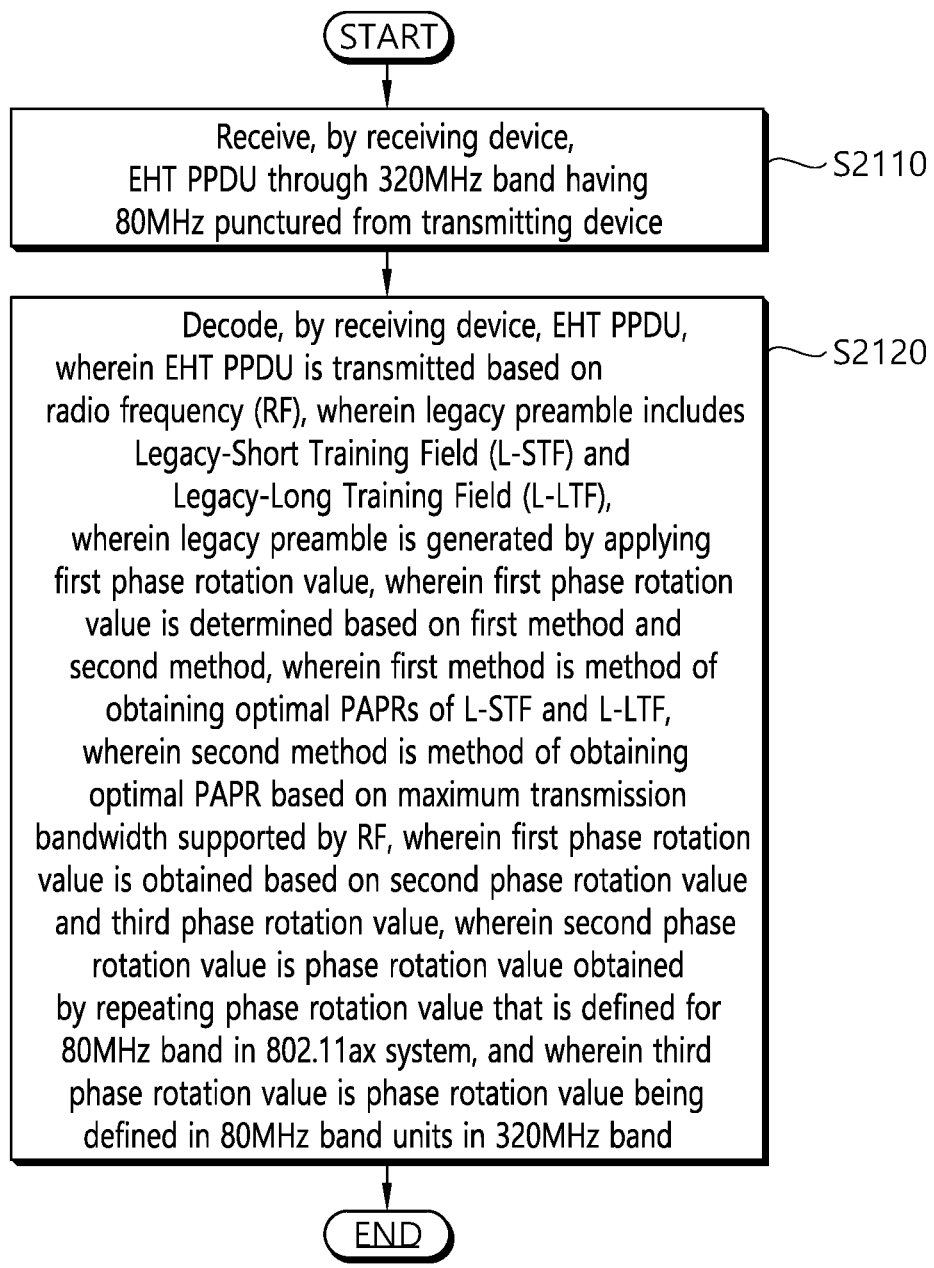
FIG. 21 is a flow chart showing a procedure for receiving an EHT PPDU according to the present embodiment.

FIG. 21 is a flow chart showing a procedure for receiving an EHT PPDU according to the present embodiment.

The example of FIG. 21 may be performed in a network environment being supported by a next generation wireless LAN system. The next generation wireless LAN system is an enhanced version of the 802.11ax system, which can satisfy backward compatibility with the 802.11ax system. The next generation wireless LAN system may also correspond to an Extreme High Throughput (EHT) wireless LAN system or an 802.11be wireless LAN system.

The example of FIG. 21 may be performed by a receiving device, and the receiving device may correspond to an STA (non-AP STA). A transmitting device may correspond to an AP.

This embodiment proposes a method and device for configuring a phase rotation value that can gain a PAPR that is optimized while considering both cases where 80 MHz-based preamble puncturing is performed in 240, 320 MHz bands and where a wireless device having different maximum transmission bandwidths supported by a Radio Frequency (RF) exists. 80 MHz-based preamble puncturing means that a broadband is punctured in 80 MHz band units. That is, proposed herein is a phase rotation value minimizing a maximum PAPR while applying 80 MHz-based preamble puncturing in 240 MHz/320 MHz bands and considering all RF capabilities of a wireless device having different maximum transmission bandwidths of an RF within a BSS. EHT PPDUs being proposed in this embodiment may all be transmitted/received in 240 MHz/320 MHz bands. Herein, however, the description will be limited only to the 320 MHz band.

In step S2110, the receiving device receives the EHT PPDU through a 320 MHz band having 80 MHz punctured from a transmitting device. The EHT PPDU includes a legacy preamble and an EHT field.

In step S2120, the receiving device decodes the EHT PPDU.

The legacy preamble includes a Legacy-Short Training Field (L-STF) and a Legacy-Long Training Field (L-LTF). Additionally, the legacy preamble may further include a Legacy-Signal (L-SIG). The EHT field may include EHT-SIG, EHT-STF, EHT-LTF, and a data field. The legacy field may be a field that is supported by a wireless LAN system preceding 802.11be, and the EHT field may be a field that is supported by an 802.11be wireless LAN system.

The EHT PPDU is transmitted based on a radio frequency (RF). More specifically, the transmitting device may transmit an EHT PPDU within the 320 MHz band through a transmittable bandwidth supported by the RF (i.e., RF capacity).

The legacy preamble is generated by applying a first phase rotation value. That is, all fields included in the legacy preamble may commonly have the first phase rotation value applied thereto.

The first phase rotation value is determined based on a first method and a second method.

The first method is a method for obtaining an optimal PAPR of the L-STF and the L-LTF. The second method is a method for obtaining an optimal PAPR based on a maximum transmission bandwidth that is supported by the RF.

That is, the first phase rotation value is a phase rotation value that is defined for optimal PAPRs of L-STF and L-LTF. If the PAPRs of L-STF and L-LTF are great (or large), the first phase rotation value may be applied to the legacy preamble in order to minimize the PAPR values. Additionally, the first phase rotation value is also a phase rotation value for minimizing a maximum PAPR, which is obtained while considering all maximum transmission bandwidths supported by the RF. That is, the first phase rotation value may be a phase rotation value that is defined for obtaining optimal PAPRs of L-STF and L-LTF in a situation considering various RF capabilities.

The first phase rotation value is obtained based on a second phase rotation value and a third phase rotation value.

The second phase rotation value is a phase rotation value obtained by repeating a phase rotation value that is defined for an 80 MHz band in an 802.11ax system. Since the EHT PPDU is transmitted through the 320 MHz band, the second phase rotation value may be obtained by repeating four times the phase rotation value of the 80 MHz band, which optimizes the PAPRs in the L-STF and L-LTF and is applied in 20 MHz band units. If the PPDU is said to be transmitted through a 160 MHz band, the second phase rotation value may be obtained by repeating two times the phase rotation value of the 80 MHz band (optimizing the PAPRs in the L-STF and L-LTF and being applied in 20 MHz band units). And, if the PPDU is said to be transmitted through a 240 MHz band, the second phase rotation value may be obtained by repeating three times the phase rotation value (optimizing the PAPRs in the L-STF and L-LTF and being applied in 20 MHz band units).

The third phase rotation value is a phase rotation value being defined in 80 MHz band units in the 320 MHz band based on optimal PAPRs of the L-STF and the L-LTF. Since the 320 MHz band may be divided into 4 units of 80 MHz band, a third phase rotation value may be defined for each of the four 80 MHz bands. If the EHT PPDU is said to be transmitted through a 160 MHz band, a third phase rotation value may be defined for each of two 80 MHz bands, based on the optimal PAPRs of the L-STF and the L-LTF. If the EHT PPDU is said to be transmitted through a 240 MHz band, a third phase rotation value may be defined for each of three 80 MHz bands, based on the optimal PAPRs of the L-STF and the L-LTF.

That is, this embodiment proposes a method for additionally performing phase rotation (the third phase rotation value) for each 80 MHz band unit within a full band while applying a phase rotation value (the second phase rotation value) being defined for the 80 MHz band.

Hereinafter, a subcarrier range having the phase rotation value applied thereto will be described.

The 320 MHz is configured of subcarriers having subcarrier indexes from −512 to 511.

The second rotation phase value is [1 −1 −1 −1 1 −1 −1 −1 1 −1 −1 −1 1 −1 −1 −1]. This is because the rotation phase value being defined for the 80 MHz band has been repeated 4 times.

Among the second rotation phase value, a first value 1 may be applied to a subcarrier having subcarrier indexes from −512 to −449, among the second rotation phase value, a second value −1 may be applied to a subcarrier having subcarrier indexes from −448 to −385, among the second rotation phase value, a third value −1 may be applied to a subcarrier having subcarrier indexes from −384 to −321, and, among the second rotation phase value, a fourth value −1 may be applied to a subcarrier having subcarrier indexes from −320 to −257. That is, [1 −1 −1 −1] being the first to fourth values of the second rotation phase value may be applied to a first 80 MHz band within the 320 MHz band.

Among the second rotation phase value, a fifth value 1 may be applied to a subcarrier having subcarrier indexes from −256 to −193, among the second rotation phase value, a sixth value −1 may be applied to a subcarrier having subcarrier indexes from −192 to −129, among the second rotation phase value, a seventh value −1 may be applied to a subcarrier having subcarrier indexes from −128 to −65, and, among the second rotation phase value, an eighth value −1 may be applied to a subcarrier having subcarrier indexes from −64 to −1. That is, [1 −1 −1 −1] being the fifth to eighth values of the second rotation phase value may be applied to a second 80 MHz band within the 320 MHz band.

Among the second rotation phase value, a ninth value 1 may be applied to a subcarrier having subcarrier indexes from 0 to 63, among the second rotation phase value, a tenth value −1 may be applied to a subcarrier having subcarrier indexes from 64 to 127, among the second rotation phase value, an eleventh value −1 may be applied to a subcarrier having subcarrier indexes from 128 to 191, and, among the second rotation phase value, a twelfth value −1 may be applied to a subcarrier having subcarrier indexes from 192 to 255. That is, [1 −1 −1 −1] being the ninth to twelfth values of the second rotation phase value may be applied to a third 80 MHz band within the 320 MHz band.

Among the second rotation phase value, a thirteenth value 1 may be applied to a subcarrier having subcarrier indexes from 256 to 319, among the second rotation phase value, a fourteenth value −1 may be applied to a subcarrier having subcarrier indexes from 320 to 383, among the second rotation phase value, a fifteenth value −1 may be applied to a subcarrier having subcarrier indexes from 384 to 447, and, among the second rotation phase value, a sixteenth value −1 may be applied to a subcarrier having subcarrier indexes from 448 to 511. That is, [1 −1 −1 −1] being the thirteenth to sixteenth values of the second rotation phase value may be applied to a fourth 80 MHz band within the 320 MHz band.

For example, the third phase rotation value may be [1 1 −1 −1]. Since the 320 MHz band may be divided into 4 units of 80 MHz band, a third phase rotation value may be defined for each of the four 80 MHz bands.

Among the third rotation phase value, a first value 1 may be applied to a first 80 MHz band within the 320 MHz band, among the third rotation phase value, a second value 1 may be applied to a second 80 MHz band within the 320 MHz band, among the third rotation phase value, a third value −1 may be applied to a third 80 MHz band within the 320 MHz band, and, among the third rotation phase value, a fourth value −1 may be applied to a fourth 80 MHz band within the 320 MHz band.

The first phase rotation value may be obtained based on a multiplication of the second phase rotation value and the third phase rotation value. That is, the first phase rotation value may be obtained by multiplying the second phase rotation value and the third phase rotation value to align with the frequency band (or subcarrier index). At this point, the first phase rotation value is [1 −1 −1 −1 1 −1 −1 −1 −1 1 1 1 −1 1 1 1]. By applying the first phase rotation value to the legacy preamble, optimal PAPRs for L-STF and L-LTF may be ensured for the transmission of a 320 MHz band considering various RF capabilities and having 80 MHz-based preamble puncturing performed therein.

For example, the 80 MHz band may include all 80 MHz bands excluding a primary 80 MHz band. That is, although the primary 80 MHz band may always be used for the PPDU transmission, not all of the remaining 80 MHz bands excluding the primary 80 MHz band may be used for the PPDU transmission. The first and second phase rotation values may be obtained based on a preamble puncturing pattern. The preamble puncturing pattern may be a band pattern having punctured at least one 80 MHz band, among all 80 MHz bands excluding the primary 80 MHz band within the 320 MHz band.

That is, the preamble puncturing pattern may correspond to a pattern of all cases having at least one 80 MHz band punctured in the 320 MHz band. However, the first phase rotation value has one unified form and not a form having various values according to the preamble puncturing pattern.

Additionally, the maximum transmission bandwidth supported by the RF may be 80 MHz, 160 MHz, 240 MHz or 320 MHz. In case the maximum transmission bandwidth supported by the RF is 80 MHz, the transmitting device may transmit a PPDU by using one RF having 80 MHz capacity. In case the maximum transmission bandwidth supported by the RF is 160 MHz, the transmitting device may transmit a PPDU by using two RFs having 80 MHz capacity. In case the maximum transmission bandwidth supported by the RF is 240 MHz, the transmitting device may transmit a PPDU by using three RFs having 80 MHz capacity. In case the maximum transmission bandwidth supported by the RF is 320 MHz, the transmitting device may transmit a PPDU by using four RFs having 80 MHz capacity.

By comparing first to fourth PAPRs, one of the first to fourth PAPRs may be selected as an optimal PAPR that is obtained based on the maximum transmission bandwidth(s) supported by the RF. That is, the transmitting device may calculate a PAPR for each RF having various capacities so as to extract a maximum PAPR value, and, then, the transmitting device may compare the extracted PAPR values so as to determine an optimized phase rotation value. However, the first phase rotation value has one unified form and not a form having various values according to the RF having various capacities.

The first PAPR may be an optimal PAPR that is obtained when the maximum transmission bandwidth supported by the RF is 80 MHz. The second PAPR may be an optimal PAPR that is obtained when the maximum transmission bandwidth supported by the RF is 160 MHz. The third PAPR may be an optimal PAPR that is obtained when the maximum transmission bandwidth supported by the RF is 240 MHz. The fourth PAPR may be an optimal PAPR that is obtained when the maximum transmission bandwidth supported by the RF is 320 MHz.

The L-STF may be generated by applying the first phase rotation value to an L-STF sequence. Additionally, the L-LTF may be generated by applying the first phase rotation value to an L-LTF sequence.

The L-STF sequence may be a sequence being configured by repeating an L-STF sequence that is defined for a 20 MHz band. Since the L-STF is transmitted through the 320 MHz band, the L-STF sequence may be obtained by repeating the L-STF sequence of the 20 MHz band, which is defined in the existing 802.11ax. Similarly, if the L-STF is transmitted through a 160 MHz band, the L-STF sequence of the 20 MHz band, which is defined in the existing 802.11ax, may be repeated two times. And, if the L-STF is transmitted through a 240 MHz band, the L-STF sequence of the 20 MHz band, which is defined in the existing 802.11ax, may be repeated three times.

The L-STF sequence being defined for the 20 MHz band is sqrt(½)*[0 0 0 0 0 0 0 0 1+j 0 0 0 −1 −j 0 0 0 1+j 0 0 0 −1 −j 0 0 0 −1 −j 0 0 0 1+j 0 0 0 0 0 0 0 −1 −j 0 0 0 −1 −j 0 0 0 1+j 0 0 0 1+j 0 0 0 1+j 0 0 0 1+j 0 0 0 0 0 0 0].

The L-LTF sequence may be a sequence being configured by repeating an L-LTF sequence that is defined for a 20 MHz band. Since the L-LTF is transmitted through the 320 MHz band, the L-LTF sequence may be obtained by repeating the L-LTF sequence of the 20 MHz band, which is defined in the existing 802.11ax. Similarly, if the L-LTF is transmitted through a 160 MHz band, the L-LTF sequence of the 20 MHz band, which is defined in the existing 802.11ax, may be repeated two times. And, if the L-LTF is transmitted through a 240 MHz band, the L-LTF sequence of the 20 MHz band, which is defined in the existing 802.11ax, may be repeated three times.

The L-LTF sequence being defined for the 20 MHz band is [0 0 0 0 0 0 1 1 −1 −1 1 1 −1 1 −1 1 1 1 1 1 1 −1 −1 1 1 −1 1 −1 1 1 1 0 1 −1 −1 1 1 −1 1 −1 1 −1 1 −1 −1 −1 −1 −1 1 1 −1 −1 1 1 −1 1 −1 1 1 1 1 0 0 0 0 0].

In the above-described embodiment, even when the PPDU is being transmitted through 80/160/240 MHz bands, a phase rotation value may be defined and applied to the legacy preamble by using the same method.

The EHT-SIG may include EHT-SIG-A and EHT-SIG-B. The EHT-SIG-B may include the RU information. That is, an AP may notify information on a tone plan at 80/160/240/320 MHz through the EHT-SIG-B within the PPDU. Additionally, EHT-STF, EHT-LTF, and data field being included in the EHT field may be transmitted and/or received from/in a band (RU) according to a tone plan at 80/160/240/320 MHz.

Additionally, the EHT-SIG may be generated by applying the first phase rotation value or the second phase rotation value. If an EHT PPDU has a preamble structure, such as that of 11ax, a field may be generated by applying a phase rotation value that even has the same EHT-SIG-B.

5. Device Configuration

Figure 22:
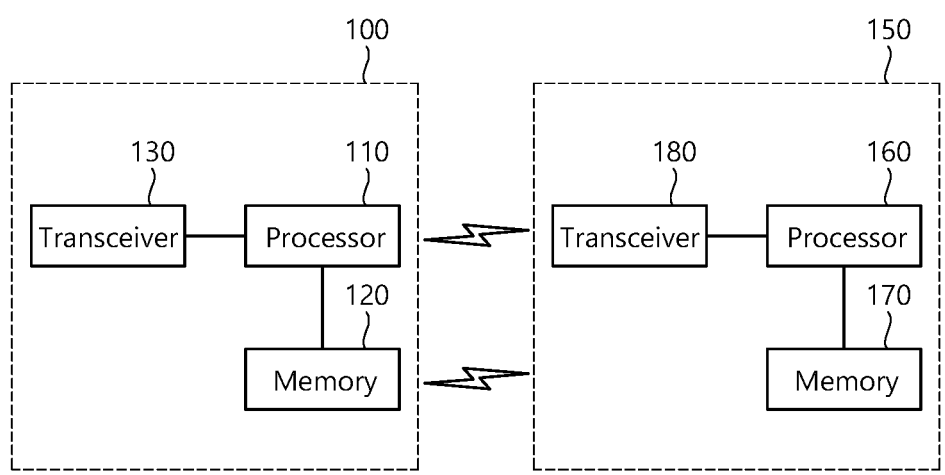
FIG. 22 is a diagram for describing a device for implementing the above-described method.

FIG. 22 is a diagram for describing a device for implementing the above-described method.

A wireless device (100) of FIG. 22 is a transmitting device that can implement the above-described embodiment and may be operated as an AP STA. A wireless device (150) of FIG. 22 is a receiving device that can implement the above-described embodiment and may be operated as a non-AP STA.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

Operations of a processor (110) of the transmitting device will be described in detail as follows. The processor (110) of the transmitting device generates an EHT PPDU and transmits the EHT PPDU based on an RF through a broadband having 80 MHz-based preamble puncturing performed therein.

Operations of a processor (160) of the receiving device will be described in detail as follows. The processor (160) of the receiving device receives a generated EHT PPDU from a transmitting device based on an RF through a broadband having 80 MHz-based preamble puncturing performed therein, and decodes the EHT PPDU for a band that is supported by the receiving device.

Figure 23:
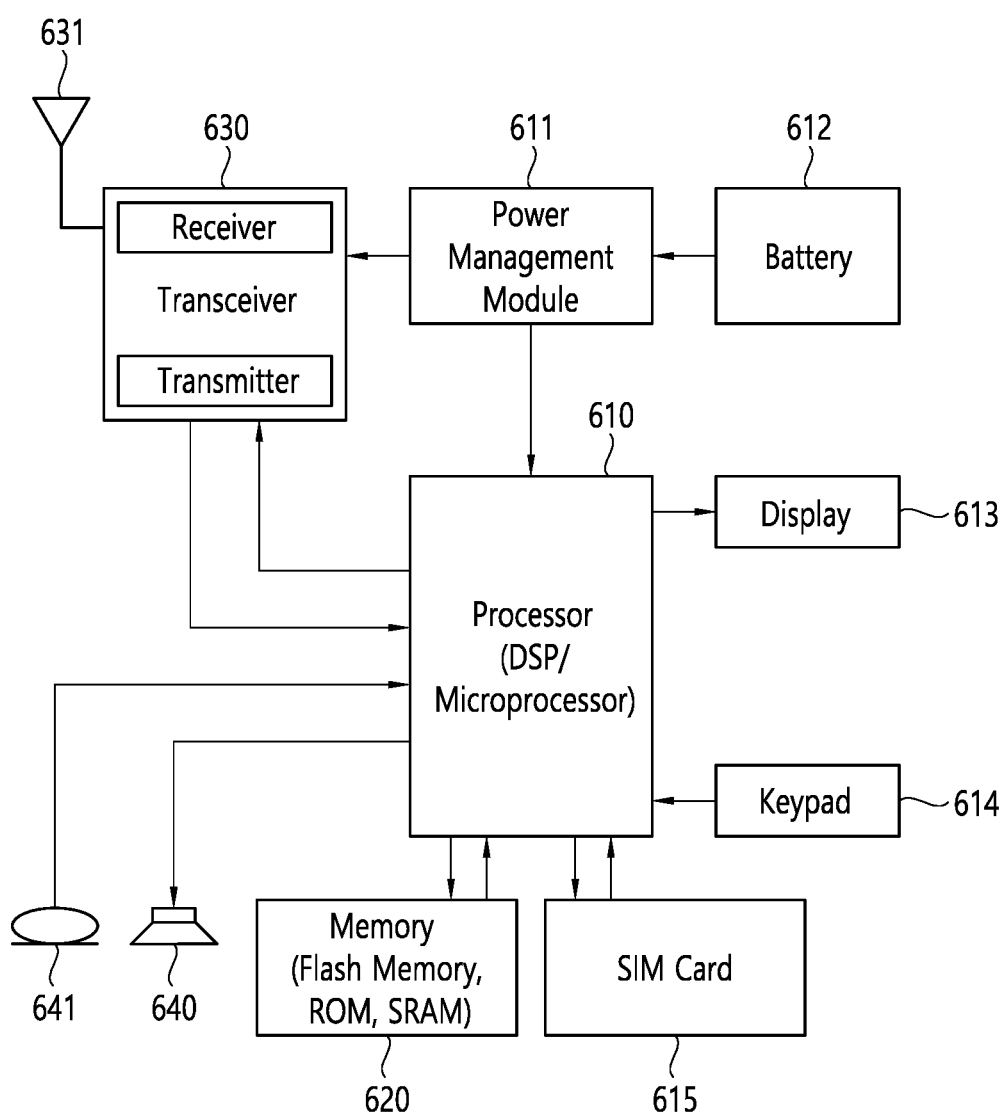
FIG. 23 shows a UE to which the technical features of the present disclosure can be applied.

FIG. 23 shows a UE to which the technical features of the present disclosure can be applied.

A UE includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods of the present disclosure described below. The processor (610) may be configured to control one or more other components of the UE (600) to implement proposed functions, procedures and/or methods of the present disclosure described below. Layers of the radio interface protocol may be implemented in the processor (610). The processor (610) may include application-specific integrated circuit (ASIC), other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of a transmitting device, the processor (610) generates an EHT PPDU and transmits the EHT PPDU based on an RF through a broadband having 80 MHz-based preamble puncturing performed therein.

In case of a receiving device, the processor (610) receives a generated EHT PPDU from a transmitting device based on an RF through a broadband having 80 MHz-based preamble puncturing performed therein, and decodes the EHT PPDU for a band that is supported by the receiving device.

The legacy preamble includes a Legacy-Short Training Field (L-STF) and a Legacy-Long Training Field (L-LTF). Additionally, the legacy preamble may further include a Legacy-Signal (L-SIG). The EHT field may include EHT-SIG, EHT-STF, EHT-LTF, and a data field. The legacy field may be a field that is supported by a wireless LAN system preceding 802.11be, and the EHT field may be a field that is supported by an 802.11be wireless LAN system.

The EHT PPDU is transmitted based on a radio frequency (RF). More specifically, the transmitting device may transmit an EHT PPDU within the 320 MHz band through a transmittable bandwidth supported by the RF (i.e., RF capacity).

The legacy preamble is generated by applying a first phase rotation value. That is, all fields included in the legacy preamble may commonly have the first phase rotation value applied thereto.

The first phase rotation value is determined based on a first method and a second method.

The first method is a method for obtaining an optimal PAPR of the L-STF and the L-LTF. The second method is a method for obtaining an optimal PAPR based on a maximum transmission bandwidth that is supported by the RF.

That is, the first phase rotation value is a phase rotation value that is defined for optimal PAPRs of L-STF and L-LTF. If the PAPRs of L-STF and L-LTF are great (or large), the first phase rotation value may be applied to the legacy preamble in order to minimize the PAPR values. Additionally, the first phase rotation value is also a phase rotation value for minimizing a maximum PAPR, which is obtained while considering all maximum transmission bandwidths supported by the RF. That is, the first phase rotation value may be a phase rotation value that is defined for obtaining optimal PAPRs of L-STF and L-LTF in a situation considering various RF capabilities.

The first phase rotation value is obtained based on a second phase rotation value and a third phase rotation value.

The second phase rotation value is a phase rotation value obtained by repeating a phase rotation value that is defined for an 80 MHz band in an 802.11ax system. Since the EHT PPDU is transmitted through the 320 MHz band, the second phase rotation value may be obtained by repeating four times the phase rotation value of the 80 MHz band, which optimizes the PAPRs in the L-STF and L-LTF and is applied in 20 MHz band units. If the PPDU is said to be transmitted through a 160 MHz band, the second phase rotation value may be obtained by repeating two times the phase rotation value of the 80 MHz band (optimizing the PAPRs in the L-STF and L-LTF and being applied in 20 MHz band units). And, if the PPDU is said to be transmitted through a 240 MHz band, the second phase rotation value may be obtained by repeating three times the phase rotation value (optimizing the PAPRs in the L-STF and L-LTF and being applied in 20 MHz band units).

The third phase rotation value is a phase rotation value being defined in 80 MHz band units in the 320 MHz band based on optimal PAPRs of the L-STF and the L-LTF. Since the 320 MHz band may be divided into 4 units of 80 MHz band, a third phase rotation value may be defined for each of the four 80 MHz bands. If the EHT PPDU is said to be transmitted through a 160 MHz band, a third phase rotation value may be defined for each of two 80 MHz bands, based on the optimal PAPRs of the L-STF and the L-LTF. If the EHT PPDU is said to be transmitted through a 240 MHz band, a third phase rotation value may be defined for each of three 80 MHz bands, based on the optimal PAPRs of the L-STF and the L-LTF.

That is, this embodiment proposes a method for additionally performing phase rotation (the third phase rotation value) for each 80 MHz band unit within a full band while applying a phase rotation value (the second phase rotation value) being defined for the 80 MHz band.

Hereinafter, a subcarrier range having the phase rotation value applied thereto will be described.

The 320 MHz is configured of subcarriers having subcarrier indexes from −512 to 511.

The second rotation phase value is [1 −1 −1 −1 1 −1 −1 −1 1 −1 −1 −1 1 −1 −1 −1]. This is because the rotation phase value being defined for the 80 MHz band has been repeated 4 times.

Among the second rotation phase value, a first value 1 may be applied to a subcarrier having subcarrier indexes from −512 to −449, among the second rotation phase value, a second value −1 may be applied to a subcarrier having subcarrier indexes from −448 to −385, among the second rotation phase value, a third value −1 may be applied to a subcarrier having subcarrier indexes from −384 to −321, and, among the second rotation phase value, a fourth value −1 may be applied to a subcarrier having subcarrier indexes from −320 to −257. That is, [1 −1 −1 −1] being the first to fourth values of the second rotation phase value may be applied to a first 80 MHz band within the 320 MHz band.

Among the second rotation phase value, a fifth value 1 may be applied to a subcarrier having subcarrier indexes from −256 to −193, among the second rotation phase value, a sixth value −1 may be applied to a subcarrier having subcarrier indexes from −192 to −129, among the second rotation phase value, a seventh value −1 may be applied to a subcarrier having subcarrier indexes from −128 to −65, and, among the second rotation phase value, an eighth value −1 may be applied to a subcarrier having subcarrier indexes from −64 to −1. That is, [1 −1 −1 −1] being the fifth to eighth values of the second rotation phase value may be applied to a second 80 MHz band within the 320 MHz band.

Among the second rotation phase value, a ninth value 1 may be applied to a subcarrier having subcarrier indexes from 0 to 63, among the second rotation phase value, a tenth value −1 may be applied to a subcarrier having subcarrier indexes from 64 to 127, among the second rotation phase value, an eleventh value −1 may be applied to a subcarrier having subcarrier indexes from 128 to 191, and, among the second rotation phase value, a twelfth value −1 may be applied to a subcarrier having subcarrier indexes from 192 to 255. That is, [1 −1 −1 −1] being the ninth to twelfth values of the second rotation phase value may be applied to a third 80 MHz band within the 320 MHz band.

Among the second rotation phase value, a thirteenth value 1 may be applied to a subcarrier having subcarrier indexes from 256 to 319, among the second rotation phase value, a fourteenth value −1 may be applied to a subcarrier having subcarrier indexes from 320 to 383, among the second rotation phase value, a fifteenth value −1 may be applied to a subcarrier having subcarrier indexes from 384 to 447, and, among the second rotation phase value, a sixteenth value −1 may be applied to a subcarrier having subcarrier indexes from 448 to 511. That is, [1 −1 −1 −1] being the thirteenth to sixteenth values of the second rotation phase value may be applied to a fourth 80 MHz band within the 320 MHz band.

For example, the third phase rotation value may be [1 1-1-1]. Since the 320 MHz band may be divided into 4 units of 80 MHz band, a third phase rotation value may be defined for each of the four 80 MHz bands.

Among the third rotation phase value, a first value 1 may be applied to a first 80 MHz band within the 320 MHz band, among the third rotation phase value, a second value 1 may be applied to a second 80 MHz band within the 320 MHz band, among the third rotation phase value, a third value −1 may be applied to a third 80 MHz band within the 320 MHz band, and, among the third rotation phase value, a fourth value −1 may be applied to a fourth 80 MHz band within the 320 MHz band.

The first phase rotation value may be obtained based on a multiplication of the second phase rotation value and the third phase rotation value. That is, the first phase rotation value may be obtained by multiplying the second phase rotation value and the third phase rotation value to align with the frequency band (or subcarrier index). At this point, the first phase rotation value is [1 −1 −1 −1 1 −1 −1 −1 −1 1 1 1 −1 1 1 1]. By applying the first phase rotation value to the legacy preamble, optimal PAPRs for L-STF and L-LTF may be ensured for the transmission of a 320 MHz band considering various RF capabilities and having 80 MHz-based preamble puncturing performed therein.

For example, the 80 MHz band may include all 80 MHz bands excluding a primary 80 MHz band. That is, although the primary 80 MHz band may always be used for the PPDU transmission, not all of the remaining 80 MHz bands excluding the primary 80 MHz band may be used for the PPDU transmission. The first and second phase rotation values may be obtained based on a preamble puncturing pattern. The preamble puncturing pattern may be a band pattern having punctured at least one 80 MHz band, among all 80 MHz bands excluding the primary 80 MHz band within the 320 MHz band.

That is, the preamble puncturing pattern may correspond to a pattern of all cases having at least one 80 MHz band punctured in the 320 MHz band. However, the first phase rotation value has one unified form and not a form having various values according to the preamble puncturing pattern.

Additionally, the maximum transmission bandwidth supported by the RF may be 80 MHz, 160 MHz, 240 MHz or 320 MHz. In case the maximum transmission bandwidth supported by the RF is 80 MHz, the transmitting device may transmit a PPDU by using one RF having 80 MHz capacity. In case the maximum transmission bandwidth supported by the RF is 160 MHz, the transmitting device may transmit a PPDU by using two RFs having 80 MHz capacity. In case the maximum transmission bandwidth supported by the RF is 240 MHz, the transmitting device may transmit a PPDU by using three RFs having 80 MHz capacity. In case the maximum transmission bandwidth supported by the RF is 320 MHz, the transmitting device may transmit a PPDU by using four RFs having 80 MHz capacity.

By comparing first to fourth PAPRs, one of the first to fourth PAPRs may be selected as an optimal PAPR that is obtained based on the maximum transmission bandwidth(s) supported by the RF. That is, the transmitting device may calculate a PAPR for each RF having various capacities so as to extract a maximum PAPR value, and, then, the transmitting device may compare the extracted PAPR values so as to determine an optimized phase rotation value. However, the first phase rotation value has one unified form and not a form having various values according to the RF having various capacities.

The first PAPR may be an optimal PAPR that is obtained when the maximum transmission bandwidth supported by the RF is 80 MHz. The second PAPR may be an optimal PAPR that is obtained when the maximum transmission bandwidth supported by the RF is 160 MHz. The third PAPR may be an optimal PAPR that is obtained when the maximum transmission bandwidth supported by the RF is 240 MHz. The fourth PAPR may be an optimal PAPR that is obtained when the maximum transmission bandwidth supported by the RF is 320 MHz.

The L-STF may be generated by applying the first phase rotation value to an L-STF sequence. Additionally, the L-LTF may be generated by applying the first phase rotation value to an L-LTF sequence.

The L-STF sequence may be a sequence being configured by repeating an L-STF sequence that is defined for a 20 MHz band. Since the L-STF is transmitted through the 320 MHz band, the L-STF sequence may be obtained by repeating the L-STF sequence of the 20 MHz band, which is defined in the existing 802.11ax. Similarly, if the L-STF is transmitted through a 160 MHz band, the L-STF sequence of the 20 MHz band, which is defined in the existing 802.11ax, may be repeated two times. And, if the L-STF is transmitted through a 240 MHz band, the L-STF sequence of the 20 MHz band, which is defined in the existing 802.11ax, may be repeated three times.

The L-STF sequence being defined for the 20 MHz band is sqrt($\frac{1}{2}$)*[0 0 0 0 0 0 0 0 1+j 0 0 0 −1−j 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 0 0 1+j 0 0 0 1+j 0 0 0 0 0 0 0].

The L-LTF sequence may be a sequence being configured by repeating an L-LTF sequence that is defined for a 20 MHz band. Since the L-LTF is transmitted through the 320 MHz band, the L-LTF sequence may be obtained by repeating the L-LTF sequence of the 20 MHz band, which is defined in the existing 802.11ax. Similarly, if the L-LTF is transmitted through a 160 MHz band, the L-LTF sequence of the 20 MHz band, which is defined in the existing 802.11ax, may be repeated two times. And, if the L-LTF is transmitted through a 240 MHz band, the L-LTF sequence of the 20 MHz band, which is defined in the existing 802.11ax, may be repeated three times.

The L-LTF sequence being defined for the 20 MHz band is [0 0 0 0 0 0 1 1 −1 −1 1 1 −1 1 −1 1 1 1 1 1 1 −1 −1 1 1 −1 1 −1 1 1 1 1 0 −1 −1 1 1 −1 1 −1 1 −1 1 −1 −1 −1 −1 −1 1 1 −1 −1 1 −1 1 −1 1 1 1 1 0 0 0 0 0].

In the above-described embodiment, even when the PPDU is being transmitted through 80/160/240 MHz bands, a phase rotation value may be defined and applied to the legacy preamble by using the same method.

The EHT-SIG may include EHT-SIG-A and EHT-SIG-B. The EHT-SIG-B may include the RU information. That is, an AP may notify information on a tone plan at 80/160/240/320 MHz through the EHT-SIG-B within the PPDU. Additionally, EHT-STF, EHT-LTF, and data field being included in the EHT field may be transmitted and/or received from/in a band (RU) according to a tone plan at 80/160/240/320 MHz.

Additionally, the EHT-SIG may be generated by applying the first phase rotation value or the second phase rotation value. If an EHT PPDU has a preamble structure, such as that of 11ax, a field may be generated by applying a phase rotation value that even has the same EHT-SIG-B.

What is claimed is:

1. A method for transmitting an Extreme High Throughput (EHT) Physical Protocol Data Unit (PPDU) in a wireless LAN system, the method comprising:
    generating, by a transmitting device, the EHT PPDU, wherein the EHT PPDU includes a legacy preamble and an EHT field; and
    transmitting, by the transmitting device, the EHT PPDU to a receiving device through a 320 MHz band having 80 MHz bands punctured,
    wherein the EHT PPDU is transmitted based on combination of a plurality of radio frequencies (RFs),
    wherein the combination of the plurality of RFs includes first to fourth combinations,
    wherein the first combination is a combination of four RFs supporting a maximum transmission bandwidth of 80 MHz,
    wherein the second combination is a combination of two RFs supporting a maximum transmission bandwidth of 160 MHz,
    wherein the third combination is a combination of two RFs supporting a maximum transmission bandwidth of 80 MHz and one RF supporting a maximum transmission bandwidth of 160 MHz,
    wherein the fourth combination is one RF supporting a maximum transmission bandwidth of 320 MHz,
    wherein the 320 MHz band is configured contiguously or non-contiguously based on the first to fourth combinations,
    wherein the legacy preamble includes a Legacy-Short Training Field (L-STF) and a Legacy-Long Training Field (L-LTF),
    wherein the legacy preamble is generated by applying a first phase rotation value,
    wherein the first phase rotation value is determined based on a first method and a second method,
    wherein the first method is a method of obtaining optimal PAPRs of the L-STF and the L-LTF,
    wherein the second method is a method of obtaining an optimal PAPR based on a maximum transmission bandwidth supported by the RF, wherein the first phase rotation value is obtained based on a second phase rotation value and a third phase rotation value, wherein the second phase rotation value is a phase rotation value obtained by repeating a phase rotation value that is defined for an 80 MHz band in an 802.11ax system, wherein the third phase rotation value is a phase rotation value being defined in 80 MHz band units in the 320 MHz band, wherein the 320 MHz band is configured of subcarriers having subcarrier indexes from −512 to 511, wherein the second rotation phase value is [1 −1 −1 −1 1 −1 −1 −1 1 −1 −1 −1 1 −1 −1 −1], wherein, among the second rotation phase value, a first value 1 is applied to a subcarrier having subcarrier indexes from −512 to −449, wherein, among the second rotation phase value, a second value −1 is applied to a subcarrier having subcarrier indexes from −448 to −385, wherein, among the second rotation phase value, a third value −1 is applied to a subcarrier having subcarrier indexes from −384 to −321, wherein, among the second rotation phase value, a fourth value −1 is applied to a subcarrier having subcarrier indexes from −320 to −257, wherein, among the second rotation phase value, a fifth value 1 is applied to a subcarrier having subcarrier indexes from −256 to −193, wherein, among the second rotation phase value, a sixth value −1 is applied to a subcarrier having subcarrier indexes from −192 to −129, wherein, among the second rotation phase value, a seventh value −1 is applied to a subcarrier having subcarrier indexes from −128 to −65, wherein, among the second rotation phase value, an eighth value −1 is applied to a subcarrier having subcarrier indexes from −64 to −1, wherein, among the second rotation phase value, a ninth value 1 is applied to a subcarrier having subcarrier indexes from 0 to 63, wherein, among the second rotation phase value, a tenth value −1 is applied to a subcarrier having subcarrier indexes from 64 to 127, wherein, among the second rotation phase value, an eleventh value −1 is applied to a subcarrier having subcarrier indexes from 128 to 191, wherein, among the second rotation phase value, a twelfth value −1 is applied to a subcarrier having subcarrier indexes from 192 to 255, wherein, among the second rotation phase value, a thirteenth value 1 is applied to a subcarrier having subcarrier indexes from 256 to 319, wherein, among the second rotation phase value, a fourteenth value −1 is applied to a subcarrier having subcarrier indexes from 320 to 383, wherein, among the second rotation phase value, a fifteenth value −1 is applied to a subcarrier having subcarrier indexes from 384 to 447, and wherein, among the second rotation phase value, a sixteenth value −1 is applied to a subcarrier having subcarrier indexes from 448 to 511.

2. The method of claim 1, wherein the third phase rotation value is [1 1 −1 −1], wherein, among the third rotation phase value, a first value 1 is applied to a first 80 MHz band within the 320 MHz band, wherein, among the third rotation phase value, a second value 1 is applied to a second 80 MHz band within the 320 MHz band, wherein, among the third rotation phase value, a third value −1 is applied to a third 80 MHz band within the 320 MHz band, and wherein, among the third rotation phase value, a fourth value −1 is applied to a fourth 80 MHz band within the 320 MHz band.

3. The method of claim 2, wherein the first phase rotation value is obtained based on a multiplication of the second phase rotation value and the third phase rotation value, and wherein the first phase rotation value is [1−1 −1 −1 1 −1 −1 −1 −1 1 1 1−1 1 1 1].

4. The method of claim 1, wherein the 80 MHz band includes all 80 MHz bands excluding a primary 80 MHz band, and wherein the first phase rotation value is obtained based on a preamble puncturing pattern.

5. The method of claim 4, wherein the preamble puncturing pattern is a band pattern having punctured at least one 80 MHz band, among all 80 MHz bands excluding the primary 80 MHz band within the 320 MHz band.

6. The method of claim 1, wherein the optimal PAPR based on the maximum transmission bandwidth supported by the RF is an optimal PAPR being obtained when the maximum transmission bandwidth supported by the RF is 80 MHz, 160 MHz or 320 MHz.

7. A transmitting device for transmitting an Extreme High Throughput (EHT) Physical Protocol Data Unit (PPDU) in a wireless LAN system, the transmitting device comprising:
a memory;
a transceiver; and
a processor being operatively coupled to the memory and the transceiver,
wherein the processor is configured to:
generate the EHT PPDU, wherein the EHT PPDU includes a legacy preamble and an EHT field, and
transmit the EHT PPDU to a receiving device through a 320 MHz band having 80 MHz punctured,
wherein the EHT PPDU is transmitted based on combination of a plurality of radio frequencies (RFs),
wherein the combination of the plurality of RFs includes first to fourth combinations,
wherein the first combination is a combination of four RFs supporting a maximum transmission bandwidth of 80 MHz,
wherein the second combination is a combination of two RFs supporting a maximum transmission bandwidth of 160 MHz,
wherein the third combination is a combination of two RFs supporting a maximum transmission bandwidth of 80 MHz and one RF supporting a maximum transmission bandwidth of 160 MHz,
wherein the fourth combination is one RF supporting a maximum transmission bandwidth of 320 MHz,
wherein the 320 MHz band is configured contiguously or non-continuously based on the first to fourth combinations,
wherein the legacy preamble includes a Legacy-Short Training Field (L-STF) and a Legacy-Long Training Field (L-LTF),
wherein the legacy preamble is generated by applying a first phase rotation value,
wherein the first phase rotation value is determined based on a first method and a second method, wherein the first method is a method of obtaining optimal PAPRs of the L-STF and the L-LTF, wherein the second method is a method of obtaining an optimal PAPR based on a maximum transmission bandwidth supported by the RF, wherein the first phase rotation value is obtained based on a second phase rotation value and a third phase rotation value, wherein the second phase rotation value is a phase rotation value obtained by repeating a phase rotation value that is defined for an 80 MHz band in an 802.11ax system, wherein the third phase rotation value is a phase rotation value being defined in 80 MHz band units in the 320 MHz band, wherein the 320 MHz band is configured of subcarriers having subcarrier indexes from −512 to 511, wherein the second rotation phase value is [1 −1 −1 −1 1 −1 −1−1 1−1 −1−1 1−1 −1−1], wherein, among the second rotation phase value, a first value 1 is applied to a subcarrier having subcarrier indexes from −512 to −449, wherein, among the second rotation phase value, a second value −1 is applied to a subcarrier having subcarrier indexes from −448 to −385, wherein, among the second rotation phase value, a third value −1 is applied to a subcarrier having subcarrier indexes from −384 to −321, wherein, among the second rotation phase value, a fourth value −1 is applied to a subcarrier having subcarrier indexes from −320 to −257, wherein, among the second rotation phase value, a fifth value 1 is applied to a subcarrier having subcarrier indexes from −256 to −193, wherein, among the second rotation phase value, a sixth value −1 is applied to a subcarrier having subcarrier indexes from −192 to −129, wherein, among the second rotation phase value, a seventh value −1 is applied to a subcarrier having subcarrier indexes from −128 to −65, wherein, among the second rotation phase value, an eighth value −1 is applied to a subcarrier having subcarrier indexes from −64 to −1, wherein, among the second rotation phase value, a ninth value 1 is applied to a subcarrier having subcarrier indexes from 0 to 63, wherein, among the second rotation phase value, a tenth value −1 is applied to a subcarrier having subcarrier indexes from 64 to 127, wherein, among the second rotation phase value, an eleventh value −1 is applied to a subcarrier having subcarrier indexes from 128 to 191, wherein, among the second rotation phase value, a twelfth value −1 is applied to a subcarrier having subcarrier indexes from 192 to 255, wherein, among the second rotation phase value, a thirteenth value 1 is applied to a subcarrier having subcarrier indexes from 256 to 319, wherein, among the second rotation phase value, a fourteenth value −1 is applied to a subcarrier having subcarrier indexes from 320 to 383, wherein, among the second rotation phase value, a fifteenth value −1 is applied to a subcarrier having subcarrier indexes from 384 to 447, and wherein, among the second rotation phase value, a sixteenth value −1 is applied to a subcarrier having subcarrier indexes from 448 to 511.

8. The transmitting device of claim 7, wherein the third phase rotation value is [1 1 −1 −1], wherein, among the third rotation phase value, a first value 1 is applied to a first 80 MHz band within the 320 MHz band, wherein, among the third rotation phase value, a second value 1 is applied to a second 80 MHz band within the 320 MHz band, wherein, among the third rotation phase value, a third value −1 is applied to a third 80 MHz band within the 320 MHz band, and wherein, among the third rotation phase value, a fourth value −1 is applied to a fourth 80 MHz band within the 320 MHz band.

9. The transmitting device of claim 8, wherein the first phase rotation value is obtained based on a multiplication of the second phase rotation value and the third phase rotation value, and wherein the first phase rotation value is [1 −1 −1 −1 1 −1 −1 −1 1 −1 −1 −1 1 −1 −1 −1].

10. The transmitting device of claim 7, wherein the 80 MHz band includes all 80 MHz bands excluding a primary 80 MHz band, and wherein the first phase rotation value is obtained based on a preamble puncturing pattern.

11. The transmitting device of claim 10, wherein the preamble puncturing pattern is a band pattern having punctured at least one 80 MHz band, among all 80 MHz bands excluding the primary 80 MHz band within the 320 MHz band.

12. The transmitting device of claim 7, wherein the optimal PAPR based on the maximum transmission bandwidth supported by the RF is an optimal PAPR being obtained when the maximum transmission bandwidth supported by the RF is 80 MHz, 160 MHz or 320 MHz.

13. A method for receiving an Extreme High Throughput (EHT) Physical Protocol Data Unit (PPDU) in a wireless LAN system, the method comprising:

receiving, by a receiving device, the EHT PPDU through a 320 MHz band having 80 MHz punctured from a transmitting device, wherein the EHT PPDU includes a legacy preamble and an EHT field; and decoding, by the receiving device, the EHT PPDU, wherein the EHT PPDU is transmitted based on combination of a plurality of radio frequencies (RFs), wherein the combination of the plurality of RFs includes first to fourth combinations, wherein the first combination is a combination of four RFs supporting a maximum transmission bandwidth of 80 MHz, wherein the second combination is a combination of two RFs supporting a maximum transmission bandwidth of 160 MHz, wherein the third combination is a combination of two RFs supporting a maximum transmission bandwidth of 80 MHz and one RF supporting a maximum transmission bandwidth of 160 MHz, wherein the fourth combination is one RF supporting a maximum transmission bandwidth of 320 MHz, wherein the 320 MHz band is configured contiguously or non-continuously based on the first to fourth combinations, wherein the legacy preamble includes a Legacy-Short Training Field (L-STF) and a Legacy-Long Training Field (L-LTF), wherein the legacy preamble is generated by applying a first phase rotation value, wherein the first phase rotation value is determined based on a first method and a second method, wherein the first method is a method of obtaining optimal PAPRs of the L-STF and the L-LTF, wherein the second method is a method of obtaining an optimal PAPR based on a maximum transmission bandwidth supported by the RF, wherein the first phase rotation value is obtained based on a second phase rotation value and a third phase rotation value, wherein the second phase rotation value is a phase rotation value obtained by repeating a phase rotation value that is defined for an 80 MHz band in an 802.11ax system, wherein the third phase rotation value is a phase rotation value being defined in 80 MHz band units in the 320 MHz band, wherein the 320 MHz band is configured of subcarriers having subcarrier indexes from −512 to 511, wherein the second rotation phase value is [1 −1 −1 −1 1 −1 −1 −1 1 −1 −1 −1 1 −1 −1 −1 ], wherein, among the second rotation phase value, a first value 1 is applied to a subcarrier having subcarrier indexes from −512 to −449, wherein, among the second rotation phase value, a second value −1 is applied to a subcarrier having subcarrier indexes from −448 to −385, wherein, among the second rotation phase value, a third value −1 is applied to a subcarrier having subcarrier indexes from −384 to −321, wherein, among the second rotation phase value, a fourth value −1 is applied to a subcarrier having subcarrier indexes from −320 to −257, wherein, among the second rotation phase value, a fifth value 1 is applied to a subcarrier having subcarrier indexes from −256 to −193, wherein, among the second rotation phase value, a sixth value −1 is applied to a subcarrier having subcarrier indexes from −192 to −129, wherein, among the second rotation phase value, a seventh value −1 is applied to a subcarrier having subcarrier indexes from −128 to −65, wherein, among the second rotation phase value, an eighth value −1 is applied to a subcarrier having subcarrier indexes from −64 to −1, wherein, among the second rotation phase value, a ninth value 1 is applied to a subcarrier having subcarrier indexes from 0 to 63, wherein, among the second rotation phase value, a tenth value −1 is applied to a subcarrier having subcarrier indexes from 64 to 127, wherein, among the second rotation phase value, an eleventh value −1 is applied to a subcarrier having subcarrier indexes from 128 to 191, wherein, among the second rotation phase value, a twelfth value −1 is applied to a subcarrier having subcarrier indexes from 192 to 255, wherein, among the second rotation phase value, a thirteenth value 1 is applied to a subcarrier having subcarrier indexes from 256 to 319, wherein, among the second rotation phase value, a fourteenth value −1 is applied to a subcarrier having subcarrier indexes from 320 to 383, wherein, among the second rotation phase value, a fifteenth value −1 is applied to a subcarrier having subcarrier indexes from 384 to 447, and wherein, among the second rotation phase value, a sixteenth value −1 is applied to a subcarrier having subcarrier indexes from 448 to 511.

\* \* \* \* \*